(12) United States Patent
Kakinoki et al.

(10) Patent No.: US 10,664,085 B2
(45) Date of Patent: May 26, 2020

(54) DISPLAY DEVICE WITH TOUCH DETECTION FUNCTION

(71) Applicant: Japan Display Inc., Tokyo (JP)

(72) Inventors: Yuto Kakinoki, Tokyo (JP); Naoki Takada, Tokyo (JP)

(73) Assignee: Japan Display Inc., Tokyo (JP)

( * ) Notice: Subject to any disclaimer, the term of this patent is extended or adjusted under 35 U.S.C. 154(b) by 26 days.

(21) Appl. No.: 16/139,963

(22) Filed: Sep. 24, 2018

(65) Prior Publication Data

US 2019/0102030 A1 Apr. 4, 2019

(30) Foreign Application Priority Data

Sep. 29, 2017 (JP) ................................. 2017-191725

(51) Int. Cl.
*G06F 3/041* (2006.01)
*G06F 3/044* (2006.01)

(52) U.S. Cl.
CPC .......... *G06F 3/0414* (2013.01); *G06F 3/044* (2013.01); *G06F 3/0412* (2013.01); *G06F 3/0416* (2013.01); *G06F 3/0418* (2013.01); *G06F 3/04166* (2019.05); *G06F 3/041662* (2019.05); *G06F 3/0443* (2019.05); *G06F 3/0445* (2019.05); *G06F 3/0446* (2019.05); *G06F 3/04182* (2019.05); *G06F 2203/04105* (2013.01)

(58) Field of Classification Search
CPC .... G06F 3/0412; G06F 3/0414; G06F 3/0416; G06F 3/04166; G06F 3/041662; G06F 3/0418; G06F 3/044; G06F 3/0443; G06F 3/0445; G06F 3/0446; G06F 3/04182; G06F 2203/04105; G06F 2203/04108; G01L 1/14; G01L 1/146
USPC .................................................. 345/173–174
See application file for complete search history.

(56) References Cited

U.S. PATENT DOCUMENTS

| 10,048,801 B2 * | 8/2018 | Wang ..................... G06F 3/0418 |
| 10,353,507 B2 * | 7/2019 | Suzuki .................. G06F 3/0412 |
| 10,488,997 B2 * | 11/2019 | Takada ................ G02B 6/0053 |
| 2012/0086666 A1 * | 4/2012 | Badaye ................... G06F 3/044 345/174 |

(Continued)

FOREIGN PATENT DOCUMENTS

| JP | 2015127657 A | 7/2015 |
| JP | 201817705 A | 2/2018 |

*Primary Examiner* — Jason M Mandeville
(74) *Attorney, Agent, or Firm* — K&L Gates LLP

(57) ABSTRACT

A display device with a touch detection function includes a touch detection electrode, first and second electrodes, a touch detection controller, and a force detection controller. The force detection controller performs interpolation processing on reference values to calculate an interpolation value when a reference force is applied to a position in an input surface at which a force has been applied by an object and calculates a force detection value based on a ratio of a detection value detected based on capacitance between first and second electrodes to the interpolation value. The position at which the force is applied is specified based on a position detected by the touch detection controller as a position of contact with the input surface by the object. The reference values are detected based on the capacitance between the first and second electrodes when the reference force is applied to reference positions.

16 Claims, 50 Drawing Sheets

(56) References Cited

U.S. PATENT DOCUMENTS

| | | | |
|---|---|---|---|
| 2013/0057499 A1* | 3/2013 | Ando | G06F 3/038 345/173 |
| 2014/0354584 A1* | 12/2014 | Cok | G06F 3/0414 345/174 |
| 2016/0320914 A1 | 11/2016 | Tachikawa et al. | |
| 2017/0249049 A1* | 8/2017 | Wang | G06F 3/0412 |
| 2018/0032209 A1 | 2/2018 | Suzuki et al. | |
| 2018/0307365 A1* | 10/2018 | Chen | G06F 1/3262 |

* cited by examiner

TABLE STORAGE

TBL12

ELECTRODE EL12

| $K_{1200}$ | ... | ... | ... | ... | ... |
|---|---|---|---|---|---|
| ... | $K_{1211}$ | ... | ... | ... | ... |
| $K_{1202}$ | $K_{1212}$ | $K_{1222}$ | ... | ... | ... |
| ... | $K_{1213}$ | ... | ... | ... | ... |
| ... | ... | ... | ... | ... | ... |
| ... | ... | ... | ... | ... | $K_{1255}$ |

DISPLAY DEVICE WITH TOUCH DETECTION FUNCTION

CROSS-REFERENCE TO RELATED APPLICATIONS

This application claims priority from Japanese Application No. 2017-191725, filed on Sep. 29, 2017, the contents of which are incorporated by reference herein in its entirety.

BACKGROUND

1. Technical Field

The present invention relates to a display device with a touch detection function that is capable of detecting force, for example, pressing force when being touched upon and so on.

2. Description of the Related Art

In recent years, touch detection devices that are called touch panels and are capable of detecting an external proximity object have attracted attention. Such a touch panel is mounted on a display device such as a liquid crystal display device or integrated with the display device and used as a display device with a touch detection function. The display device with a touch detection function displays various button images and the like thereon and enables information input using the touch panel instead of normal mechanical buttons.

Force detection devices capable of detecting force in addition to touch have also come to be used.

As a related technique, Japanese Patent Application Laid-open Publication No. 2015-127657 discloses an input device that linearizes output characteristics of a force sensor using an inverse function of an output characteristic function of the force sensor.

There is a force detection device that detects a force based on variation in electrostatic capacitance (hereinafter, referred to as capacitance) between a first conductor provided on the input surface side of a touch panel and a second conductor provided on the rear surface side of the touch panel. When a force is applied to the input surface of the detection device, the touch panel is deflected, the thickness of an air gap between the first conductor and the second conductor is reduced, a distance between the first conductor and the second conductor is shortened, and the capacitance between the first conductor and the second conductor is increased. The force detection device outputs a force signal value based on the variation in the capacitance.

Even when the same force is applied to the force detection device, the distance between the first conductor and the second conductor varies depending on the position where the force is applied. Accordingly, force detection accuracy is lowered depending on the position where the force is applied in some cases.

For the foregoing reasons, there is a need for a display device with a touch detection function capable of suitably detecting force.

SUMMARY

According to an aspect, a display device with a touch detection function, the display device includes: a first substrate having an input surface; a touch detection electrode provided to the first substrate and facing the input surface; a first electrode provided to a second substrate and facing the touch detection electrode; a second electrode facing the first electrode with a dielectric layer interposed between the first electrode and the second electrode; a touch detection controller configured to detect a position at which a detection target object is in contact with or in proximity to the input surface based on capacitance between the first electrode and the touch detection electrode; a force detection controller configured to detect a force applied to the input surface by the detection target object based on capacitance between the first electrode and the second electrode and calculate a force detection value indicating the force; and storage configured to store therein a plurality of reference values detected by the force detection controller. The force detection controller configured to perform interpolation processing on the reference values to calculate an interpolation value when a reference force is applied to a position at which the force has been applied, and calculate the force detection value based on a ratio of a detection value detected based on the capacitance between the first electrode and the second electrode relative to the interpolation value. The position at which the force is applied is specified based on a position detected by the touch detection controller as the position of contact with the input surface by the detection target object. The reference values are detected based on the capacitance between the first electrode and the second electrode when the reference force is applied to a plurality of reference positions.

According to another aspect, a display device with a touch detection function, the display device includes: a first substrate having an input surface; a first electrode provided to the first substrate; a second electrode facing the first electrode with a dielectric layer interposed between the first electrode and the second electrode; a touch detection controller configured to detect a position at which a detection target object is in contact with or in proximity to the input surface based on capacitance of the first electrode; and a force detection controller configured to detect a force applied to the input surface by the detection target object based on capacitance between the first electrode and the second electrode and calculate a force detection value indicating the force; and storage configured to store therein a plurality of reference values detected by the force detection controller. The force detection controller configured to perform interpolation processing on the reference values to calculate an interpolation value when a reference force is applied to a position at which the force has been applied, and calculate the force detection value based on a ratio of a detection value detected based on the capacitance between the first electrode and the second electrode relative to the interpolation value. The position at which the force has been applied is specified based on a position detected by the touch detection controller as the position of contact with the input surface by the detection target object. The reference values are detected based on the capacitance between the first electrode and the second electrode when the reference force is applied to a plurality of reference positions.

BRIEF DESCRIPTION OF THE DRAWINGS

FIG. 50 is diagram illustrating an example of a table stored in the display device with a touch detection function according to the eighth modification of the first embodiment;

DETAILED DESCRIPTION

Figure 1:
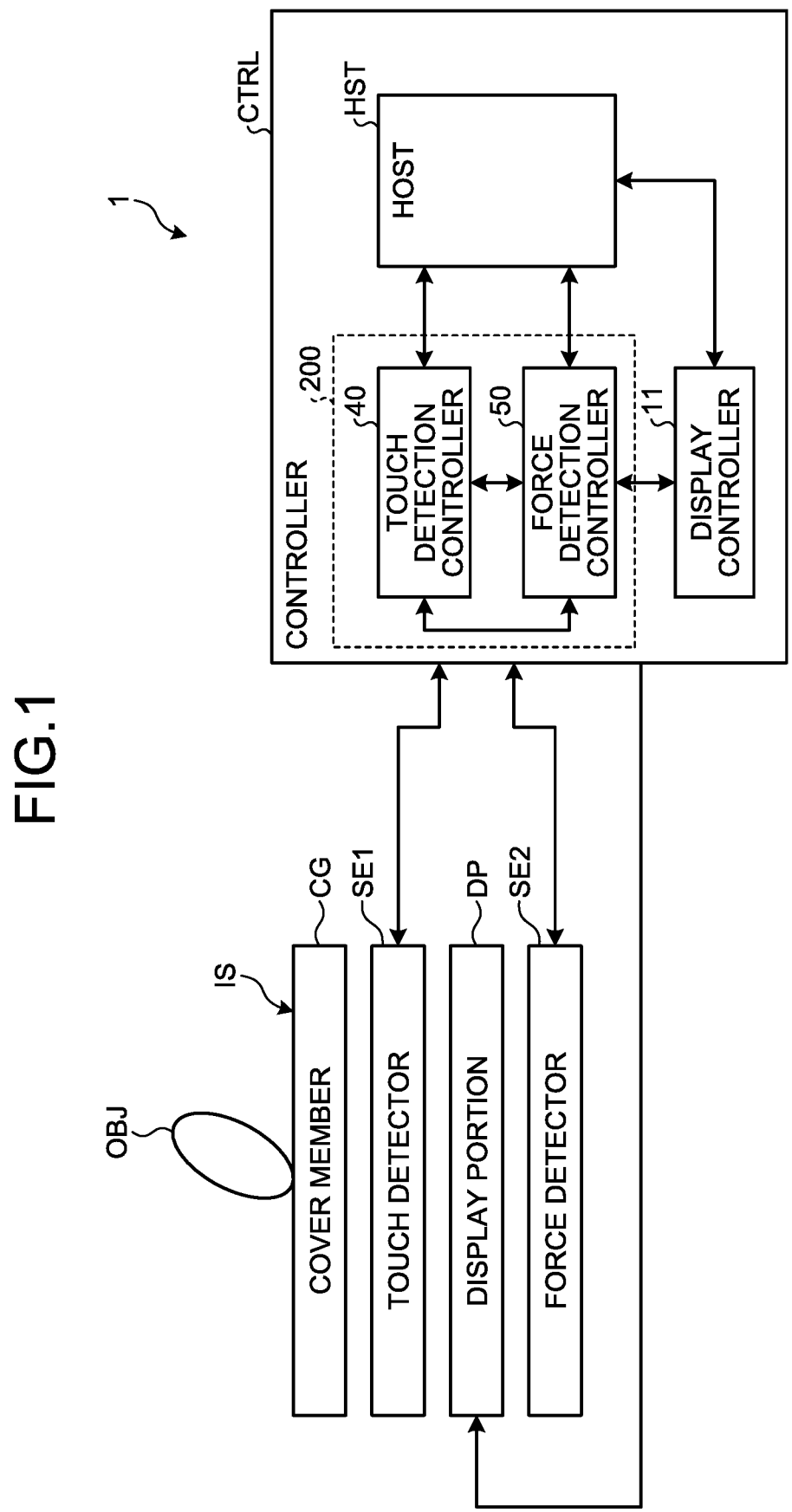
FIG. 1 is a block diagram illustrating a configuration of a display device with a touch detection function according to a first embodiment.

Hereinafter, embodiments for carrying out the invention will be described in detail with reference to the drawings. Contents that are described in the following embodiments do not limit the present disclosure. Components that are described below include components at which those skilled in the art can easily arrive and substantially the same components. Furthermore, the components that are described below can be appropriately combined. The disclosure is merely an example, and it is needless to say that appropriate modifications within the gist of the invention at which those skilled in the art can easily arrive are encompassed in the scope of the present disclosure. The drawings can be schematically illustrated for the widths, the thicknesses, the shapes, and the like of respective parts relative to actual modes to make explanation more clear. The drawings are however merely examples and do not limit interpretation of the present disclosure. In the specification and the drawings, the same reference numerals denote the same components as those described before with reference to already-referred drawings and detail explanation thereof is appropriately omitted in some cases.

In this disclosure, when an element is described as being "on" another element, the element can be directly on the other element, or there can be one or more elements between the element and the other element.

1. First Embodiment

FIG. 1 is a block diagram illustrating a configuration of a display device with a touch detection function according to a first embodiment.

A display device with a touch detection function 1 according to the first embodiment includes a touch detector SE1, a display portion DP, a force detector SE2, and a controller CTRL. In the first embodiment, the force detector SE2 and the controller CTRL in the display device with a touch detection function 1 correspond to a "force detection device".

The touch detector SE1 detects contact with or proximity to an input surface IS of a cover member CG by a detection target object OBJ. To be specific, the touch detector SE1 outputs, to the controller CTRL, a signal value in accordance with the contact or proximity of a detection target object OBJ in a region where the detection target object OBJ overlaps with the input surface IS when viewed from a direction perpendicular to the input surface IS, that is, in plan view.

The detection target object OBJ may be an object of a first type that is deformed when making contact with the input surface IS or may be an object of a second type that is not deformed or is relatively less deformed than the object of the first type even when making contact with the input surface IS. Examples of the object of the first type include, but are not limited to, a finger. Examples of the object of the second type include, but are not limited to, a stylus pen made of resin or metal.

The number of detection target objects OBJ that the touch detector SE1 can detect is not limited to one. The touch detector SE1 may be capable of detecting two or more detection target objects OBJ.

Examples of the touch detector SE1 include, but are not limited to, a sensor using a capacitive method and a sensor using a resistive film method. Examples of the capacitive method include a mutual-capacitive method and a self-capacitive method.

The display portion DP displays an image toward the input surface IS. Examples of the display portion DP include, but are not limited to, a liquid crystal display device and an organic electro-luminescence display device.

The touch detector SE1 and the display portion DP may be integrated into a device of what is called in-cell type or hybrid type. Alternatively, the touch detector SE1 and the display portion DP may constitute a device of what is called on-cell type obtained by mounting the touch detector SE1 on the display portion DP.

The force detector SE2 detects a force applied to the input surface IS by a detection target object OBJ. To be specific, the force detector SE2 outputs, to the controller CTRL, a signal in accordance with the force applied to the input surface IS by a detection target object OBJ.

The force detector SE2 is, for example, a capacitive sensor.

The controller CTRL calculates a force signal value indicating the force based on the signal output from the force detector SE2.

The controller CTRL includes a display controller 11, a detection controller 200, and a host HST. The detection controller 200 includes a touch detection controller 40 and a force detection controller 50.

The display controller 11 is, for example, an IC chip mounted on a glass substrate of the display portion DP. The detection controller 200 is, for example, an IC chip mounted on a printed substrate (for example, a flexible printed substrate) coupled to the glass substrate of the display portion DP. The host HST is, for example, a central processing unit (CPU). The display controller 11, the detection controller 200, and the host HST control the touch detector SE1, the display portion DP, and the force detector SE2 while cooperating with each other.

The display controller 11, the detection controller 200, or the host HST may perform processing for calculating the force signal value that the controller CTRL performs. Two or more of the display controller 11, the detection controller 200, and the host HST may perform the processing while cooperating with each other.

Hereinafter, specific configuration examples of the touch detector SE1, the display portion DP, and the force detector SE2 will be described but these configuration examples are merely examples and do not limit the embodiments.

1-1. Configuration Example of Touch Detector and Display Portion

Figure 2:
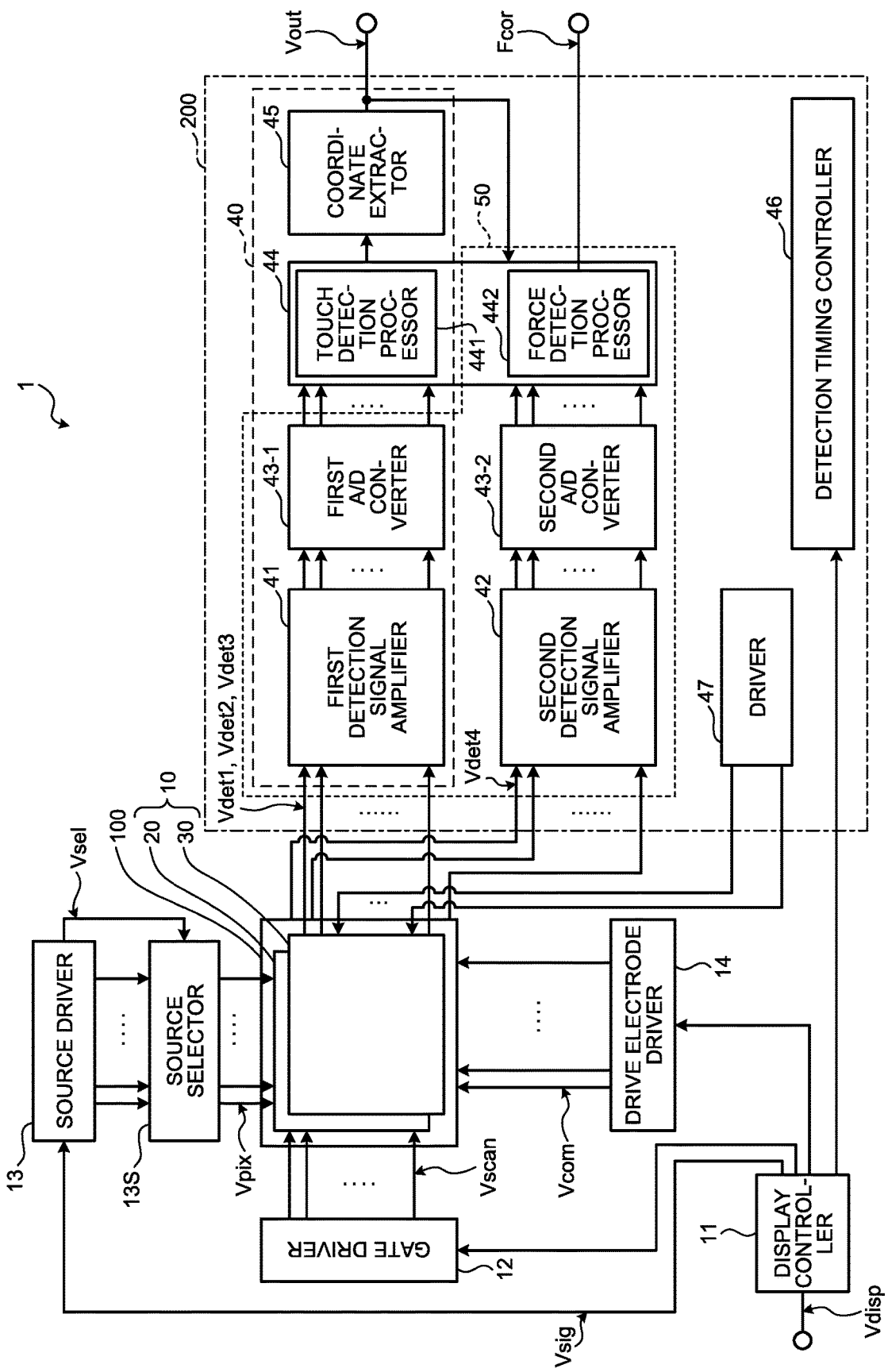
FIG. 2 is a block diagram illustrating a configuration example of a touch detector and a display portion of the display device with a touch detection function according to the first embodiment.

FIG. 2 is a block diagram illustrating a configuration example of the touch detector and the display portion of the display device with a touch detection function according to the first embodiment. The display device with a touch detection function 1 illustrated in FIG. 2 detects coordinates and a contact area of the detection target object OBJ using the mutual-capacitive method and the self-capacitive method. The display device with a touch detection function 1 illustrated in FIG. 2 detects a force applied to the input surface IS when a detection target object OBJ is in contact with the input surface IS using the mutual-capacitive method.

The display device with a touch detection function 1 includes a display portion with a touch detection function 10, the display controller 11, a gate driver 12, a source driver 13, a source selector 13S, a drive electrode driver 14, a force detection device 100, and the detection controller 200.

The display portion with a touch detection function 10 is a device of what is called an in-cell type or a hybrid type configured by incorporating a capacitive touch detection device 30 into a liquid crystal display device 20 using a liquid crystal display element as a display element such that the liquid crystal display device 20 and the capacitive touch detection device 30 are integrated. To incorporate the capacitive touch detection device 30 into the liquid crystal display device 20 such that these devices are integrated, for example, some members such as substrates and electrodes may be used for both the liquid crystal display device 20 and the touch detection device 30.

The liquid crystal display device 20 corresponds to the display portion DP in FIG. 1. The touch detection device 30 corresponds to the touch detector SE1 in FIG. 1. The force detection device 100 corresponds to the force detector SE2 in FIG. 1.

The display portion with a touch detection function 10 may be a device of what is called an on-cell type configured by mounting the capacitive touch detection device 30 on the liquid crystal display device 20 using the liquid crystal display element as the display element. When the display portion with a touch detection function 10 is the device of the on-cell type, the touch detection device 30 may be provided directly on the liquid crystal display device 20 or may be provided not directly on the liquid crystal display device 20 but above it with an intervening layer in between.

The liquid crystal display device 20 performs display by sequentially scanning each horizontal line in accordance with a scan signal Vscan supplied from the gate driver 12 as will be described later.

The display controller 11 is a circuit that supplies a control signal to each of the gate driver 12, the source driver 13, the drive electrode driver 14, and the detection controller 200 based on a video signal Vdisp supplied from the host HST to control such that these devices operate in synchronization with one another. The display controller 11 generates image signals Vsig by time division multiplexing of pixel signals Vpix for a plurality of sub pixels SPix of the liquid crystal display device 20 from the video signal Vdisp for one horizontal line and supplies the image signals Vsig to the source driver 13.

The controller CTRL includes the display controller 11, the gate driver 12, the source driver 13, and the drive electrode driver 14. Although the display controller 11 and the drive electrode driver 14 correspond to a "driver" in the first embodiment, the drive electrode driver 14 may correspond to the driver.

The gate driver 12 has a function of sequentially selecting one horizontal line as a display drive target of the display portion with a touch detection function 10 based on the control signal supplied from the display controller 11.

The source driver 13 is a circuit that supplies the pixel signals Vpix to respective pixels Pix (sub pixels SPix) of the display portion with a touch detection function 10 based on the control signal supplied from the display controller 11. The source driver 13 is supplied with the image signals Vsig of 6 bits for red (R), green (G), and blue (B), for example.

The source driver 13 receives the image signals Vsig from the display controller 11 and supplies them to the source selector 13S. The source driver 13 generates switch control signals Vsel necessary for separating the pixel signals Vpix multiplexed on the image signals Vsig and supplies the switch control signals Vsel to the source selector 13S together with the pixel signals Vpix. The source selector 13S can reduce the number of pieces of wiring between the source driver 13 and the display controller 11. The source selector 13S may not be provided. The display controller 11 may perform a part of control of the source driver 13, and only the source selector 13S may be arranged in the display controller 11.

The drive electrode driver 14 is a circuit that supplies drive signals Vcom to drive electrodes COML, which will be described later, of the display portion with a touch detection function 10 based on the control signal supplied from the display controller 11. The drive signals Vcom include a drive signal Vcomtm for touch detection (touch detection drive signal, hereinafter referred to as a drive signal) using the mutual-capacitive method, a drive signal Vcomts2 for touch detection using the self-capacitive method, and display drive voltage VcomDC as voltage for display.

The detection controller 200 includes a driver 47 for supplying a drive signal Vcomts1 to touch detection electrodes TDL, which will be described later, when the touch detection controller 40 performs a touch detection operation using the self-capacitive method.

The touch detection device 30 operates based on the basic principle of the mutual-capacitive touch detection, and the touch detection electrodes TDL output touch detection signals Vdet1. The touch detection device 30 operates based on the basic principle of the self-capacitive touch detection, and the touch detection electrodes TDL output touch detection signals Vdet2. The touch detection device 30 operates based on the basic principle of the self-capacitive touch detection, and the drive electrodes COML output touch detection signals Vdet3.

The touch detection device 30 can perform the touch detection using the mutual-capacitive method alone. The touch detection device 30 however performs both of the mutual-capacitive touch detection and the self-capacitive touch detection in the first embodiment to suitably reduce influences of water droplets and the like adhering to the input surface IS and suitably detect the stylus pen or the like. The embodiment is not however limited to the case in which both of the mutual-capacitive touch detection and the self-capacitive touch detection are performed.

The force detection device 100 operates based on the basic principle of mutual-capacitive force detection, and electrodes SUS, which will be described later, output force detection signals Vdet4.

The basic principle of the mutual-capacitive touch detection performed by the display device with a touch detection function 1 will be described with reference to FIG. 3 to FIG. 5.

Figure 3:
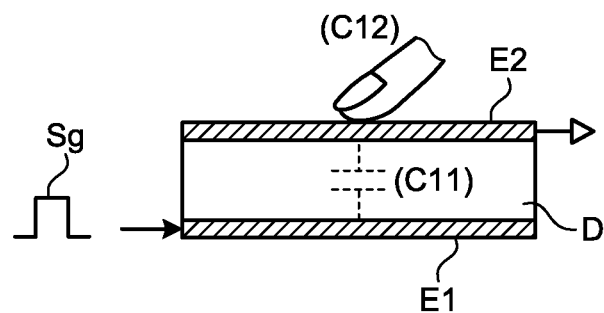
FIG. 3 is an explanatory diagram illustrating a contact or proximity state of a detection target object for explaining the basic principle of mutual-capacitive touch detection.

FIG. 3 is an explanatory diagram illustrating a contact or proximity state of a detection target object for explaining the basic principle of the mutual-capacitive touch detection. FIG. 4 is an explanatory diagram illustrating an example of an equivalent circuit of the mutual-capacitive touch detection. FIG. 5 is an explanatory diagram illustrating exemplary waveforms of a drive signal and detection signals in the mutual-capacitive touch detection. FIG. 4 illustrates a detection circuit together.

As illustrated in FIG. 3, for example, a capacitive element C11 includes a drive electrode E1 and a touch detection electrode E2 as a pair of electrodes arranged so as to face each other with a dielectric body D interposed therebetween. As illustrated in FIG. 4, one end of the capacitive element C11 is coupled to an alternating-current (AC) signal source (drive signal source) S and the other end thereof is coupled to a voltage detector (touch detector) DET. The voltage detector DET is, for example, an integration circuit included in a first detection signal amplifier 41 illustrated in FIG. 2.

When an AC rectangular wave Sg having a predetermined frequency (for example, several kHz to several hundred kHz) is applied to the drive electrode E1 (one end of the capacitive element C11) from the AC signal source S, an output waveform (touch detection signal Vdet1) appears through the voltage detector DET coupled to the touch detection electrode E2 (the other end of the capacitive element C11). The AC rectangular wave Sg corresponds to the drive signal Vcomtm, which will be described later.

In a non-contact (or non-proximity) state of a detection target object OBJ (non-contact state), a current $I_0$ in accordance with a capacitance value of the capacitive element C11 flows with charge and discharge of the capacitive element C11. As illustrated in FIG. 5, the voltage detector DET converts fluctuation in the current $I_0$ in accordance with the AC rectangular wave Sg into fluctuation in voltage (waveform $V_0$ indicated with a solid line).

On the other hand, in the contact (or proximity) state of a detection target object OBJ (contact state), as illustrated in FIG. 3, capacitance C12 generated with a finger is in contact with or is present in the vicinity of the touch detection electrode E2. This reduces capacitance in a fringe between the drive electrode E1 and the touch detection electrode E2, and a capacitive element C11' having a smaller capacitance value than the capacitance value of the capacitive element C11 acts. In the equivalent circuit illustrated in FIG. 4, a current $I_1$ flows through the capacitive element C11'.

Figure 5:
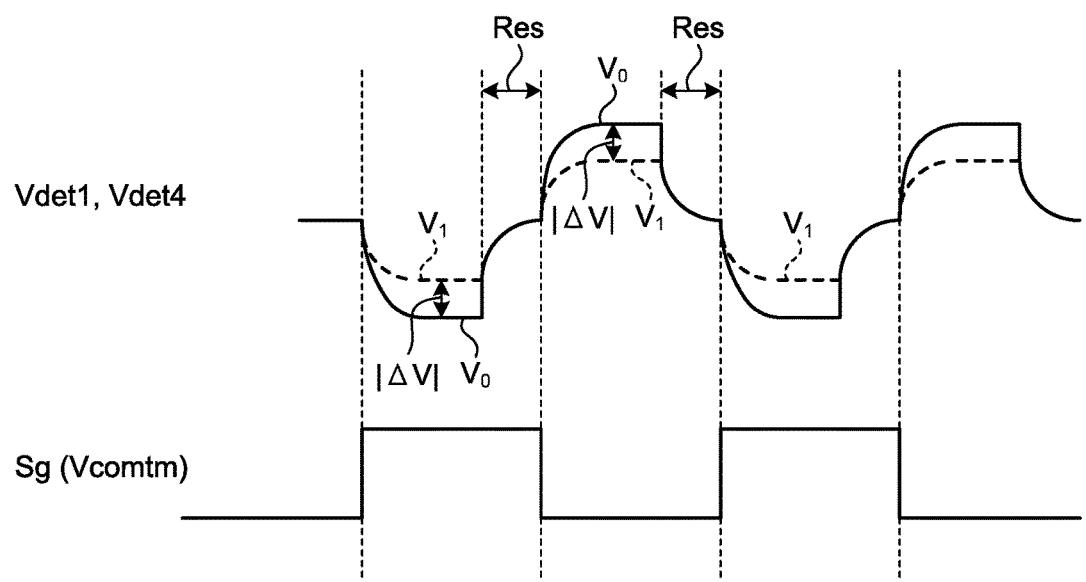
FIG. 5 is a chart illustrating exemplary waveforms of a drive signal and detection signals in the mutual-capacitive touch detection.

As illustrated in FIG. 5, the voltage detector DET converts fluctuation in the current $I_1$ in accordance with the AC rectangular wave Sg into fluctuation in voltage (waveform $V_1$ indicated with a dashed line). In this case, the waveform $V_1$ has an amplitude smaller than that of the above-mentioned waveform $V_0$. An absolute value $|\Delta V|$ of voltage difference between the waveform $V_0$ and the waveform $V_1$ varies with influences of the detection target object OBJ. To detect the absolute value $|\Delta V|$ of the voltage difference between the waveform $V_0$ and the waveform $V_1$ with high accuracy, the voltage detector DET preferably operates with a reset period Res for resetting charge and discharge of a capacitor in accordance with the frequency of the AC rectangular wave Sg by switching in the circuit.

With reference to FIG. 2 again, the touch detection device 30 performs sequentially scanning each drive electrode COML in accordance with the drive signal Vcomtm supplied from the drive electrode driver 14 and outputs the touch detection signals Vdet1.

Next, the basic principle of the self-capacitive touch detection performed by the display device with a touch detection function 1 in the configuration example will be described with reference to FIG. 6 to FIG. 9.

Figure 6:
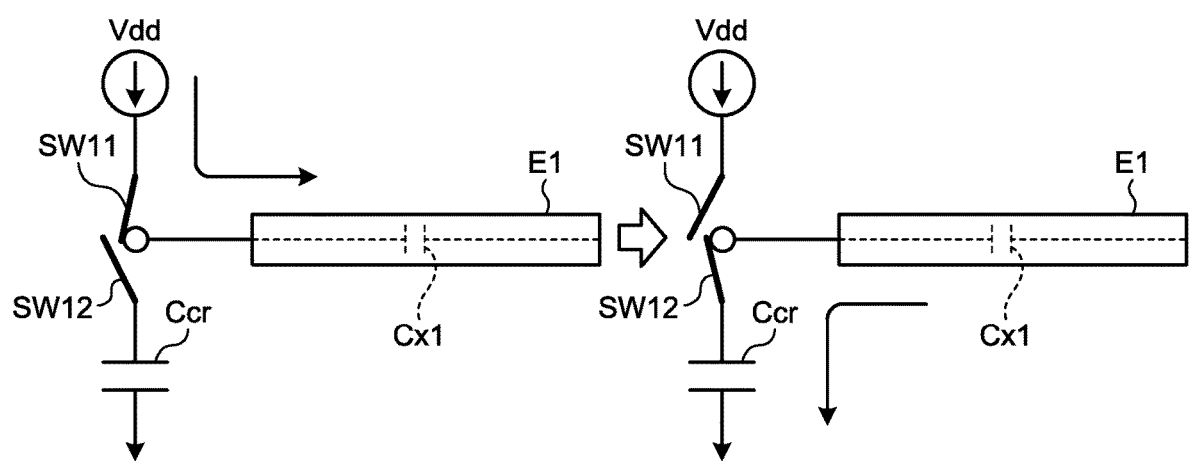
FIG. 6 is an explanatory diagram illustrating a non-contact or non-proximity state of a detection target object for explaining the basic principle of self-capacitive touch detection.
Figure 7:
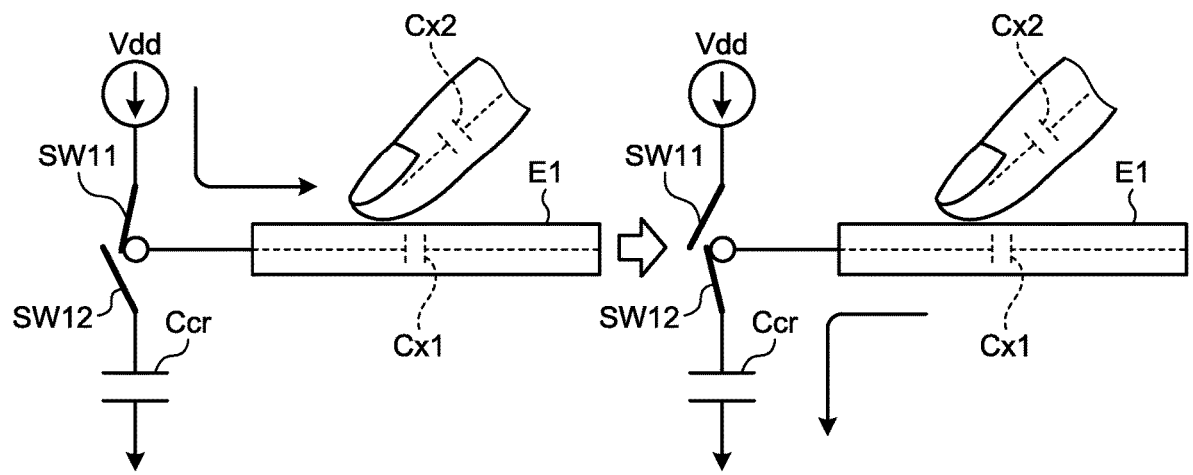
FIG. 7 is an explanatory diagram illustrating a contact or proximity state of a detection target object for explaining the basic principle of the self-capacitive touch detection.
Figure 8:
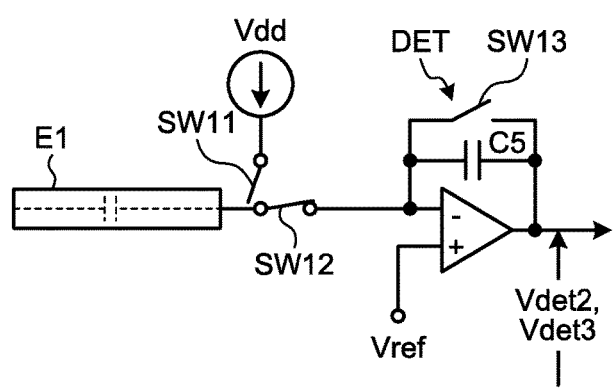
FIG. 8 is an explanatory diagram illustrating an example of an equivalent circuit of the self-capacitive touch detection.
Figure 9:
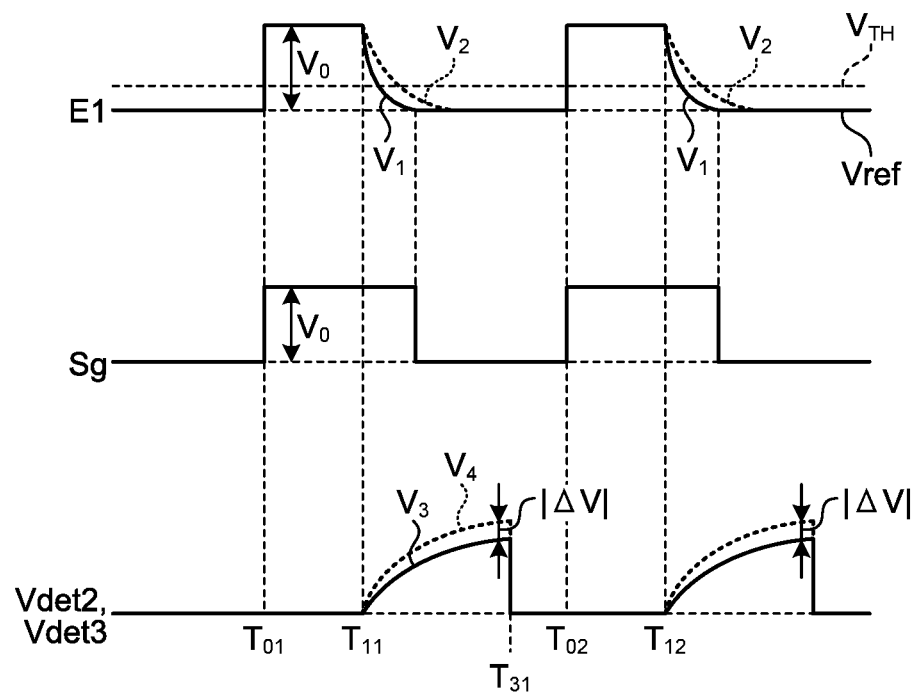
FIG. 9 is a chart illustrating exemplary waveforms of a drive signal and detection signals in the self-capacitive touch detection.

FIG. 6 is an explanatory diagram illustrating the non-contact or non-proximity state of a detection target object OBJ for explaining the basic principle of the self-capacitive touch detection. FIG. 7 is an explanatory diagram illustrating the contact or proximity state of a detection target object for explaining the basic principle of the self-capacitive touch detection. FIG. 8 is an explanatory diagram illustrating an example of an equivalent circuit of the self-capacitive touch detection. FIG. 9 is an explanatory diagram illustrating exemplary waveforms of a drive signal and detection signals in the self-capacitive touch detection.

The left diagram in FIG. 6 illustrates a state in which a switch SW11 couples a power supply Vdd and a detection electrode E1 and a switch SW12 does not couple the detection electrode E1 to a capacitor Ccr in the non-contact or non-proximity state of the detection target object OBJ. In this state, the detection electrode E1 is charged to a capacitance Cx1. The right diagram in FIG. 6 illustrates a state in which the switch SW11 uncouples the power supply Vdd from the detection electrode E1 and the switch SW12 couples the detection electrode E1 and the capacitor Ccr. In this state, the electric charge of the capacitance Cx1 is discharged through the capacitor Ccr.

The left diagram in FIG. 7 illustrates a state in which the switch SW11 couples the power supply Vdd and the detection electrode E1 and the switch SW12 does not couple the detection electrode E1 to the capacitor Ccr in the contact or proximity state of the detection target object OBJ. In this state, in addition to the capacitance Cx1 of the detection electrode E1, capacitance Cx2 generated by the detection target object OBJ in proximity to the detection electrode E1 is also charged. The right diagram in FIG. 7 illustrates a state in which the switch SW11 uncouples the power supply Vdd from the detection electrode E1 and the switch SW12 couples the detection electrode E1 and the capacitor Ccr. In this state, electric charges of the capacitance Cx1 and the capacitance Cx2 are discharged through the capacitor Ccr.

Voltage variation characteristics of the capacitor Ccr in discharging (in the contact or proximity state of the detection target object OBJ) illustrated in the right diagram in FIG. 7 obviously differ from voltage variation characteristics of the capacitor Ccr in discharging (in the non-contact or non-proximity state of the detection target object OBJ) illustrated in the right diagram in FIG. 6 because the capacitance Cx2 is present in the case illustrated in the right diagram in FIG. 7. Accordingly, in the self-capacitive method, the contact or proximity of the detection target object OBJ is determined using the difference in the voltage variation characteristics of the capacitor Ccr depending on the presence of the capacitance Cx2.

To be specific, AC rectangular wave Sg (see FIG. 9) having a predetermined frequency (for example, several kHz to several hundred kHz) is applied to the detection electrode E1. A voltage detector DET illustrated in FIG. 8 converts fluctuation in current according to the AC rectangular wave Sg into fluctuation in voltage (waveforms $V_3$ and $V_4$). The voltage detector DET is, for example, the integration circuit included in the first detection signal amplifier 41 illustrated in FIG. 2.

As described above, the switch SW11 and the switch SW12 can isolate the detection electrode E1. In FIG. 9, the voltage level of the AC rectangular wave Sg is increased to a level corresponding to voltage $V_0$ at time $T_{01}$. In this case, the switch SW11 is on whereas the switch SW12 is off. The voltage of the detection electrode E1 is also therefore increased to the voltage $V_0$.

Then, the switch SW11 is turned off before time $T_{11}$. In this case, although the detection electrode E1 is in a floating state, the potential of the detection electrode E1 is kept at $V_0$ by the capacitance Cx1 (see FIG. 6) of the detection electrode E1 or capacitance (Cx1+Cx2, see FIG. 7) provided by adding the capacitance Cx2 with the contact or proximity of the detection target object OBJ to the capacitance Cx1 of the detection electrode E1. Furthermore, a switch SW13 is turned on before time $T_{11}$ and is turned off after a lapse of a predetermined period of time to reset the voltage detector DET. The reset operation causes output voltage (touch detection signal) Vdet of the voltage detector DET to be substantially equal to reference voltage Vref.

Subsequently, when the switch SW12 is turned on at time $T_{11}$, the voltage of an inverted input terminal of the voltage detector DET becomes the voltage $V_0$ of the detection electrode E1. Thereafter, the voltage level of the inverted input terminal of the voltage detector DET is lowered to the reference voltage Vref in accordance with time constants of the capacitance Cx1 (or Cx1+Cx2) of the detection electrode E1 and capacitance C5 in the voltage detector DET. In this case, the electric charge of the capacitance Cx1 (or Cx1+Cx2) of the detection electrode E1 moves to the capacitance C5 in the voltage detector DET, so that output voltages (touch detection signals) Vdet2 and Vdet3 of the voltage detector DET are increased.

When no detection target object OBJ is in proximity to the detection electrode E1, the output voltage Vdet2 of the voltage detector DET takes the waveform $V_3$ indicated by a solid line, and Vdet2=Cx1×V0/C5 is satisfied. In the same manner, when no detection target object OBJ is in proximity to the detection electrode E1, the output voltage Vdet3 of the voltage detector DET takes the waveform $V_3$ indicated by the solid line, and Vdet3=Cx1×V0/C5 is satisfied.

When the capacitance with the influence of a detection target object OBJ is added, the output voltage Vdet2 of the voltage detector DET takes the waveform $V_4$ indicated by a dashed line, and Vdet2=(Cx1+Cx2)×V0/C5 is satisfied. In the same manner, when the capacitance with the influence of a detection target object OBJ is added, the output voltage Vdet3 of the voltage detector DET takes the waveform $V_4$ indicated by the dashed line, and Vdet3=(Cx1+Cx2)×V0/C5 is satisfied.

Thereafter, at time $T_{31}$ after the electric charge of the capacitance Cx1 (or Cx1+Cx2) of the detection electrode E1 sufficiently moves to the capacitance C5, the switch SW12 is turned off, and the switch SW11 and the switch SW13 are turned on. With these switching operations, the potential of the detection electrode E1 is set to a low level that is the same potential as that of the AC rectangular wave Sg, and the voltage detector DET is reset. The switch SW11 can be turned on at any time before time $T_{02}$ after the switch SW12 has been turned off. The voltage detector DET can be reset at any time before time $T_{12}$ after the switch SW12 has been turned off.

The above-mentioned operations are repeated with a predetermined frequency (for example, several kHz to several hundred kHz). The presence of a detection target object OBJ (presence of touch) can be detected based on the absolute value |ΔV| of the difference between the waveform $V_3$ and the waveform $V_4$. As illustrated in FIG. 9, the potential of the detection electrode E1 takes a waveform $V_1$ when no detection target object OBJ is in proximity to and takes a waveform $V_2$ when the capacitance Cx2 with the influence of a detection target object OBJ is added. The presence of the external proximity object (presence of touch) can also be determined by measuring periods of time until the waveform $V_1$ and the waveform $V_2$ are lowered to a threshold voltage $V_{TH}$.

In the first embodiment, the touch detection device 30 performs the self-capacitive touch detection by supply of electric charges to the touch detection electrodes TDL in accordance with the drive signal Vcomts1 supplied from the driver 47 illustrated in FIG. 2, and the touch detection electrodes TDL output the touch detection signals Vdet2. The touch detection device 30 performs the self-capacitive touch detection by supply of electric charges to the drive electrodes COML in accordance with the drive signal Vcomts2 supplied from the drive electrode driver 14 illustrated in FIG. 2, and the drive electrodes COML output the touch detection signals Vdet3.

With reference to FIG. 2 again, the detection controller 200 detects presence of a touch (the above-mentioned contact state) onto the input surface IS based on the control signal supplied from the display controller 11 and the touch detection signals Vdet1, Vdet2, and Vdet3 supplied from the touch detection device 30 of the display portion with a touch detection function 10. The detection controller 200 detects a force applied to the input surface IS based on the force detection signals Vdet4 supplied from the force detection device 100. The detection controller 200 is a circuit that calculates the coordinates and the contact area in a touch detection region when the touch is detected.

The detection controller 200 includes the first detection signal amplifier 41, a second detection signal amplifier 42, a first analog-to-digital (A/D) converter 43-1, a second A/D converter 43-2, a signal processor 44, a coordinate extractor 45, and a detection timing controller 46. The signal processor 44 includes a touch detection processor 441 and a force detection processor 442. The first detection signal amplifier 41, the first A/D converter 43-1, the coordinate extractor 45, and the touch detection processor 441 are included in the configuration of the touch detection controller 40. The first detection signal amplifier 41, the second detection signal amplifier 42, the first A/D converter 43-1, the second A/D converter 43-2, and the force detection processor 442 are included in the configuration of the force detection controller 50.

The touch detection controller 40 is a component that detects a position of contact with or proximity to the input surface IS by a detection target object OBJ.

The force detection controller 50 is a component that detects a force applied to the input surface IS by the detection target object OBJ.

In the mutual-capacitive touch detection, the touch detection device 30 outputs the touch detection signals Vdet1 from the touch detection electrodes TDL, which will be described later, through the voltage detector DET illustrated in FIG. 4, and supplies the touch detection signals Vdet1 to the first detection signal amplifier 41 of the detection controller 200.

In the self-capacitive touch detection, the touch detection device 30 outputs the touch detection signals Vdet2 from the touch detection electrodes TDL, which will be described later, through the voltage detector DET illustrated in FIG. 8, and supplies the touch detection signals Vdet2 to the first detection signal amplifier 41 of the detection controller 200. In the self-capacitive touch detection, the touch detection device 30 outputs the touch detection signals Vdet3 from the drive electrodes COML, which will be described later, through the voltage detector DET illustrated in FIG. 8, and supplies the touch detection signals Vdet3 to the first detection signal amplifier 41 of the detection controller 200.

In the mutual-capacitive force detection, the force detection device 100 outputs the force detection signals Vdet4 from the electrodes SUS, which will be described later, through the voltage detector DET illustrated in FIG. 4, and supplies the force detection signals Vdet4 to the second detection signal amplifier 42 of the detection controller 200.

The first detection signal amplifier 41 amplifies the touch detection signals Vdet1, Vdet2, and Vdet3 supplied from the touch detection device 30. The touch detection signals Vdet1, Vdet2, and Vdet3 amplified by the first detection signal amplifier 41 are supplied to the first A/D converter 43-1. The first detection signal amplifier 41 may include a low-pass analog filter that removes high-frequency components (noise components) contained in the touch detection signals Vdet1, Vdet2, and Vdet3 to extract and output touch detection components. The detection controller 200 may not include the first detection signal amplifier 41. That is to say, the touch detection signals Vdet1, Vdet2, and Vdet3 from the touch detection device 30 may be supplied to the first A/D converter 43-1.

The second detection signal amplifier 42 amplifies the force detection signals Vdet4 supplied from the force detection device 100. The force detection signals Vdet4 amplified by the second detection signal amplifier 42 are supplied to the second A/D converter 43-2. The second detection signal amplifier 42 may include a low-pass analog filter that removes high-frequency components (noise components) contained in the force detection signals Vdet4 to extract and output force detection components. The detection controller 200 may not include the second detection signal amplifier 42. That is to say, the force detection signals Vdet4 from the force detection device 100 may be supplied to the second A/D converter 43-2.

The first A/D converter 43-1 is a circuit that samples analog signals output from the first detection signal amplifier 41 at intervals in synchronization with the drive signals Vcomtm, Vcomts1, and Vcomts2 and converts the sampled signals into digital signals.

The second A/D converter 43-2 is a circuit that samples analog signals output from the second detection signal amplifier 42 at intervals in synchronization with the drive signal Vcomtm and converts the sampled signals into digital signals.

The signal processor 44 includes a digital filter that reduces frequency components (noise components) other than the frequencies at which the touch detection signals Vdet1, Vdet2, and Vdet3, and the force detection signals Vdet4 are sampled, the components being contained in the output signals from the first A/D converter 43-1 and the second A/D converter 43-2.

The signal processor 44 is a logic circuit that performs touch detection processing of detecting presence of touch onto the input surface IS based on the output signals from the first A/D converter 43-1 and force detection processing of detecting a force applied to the input surface IS.

The signal processor 44 performs processing of extracting only differential signals caused by the finger. The differential signal caused by the finger is the above-mentioned absolute value $|\Delta V|$ between the waveform $V_0$ and the waveform $V_1$.

The signal processor 44 may perform operation of averaging the absolute values $|\Delta V|$ between the waveform $V_0$ and the waveform $V_1$ to derive an average value of the absolute values $|\Delta V|$. The signal processor 44 can thereby reduce influences of noise.

The signal processor 44 compares the detected differential signal with a predetermined threshold voltage $V_{TH}$ and determines the contact state of the external proximity object when the detected differential signal is equal to or higher than the threshold voltage $V_{TH}$.

On the other hand, the signal processor 44 compares the detected differential signal with the predetermined threshold voltage $V_{TH}$ and determines the non-contact state of the external proximity object when the detected differential signal is lower than the threshold voltage $V_{TH}$. In this manner, the touch detection controller 40 of the detection controller 200 can perform the touch detection.

The display device with a touch detection function 1 according to the first embodiment simultaneously performs the mutual-capacitive touch detection and the force detection. That is to say, the signal processor 44 performs the force detection processing, which will be described later, simultaneously with the mutual-capacitive touch detection.

The coordinate extractor 45 is a logic circuit that determines coordinates of a touch detection position in the input surface IS when the signal processor 44 detects a touch onto the input surface IS and detects a force applied to the input surface IS. The detection timing controller 46 controls the first A/D converter 43-1, the second A/D converter 43-2, the signal processor 44, and the coordinate extractor 45 to operate them in synchronization with one another. The coordinate extractor 45 outputs the coordinates of the touch detection position as a touch detection position Vout.

The force detection controller 50 receives the touch detection position Vout output from the coordinate extractor 45 of the touch detection controller 40. The force detection controller 50 corrects a force detection value using the touch detection position Vout output from the coordinate extractor 45 of the touch detection controller 40.

Figure 10:
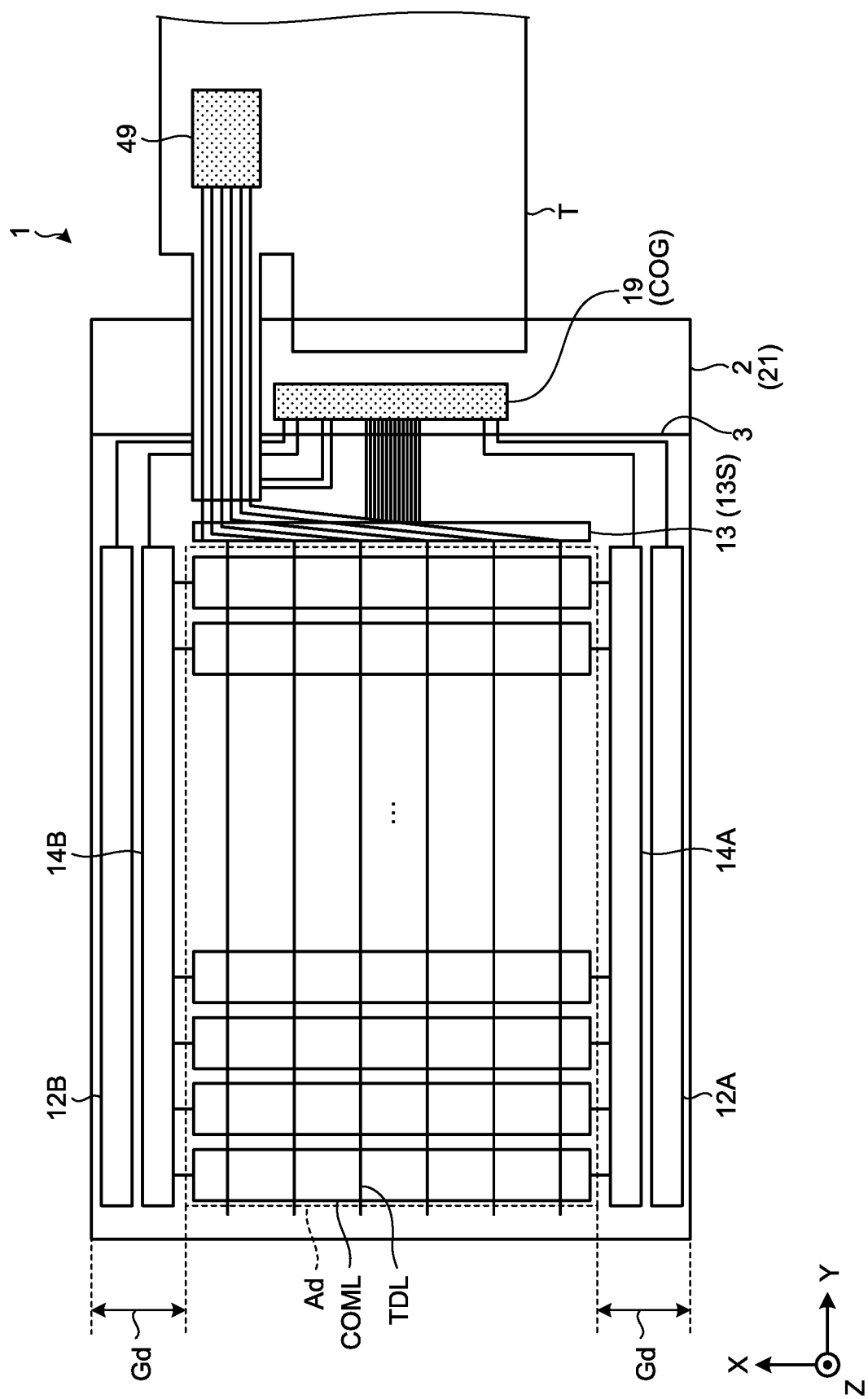
FIG. 10 is a diagram illustrating an example of a module in which the display device with a touch detection function according to the first embodiment is mounted.

FIG. 10 is a diagram illustrating an example of a module in which the display device with a touch detection function of the first embodiment is mounted. The display device with a touch detection function 1 includes a substrate (for example, a pixel substrate 2) and a printed substrate (for example, a flexible printed substrate) T.

The pixel substrate 2 has a second substrate 21. The second substrate 21 is, for example, a glass substrate or a film substrate. A drive IC chip (for example, chip on glass (COG) 19) is mounted on the second substrate 21. A display region Ad and frames Gd of the liquid crystal display device 20 are arranged on the pixel substrate (second substrate 21).

The COG 19 is an IC chip as a driver mounted on the second substrate 21 and is a control device incorporating therein circuits necessary for a display operation, such as the display controller 11 illustrated in FIG. 2.

In the first embodiment, the source driver 13 and the source selector 13S are disposed on the second substrate 21. The source driver 13 and the source selector 13S may be incorporated in the COG 19.

Drive electrode scanners 14A and 14B as parts of the drive electrode driver 14 are disposed on the second substrate 21.

The gate driver 12 is disposed on the second substrate 21 as gate drivers 12A and 12B.

The display device with a touch detection function 1 may include circuits such as the drive electrode scanners 14A and 14B and the gate driver 12 in the COG 19. The COG 19 is merely one mode of mounting, and the embodiment is not limited thereto. For example, a configuration having the same function as that of the COG 19 may be mounted on the flexible printed substrate T as a chip on film or a chip on flexible (COF).

As illustrated in FIG. 10, the drive electrodes COML and the touch detection electrodes TDL are arranged so as to cross each other at different levels in a direction perpendicular to a surface of the second substrate 21.

The drive electrodes COML are divided into a plurality of stripe-like electrode patterns extending in one direction. When the mutual-capacitive touch detection operation is performed, the drive electrode driver 14 sequentially supplies the drive signal Vcomtm to the electrode patterns. When the self-capacitive touch detection operation is performed, the drive electrode driver 14 sequentially supplies the drive signal Vcomts2 to the electrode patterns.

In the example illustrated in FIG. 10, the drive electrodes COML extend in a direction parallel with the short sides of the display portion with a touch detection function 10. The touch detection electrodes TDL, which will be described later, extend in a direction intersecting with the extension direction of the drive electrodes COML. The touch detection electrodes TDL extend, for example, in a direction parallel with the long sides of the display portion with a touch detection function 10. The drive electrodes COML may extend in the direction parallel with the long sides of the display portion with a touch detection function 10, and the touch detection electrodes TDL may extend in the direction intersecting with the extension direction of the drive electrodes COML, for example, in the direction parallel with the short sides of the display portion with a touch detection function 10. In this example, the sides parallel with the X-axis direction are the short sides, and the sides parallel with the Y-axis direction are the long sides in FIG. 10. The sides parallel with the X-axis direction may be the long sides, and the sides parallel with the Y-axis direction may be the short sides.

The touch detection electrodes TDL are coupled to a touch IC 49 mounted on the flexible printed substrate T coupled to the short side of the display portion with a touch detection function 10. The touch IC 49 is an IC chip serving as a driver mounted on the flexible printed substrate T and is a control device incorporating therein circuits necessary for the touch detection operation and the force direction operation, such as the detection controller 200 illustrated in FIG. 2.

As described above, the touch IC 49 is mounted on the flexible printed substrate T and is coupled to the touch detection electrodes TDL arranged parallel to each other. It is sufficient that the flexible printed substrate T is a terminal and not limited to the substrate. In this case, the touch IC 49 is provided outside the module. The touch IC 49 is not limited to be arranged on the flexible printed substrate T and may be arranged on the second substrate 21 or a first substrate 31, which will be described later.

Although the touch IC 49 is a control device functioning as the detection controller 200 in the first embodiment, some functions of the detection controller 200, for example, some functions of the touch detection controller 40 or the force detection controller 50 may be provided as functions of another micro processing unit (MPU).

To be specific, among various functions such as A/D conversion and noise removal provided as the functions of the IC chip as the touch driver, some functions (for example, noise removal) may be performed by a circuit such as an MPU provided separately from the IC chip as the touch driver. As in the case in which a driver is provided as one IC chip (one chip configuration) and so on, detection signals may be transmitted to the IC chip as the touch driver on an array substrate through wiring on the flexible printed substrate T, for example.

The source selector 13S includes a TFT element and arranged in the vicinity of the display region Ad on the second substrate 21. A plurality of pixels Pix, which will be described later, are arranged in the display region Ad in a matrix form with the row-column configuration. The frames Gd are regions in which no pixel Pix is arranged when the surface of the second substrate 21 is viewed from the perpendicular direction. The gate driver 12 and the drive electrode scanners 14A and 14B of the drive electrode driver 14 are arranged in the frames Gd.

The gate driver 12 includes, for example, the gate drivers 12A and 12B. The gate driver 12 is fabricated from TFT elements and arranged on the second substrate 21. The gate drivers 12A and 12B are respectively arranged at both sides of the display region Ad in which the sub pixels SPix (pixels) are arranged in a matrix form with the row-column configuration such that the gate drivers 12A and 12B can drive the sub pixels SPix from the both sides thereof. Scan lines are therefore aligned between the gate driver 12A and the gate driver 12B. The scan lines are therefore provided so as to extend in the direction parallel with the extension direction of the drive electrodes COML, in the direction perpendicular to the surface of the second substrate 21.

Although the two circuits of the gate drivers 12A and 12B are provided as the gate driver 12 in the first embodiment, this configuration is an example of the specific configuration of the gate driver 12 and does not limit the configuration of the gate driver 12. The gate driver 12 may be configured as, for example, one circuit provided at only one end of each of the scan lines.

The drive electrode driver 14 includes, for example, the drive electrode scanners 14A and 14B and is formed using TFT elements on the second substrate 21. The drive electrode scanners 14A and 14B receive the display drive voltage VcomDC and the drive signals Vcomtm and Vcomts2 from the COG 19. The drive electrode scanners 14A and 14B can drive, from both sides, the drive electrodes COML arranged parallel to each other.

Although the two circuits of the drive electrode scanners 14A and 14B are provided as the drive electrode driver 14 in the first embodiment, this configuration is an example of the specific configuration of the drive electrode driver 14 and does not limit the configuration of the drive electrode driver 14. The drive electrode driver 14 may be configured as, for example, one circuit provided at only one end side of each of the drive electrodes COML.

The display device with a touch detection function 1 outputs the above-mentioned touch detection signals Vdet1, Vdet2, and Vdet3 from the short side of the display portion with a touch detection function 10. The display device with a touch detection function 1 thereby enables routing of wiring to be easily performed in coupling various components therein to the detection controller 200 through the flexible printed substrate T as a terminal portion.

Figure 11:
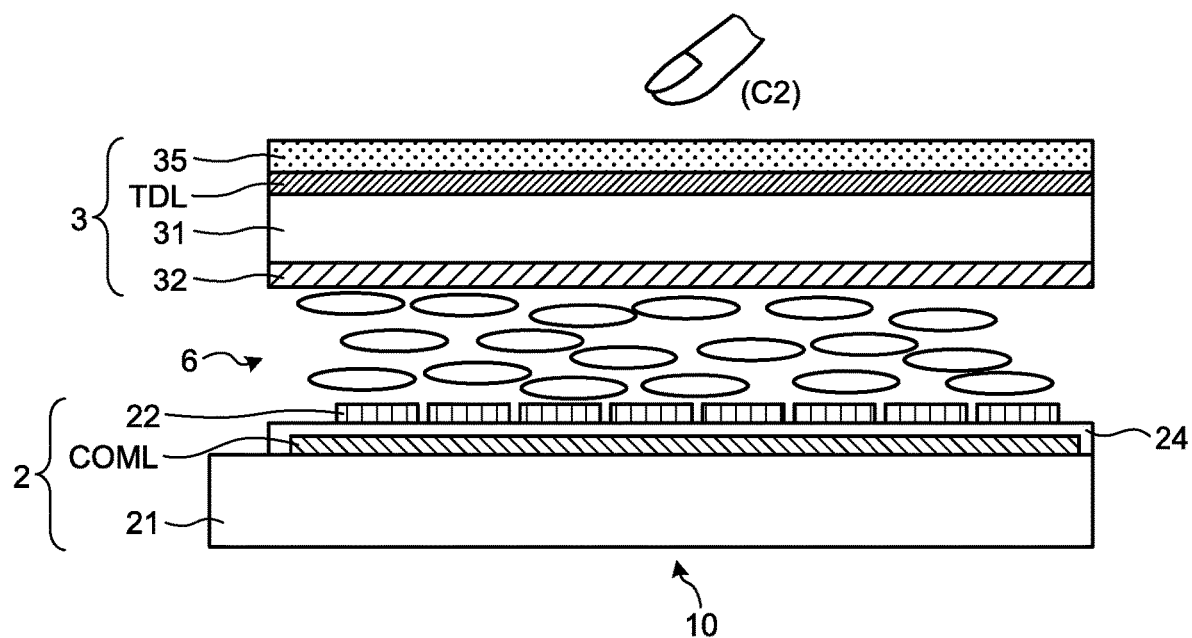
FIG. 11 is a schematic diagram illustrating a cross-sectional configuration of a display portion with a touch detection function.
Figure 12:
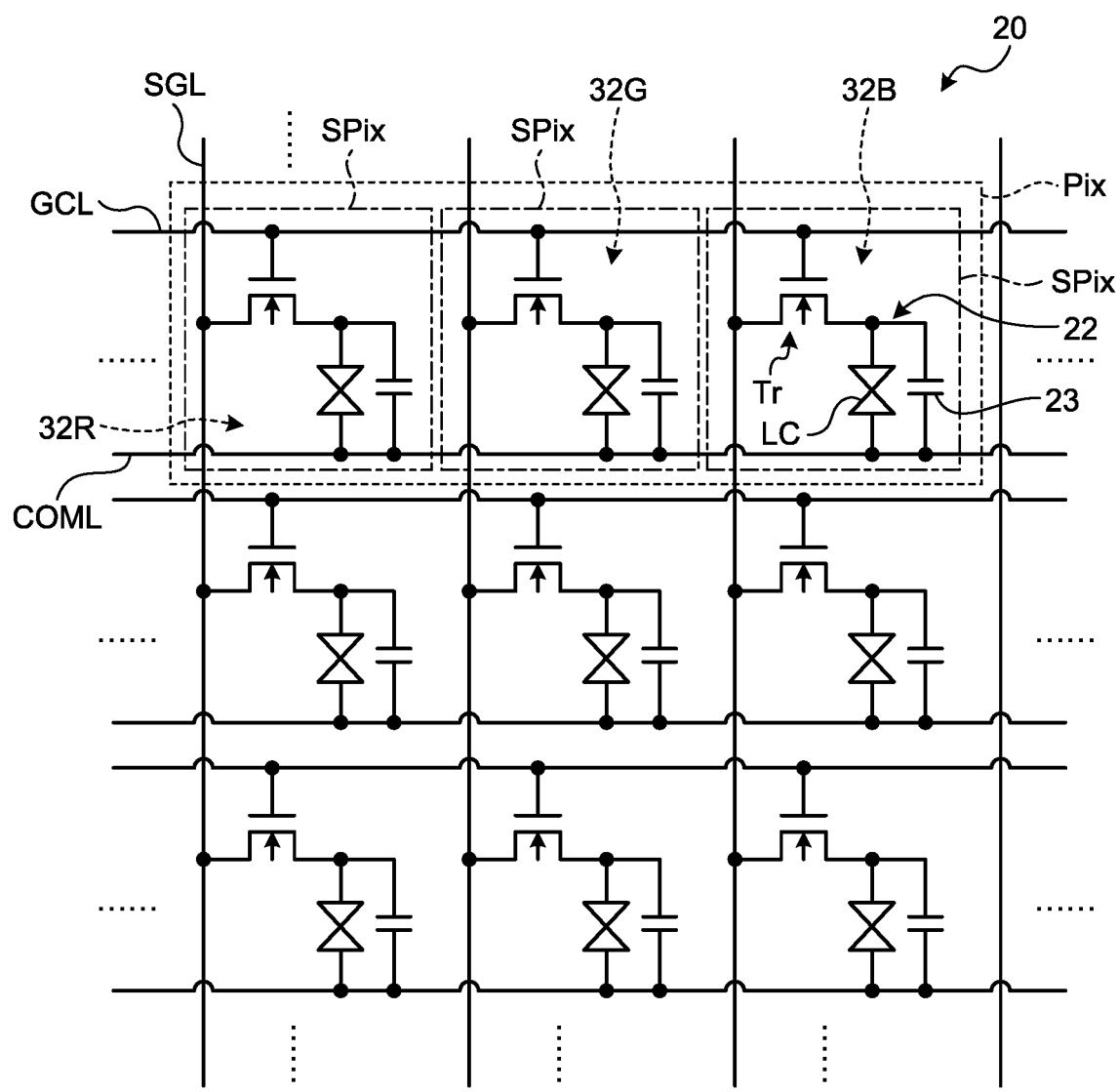
FIG. 12 is a circuit diagram illustrating a pixel array of the display portion with a touch detection function.

FIG. 11 is a schematic diagram illustrating a cross-sectional configuration of the display portion with a touch detection function. FIG. 12 is a circuit diagram illustrating a pixel array of the display portion with a touch detection function. The display portion with a touch detection function 10 includes the pixel substrate 2, a substrate (for example, a counter substrate 3) arranged so as to face the pixel substrate 2 in the direction perpendicular to the surface of the pixel substrate 2, and a display function layer (for example, a liquid crystal layer 6) inserted between the pixel substrate 2 and the counter substrate 3.

The pixel substrate 2 includes the second substrate 21 as a circuit substrate, a plurality of pixel electrodes 22 arranged on the second substrate 21 in a matrix form with the row-column configuration, the drive electrodes COML provided between the second substrate 21 and the pixel electrodes 22, and an insulating layer 24 insulating the pixel electrodes 22 and the drive electrodes COML from each other.

The second substrate is provided with thin film transistor (TFT) elements Tr of the respective sub pixels SPix illustrated in FIG. 12. The second substrate is also provided with wiring such as pixel signal lines SGL and scan signal lines GCL, the pixel signal lines SGL supplying the pixel signals Vpix to the pixel electrodes 22 illustrated in FIG. 12, and the scan signal lines GCL driving the TFT elements Tr illustrated in FIG. 12. The pixel signal lines SGL extend in a plane parallel with the surface of the second substrate 21 and supply the pixel signals Vpix for displaying an image to the sub pixels SPix. The sub pixel SPix is a constituent unit that is controlled by the pixel signal Vpix. The sub pixel SPix is a region surrounded by the pixel signal lines SGL and the scan signal lines GCL and is a constituent unit that is controlled by the TFT element Tr.

As illustrated in FIG. 12, the liquid crystal display device 20 has the sub pixels SPix arranged in the matrix form with the row-column configuration. Each sub pixel SPix includes the TFT element Tr, the pixel electrode 22, a liquid crystal element LC, and a holding capacitor 23. The TFT element Tr is fabricated from a thin film transistor, and in this example, is fabricated from an n-channel metal oxide semiconductor (MOS)-type TFT.

One of the source and drain of the TFT element Tr is coupled to the pixel signal line SGL, the gate thereof is coupled to the scan signal line GCL, and the other of the source and drain thereof is coupled to the pixel electrode 22. One end of the liquid crystal element LC is coupled to the pixel electrode 22 and the other end thereof is coupled to the drive electrode COML. The holding capacitor 23 holds voltage between the pixel electrode 22 and the drive electrode COML.

Although the pixel electrodes 22, the insulating layer 24, and the drive electrodes COML are stacked in this order on the second substrate 21 in FIG. 11, the arrangement order is not limited thereto. The drive electrodes COML, the insulating layer 24, and the pixel electrodes 22 may be stacked in this order on the second substrate 21, or the drive electrodes COML and the pixel electrodes 22 may be arranged in the same layer with the insulating layer 24 interposed therebetween.

The scan signal line GCL couples the sub pixels SPix to the other sub pixels SPix belonging to the same row in the liquid crystal display device 20. The scan signal lines GCL are coupled to the gate driver 12, and the gate driver 12 supplies the scan signal Vscan thereto.

The pixel signal line SGL couples the sub pixels SPix to the other sub pixels SPix belonging to the same column in the liquid crystal display device 20. The pixel signal lines SGL are coupled to the source driver 13, and the source driver 13 supplies the pixel signals Vpix thereto.

The drive electrode COML couples the sub pixels SPix to the other sub pixels SPix belonging to the same row in the liquid crystal display device 20. The drive electrodes COML are coupled to the drive electrode driver 14, and the drive electrode driver 14 supplies the drive signal Vcom thereto. That is to say, in this example, the sub pixels SPix belonging to the same row commonly use one drive electrode COML.

The direction in which the drive electrodes COML extend in the first embodiment is parallel with the direction in which the scan signal lines GCL extend. The direction in which the drive electrodes COML extend is however not limited thereto. The direction in which the drive electrodes COML extend may be, for example, parallel with the direction in which the pixel signal lines SGL extend. The direction in which the touch detection electrodes TDL extend is not limited to the direction in which the pixel signal lines SGL extend. The direction in which the touch detection electrodes TDL extend may be, for example, parallel with the direction in which the scan signal lines GCL extend.

The gate driver 12 illustrated in FIG. 2 applies the scan signal Vscan to the gates of the TFT elements Tr of the pixels Pix through each scan signal line GCL illustrated in FIG. 12 to thereby sequentially select, as the display drive target, one row (one horizontal line) of the sub pixels SPix arranged in the liquid crystal display device 20 in the matrix form with the row-column configuration.

The source driver 13 illustrated in FIG. 2 applies, through the pixel signal lines SGL illustrated in FIG. 12, the pixel signals Vpix to the respective pixels SPix belonging to one horizontal line that is sequentially selected by the gate driver 12. These sub pixels SPix perform display for one horizontal line in accordance with the supplied pixel signals Vpix.

The drive electrode driver 14 illustrated in FIG. 2 applies the drive signal Vcom to the drive electrodes COML to drive the drive electrodes COML on a block basis, each block including a predetermined number of drive electrodes COML.

As described above, in the liquid crystal display device 20, the gate driver 12 drives the scan signal line GCL to sequentially scan the scan signal line GCL in the time division manner, so that one horizontal line is sequentially selected. In the liquid crystal display device 20, the source driver 13 supplies the pixel signals Vpix to the sub pixels SPix belonging to the one horizontal line, so that display is performed for each horizontal line. In the display operation, the drive electrode driver 14 applies the drive signal Vcom to the block containing the drive electrodes COML corresponding to one horizontal line.

The liquid crystal layer 6 modulates light passing therethrough in accordance with a state of an electric field. When the drive electrodes COML are driven, voltage in accordance with the pixel signals Vpix supplied to the pixel electrodes 22 is applied to the liquid crystal layer 6 to generate the electric field. Liquid crystal of the liquid crystal layer 6 is thereby oriented in accordance with the electric field to modulate light passing through the liquid crystal layer 6.

In this manner, the pixel electrodes 22 and the drive electrodes COML function as pairs of electrodes generating the electric field in the liquid crystal layer 6. That is to say, the liquid crystal display device 20 functions as the display portion DP in which the display output varies depending on electric charges applied to the pairs of electrodes. The pixel electrodes 22 are arranged one for at least each pixel Pix or each sub pixel SPix, and the drive electrodes COML are arranged one for at least a predetermined number of pixels Pix or sub pixels SPix.

In the first embodiment, for example, a liquid crystal display device using liquid crystal in a transverse electric field mode such as in-plane switching (IPS) including fringe field switching (FFS) is used as the liquid crystal display device 20. An orientation film may be arranged between the liquid crystal layer 6 and the pixel substrate 2 and between the liquid crystal layer 6 and the counter substrate 3 illustrated in FIG. 11.

The liquid crystal display device 20 has a configuration for the transverse electric field mode but may have a configuration for another display mode. The liquid crystal display device 20 may have, for example, a configuration corresponding to a mode mainly using a longitudinal electric field generated between principal surfaces of the substrates, such as a twisted nematic (TN) mode, an optically compensated bend (OCB) mode, and a vertical aligned (VA) mode. In the display mode using the longitudinal electric field, for example, a configuration including the pixel substrate 2 provided with the pixel electrodes 22 and the counter substrate 3 provided with the drive electrodes COML can be applied.

The counter substrate 3 includes the first substrate 31 and a color filter 32 provided on one surface of the first substrate 31. The touch detection electrodes TDL as detection electrodes of the touch detection device 30 are provided on the other surface of the first substrate 31, and a polarizing plate 35 is provided on the touch detection electrodes TDL.

A mounting method of the color filter 32 may be what is called a color-filter on array (COA) method with which the color filter 32 is provided on the pixel substrate 2 as the array substrate.

The color filter 32 illustrated in FIG. 11 has color regions colored with three colors, for example, red (R), green (G), and blue (B) that are arranged periodically. Color regions 32R, 32G, and 32B of the three colors R, G, and B are made to correspond to the sub pixels SPix, and serve one set to constitute one pixel Pix.

The pixels Pix are arranged in the matrix form with the row-column configuration along the direction parallel with the scan signal lines GCL and the direction parallel with the pixel signal lines SGL to form the display region Ad, which will be described later. The color filter 32 faces the liquid crystal layer 6 in the direction perpendicular to the second substrate 21. Thus, the sub pixels SPix can perform color display of single colors.

The color filter 32 may have a combination of other colors as long as being colored with different colors. The color filter 32 may not be provided. Regions in which no color filter 32 is provided, that is, non-colored sub pixels SPix may be present. The number of sub pixels SPix in each pixel Pix may be four or more.

Figure 13:
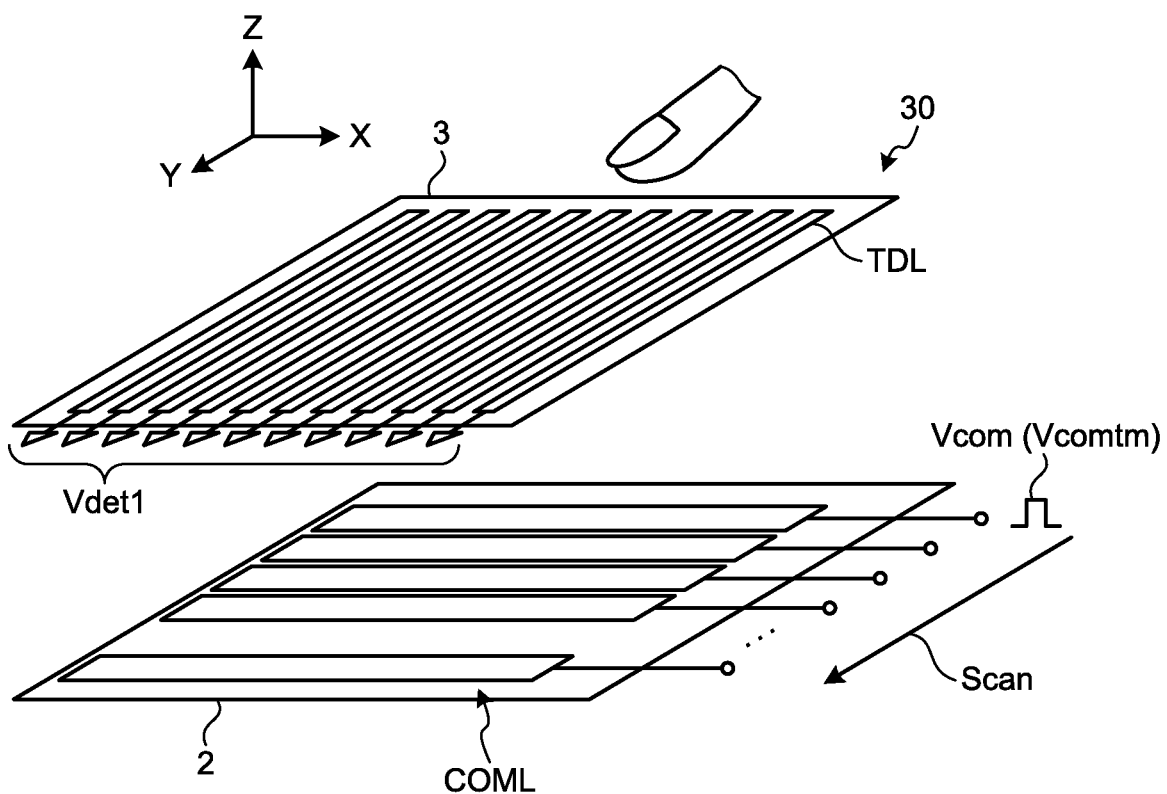
FIG. 13 is a perspective view of a configuration example of drive electrodes and touch detection electrodes of the display portion with a touch detection function.

FIG. 13 is a perspective view of a configuration example of the drive electrodes and the touch detection electrodes of the display portion with a touch detection function. The drive electrodes COML function as the drive electrodes of the liquid crystal display device 20 and also function as the drive electrodes of the touch detection device 30.

The drive electrodes COML face the pixel electrodes 22 in the direction perpendicular to the surface of the second substrate 21. The touch detection device 30 includes the drive electrodes COML provided in the pixel substrate 2 and the touch detection electrodes TDL provided in the counter substrate 3.

The touch detection electrodes TDL include stripe-like electrode patterns extending in the direction intersecting with the extension direction of the electrode patterns of the drive electrodes COML. The touch detection electrodes TDL face the drive electrodes COML in the direction perpendicular to the surface of the second substrate 21. The electrode patterns of the touch detection electrodes TDL are coupled to the input side of the first detection signal amplifier 41 of the detection controller 200.

The electrode patterns of the drive electrodes COML and the touch detection electrodes TDL intersecting each other generate capacitance in intersecting portions thereof. The touch detection device 30 performs the touch detection based on the touch detection signals Vdet1 output from the touch detection electrodes TDL by application of the drive signal Vcomtm to the drive electrodes COML by the drive electrode driver 14.

Figure 4:
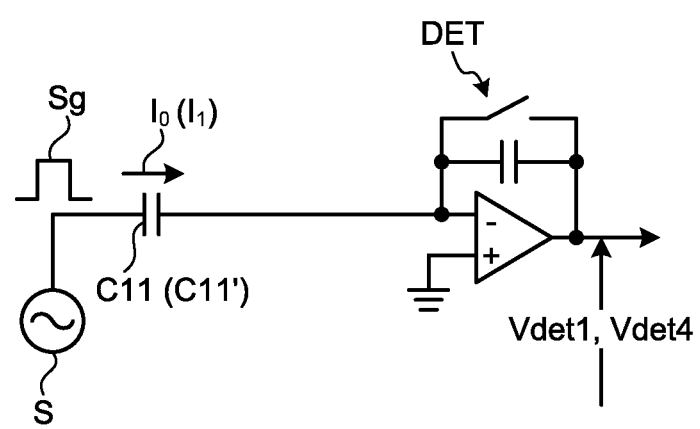
FIG. 4 is an explanatory diagram illustrating an example of an equivalent circuit of the mutual-capacitive touch detection.

That is to say, the drive electrode COML corresponds to the drive electrode E1 in the basic principle of the mutual-capacitive touch detection illustrated in FIG. 3 to FIG. 5, and the touch detection electrode TDL corresponds to the touch detection electrode E2. The touch detection device 30 detects a touch in accordance with the basic principle.

In this manner, the touch detection device 30 has the touch detection electrodes TDL forming the mutual capacitance with either (for example, the drive electrodes COML) of the pixel electrodes 22 or the drive electrodes COML and performs the touch detection based on variation in the mutual capacitance.

The electrode patterns of the drive electrodes COML and the touch detection electrodes TDL intersecting each other are included in the configuration of mutual-capacitive touch sensors arranged in a matrix form with the row-column configuration. The touch detection controller 40 scans the entire input surface IS of the touch detection device 30 and thereby detects the position and the contact area of the contact or proximity of a detection target object OBJ.

That is to say, when the touch detection device 30 performs the touch detection operation, the drive electrode driver 14 drives the drive electrodes COML illustrated in FIG. 10 to sequentially scan the drive electrodes COML illustrated in FIG. 10 in the time division manner. The drive electrodes COML are thereby sequentially selected in the scan direction Scan. The touch detection device 30 outputs the touch detection signals Vdet1 from the touch detection electrodes TDL. In this manner, the touch detection device 30 performs the touch detection for each drive electrode COML.

Although the relation between the detection block and the number of lines for display output is desirably set, the touch detection region corresponding to the display region Ad for two lines corresponds to one detection block in the embodiment. In other words, although a relation between the detection block and any of the facing pixel electrodes, scan signal lines, and pixel signal lines is desirably set, the two pixel electrodes or the two scan signal lines are provided corresponding to one drive electrode COML in the embodiment.

The touch detection electrodes TDL or the drive electrodes COML are not limited to have the shapes of being divided into the stripe-like patterns. The touch detection electrodes TDL or the drive electrodes COML may have, for example, comb-tooth shapes. The shapes of slits dividing the drive electrodes COML may be straight lines or curves, as long as the touch detection electrodes TDL or the drive electrodes COML are shaped into a plurality of electrodes.

As an example of a method for operating the display device with a touch detection function 1, the display device with a touch detection function 1 performs the touch detection operation (touch detection period) and the display operation (display operation period) in the time division manner. The touch detection operation and the display operation may be performed in any division manner.

1-2. Configuration Example of Force Detector

Figure 14:
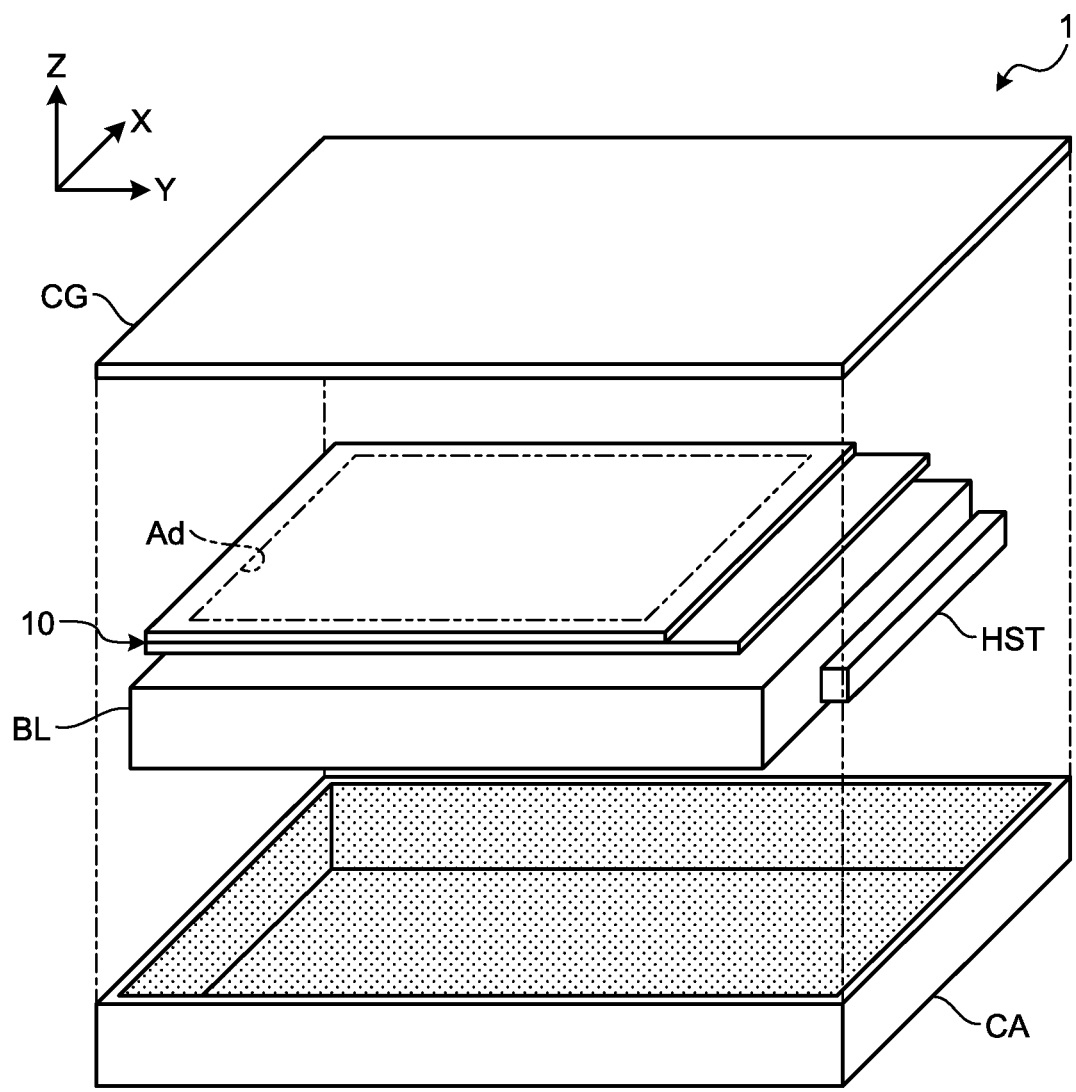
FIG. 14 is an exploded perspective view of a configuration example of the display device with a touch detection function according to the first embodiment.

FIG. 14 is an exploded perspective view of a configuration example of the display device with a touch detection function according to the first embodiment. As illustrated in FIG. 14, the display device with a touch detection function 1 includes the display portion with a touch detection function 10, an illuminator (for example, a backlight BL) illuminating the input surface IS of the display portion with a touch detection function 10 from the rear surface, the host HST controlling the display portion with a touch detection function 10 and the backlight BL, a case CA, and the cover member CG.

The display portion with a touch detection function 10 has a plane parallel with an X-Y plane defined by the X direction as a first direction and the Y direction as a second direction that are orthogonal to each other. Although the X direction as the first direction and the Y direction as the second direction are orthogonal to each other in this configuration example, they may intersect with each other with an angle other than 90°. The Z direction as a third direction is orthogonal to each of the X direction as the first direction and the Y direction as the second direction. The Z direction as the third direction corresponds to the thickness direction of the display portion with a touch detection function 10.

The case CA has a box shape with an opening in an upper portion thereof and accommodates therein the display portion with a touch detection function 10, the backlight BL, and the host HST. The case CA can be made of a conductive material such as metal or can be made of resin with a surface layer made of a conductive material such as a metal material.

The cover member CG closes the opening of the case CA and covers the display portion with a touch detection function 10, the backlight BL, and the host HST.

The dimensions of the cover member CG are larger than the dimensions of the second substrate 21 and the dimensions of the first substrate 31 when viewed in the X-Y plane. The cover member CG is, for example, a substrate having light transmissivity, such as a glass substrate and a resin substrate. When the cover member CG is the glass substrate, the cover member CG can be referred to as cover glass.

In the Z direction as the third direction, the display portion with a touch detection function 10 and the backlight BL are located between the bottom surface of the case CA and the cover member CG, and the backlight BL is located between the case CA and the display portion with a touch detection function 10. The backlight BL can be arranged to be spaced from the display portion with a touch detection function 10. The backlight BL can be arranged to be spaced from the case CA.

A force detection region in which the force detector SE2 detects a force may be the same as the display region Ad.

Figure 15:
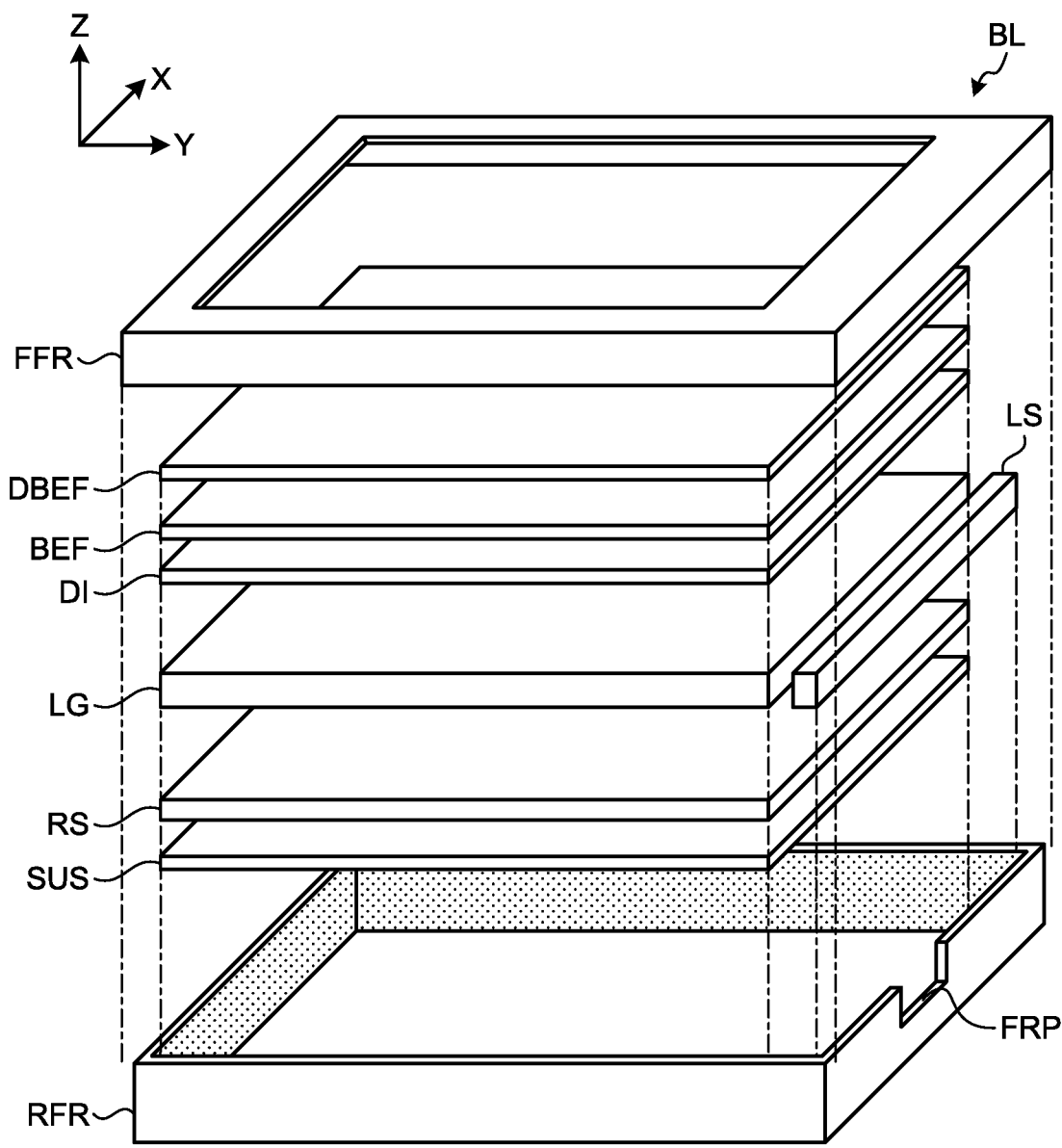
FIG. 15 is an exploded perspective view of a backlight of the display device with a touch detection function according to the first embodiment.

FIG. 15 is an exploded perspective view of the backlight according to the first embodiment. The backlight BL includes a reflective polarizing film DBEF, a luminance enhancing film BEF, a light diffusion sheet DI, a light guide body LG, a light reflector RS, and electrodes SUS that are stacked in this order in the Z direction from the display portion with a touch detection function 10 side toward the case CA side. A light source LS is arranged facing one side surface of the light guide body LG. The backlight BL has a shape and a size corresponding to those of the display portion with a touch detection function 10.

Each electrodes SUS is included in the force detection device 100 illustrated in FIG. 2 and correspond to the force detector SE2 illustrated in FIG. 1.

In the first embodiment, the light guide body LG is formed into a flat rectangular shape. The light source LS emits light to the light guide body LG. In this configuration example, the light source LS employs a light emitting diode (LED).

The light reflector RS reflects light transmitted from the light guide body LG in the direction opposite to the display portion with a touch detection function 10 and transmits the reflected light toward the display portion with a touch detection function 10. The light reflector RS can improve the luminance level of a display image by reducing light loss. In the first embodiment, the light reflector RS is formed into a rectangular sheet-like shape. The area of the light reflector RS is substantially the same as the area of the light guide body LG in the X-Y plane. The light reflector RS may have, for example, a multilayered film structure using polyester-based resin.

The light diffusion sheet DI diffuses light incident from the light guide body LG and transmits the diffused light toward the display portion with a touch detection function 10. That is to say, light that has passed through the light diffusion sheet DI is diffused, and the light diffusion sheet DI can therefore reduce luminance unevenness of light emitted from the backlight BL in the X-Y plane. In the configuration example, the light diffusion sheet DI is formed into a rectangular sheet-like shape. The area of the light diffusion sheet DI is substantially the same as the area of the light guide body LG in the X-Y plane.

The luminance enhancing film BEF has the effect of enhancing the luminance level of the output light from the backlight BL. In this configuration example, the luminance enhancing film BEF is formed into a rectangular film-like shape. The area of the luminance enhancing film BEF is substantially the same as the area of the light guide body LG in the X-Y plane.

The reflective polarizing film DBEF has the effect of improving usage efficiency of the output light from the backlight BL. In this configuration example, the reflective polarizing film DBEF is formed into a rectangular film-like shape. The area of the reflective polarizing film DBEF is substantially the same as the area of the light guide body LG in the X-Y plane.

A front frame FFR and a rear frame RFR are used for modularizing the backlight BL. The reflective polarizing film DBEF, the luminance enhancing film BEF, the light diffusion sheet DI, the light guide body LG, the light reflector RS, the electrodes SUS, and the light source LS are accommodated in the rear frame RFR. Relative positions of the reflective polarizing film DBEF, the luminance enhancing film BEF, the light diffusion sheet DI, the light guide body LG, the light reflector RS, and the electrodes SUS, and relative positions of the light guide body LG and the light source LS are thereby fixed.

In the first embodiment, the front frame FFR and the rear frame RFR are formed into rectangular frame shapes. The front frame FFR has an opening in an upper portion thereof so as not to shield illumination of the display portion with a touch detection function 10. The rear frame RFR entirely surrounds an assembly of the light guide body LG and the light source LS in the X-Y plane. The rear frame RFR has a path FRP through which the flexible printed substrate T coupled to the light source LS passes. A clearance in the Z direction is provided between the front frame FFR and the reflective polarizing film DBEF. The front frame FFR and the rear frame RFR can be made of a conductive material such as metal.

The shapes of the front frame FFR and the rear frame RFR in the X-Y plane can be variously changed as long as they do not shield illumination of the display portion with a touch detection function 10. The shape of each of the front frame FFR and the rear frame RFR in the X-Y plane is, for example, an L shape facing two adjacent sides of the light guide body LG, a Π shape facing three adjacent sides of the light guide body LG, or a Π shape facing two opposing sides of the light guide body LG.

while FIG. 15 illustrates an example of the backlight BL, various configurations can be applied to the backlight BL. For example, the backlight BL is configured excluding at least one of the reflective polarizing film DBEF, the luminance enhancing film BEF, the light diffusion sheet DI, and the light reflector RS. Alternatively, the backlight BL is configured additionally including an optical member that is not illustrated in FIG. 15. It is sufficient that the backlight BL is configured so as to emit light to the display portion with a touch detection function 10.

Figure 16:
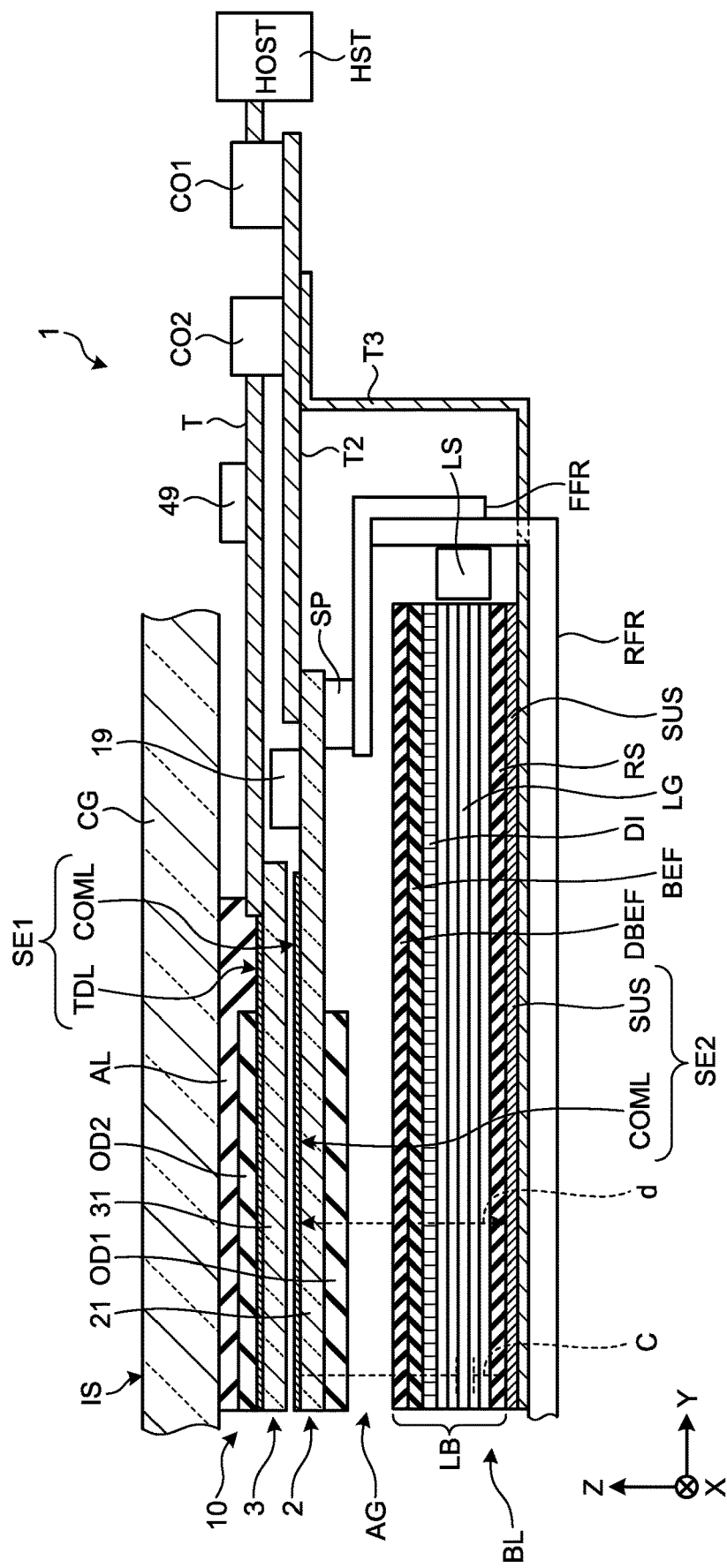
FIG. 16 is a cross-sectional diagram illustrating a configuration example of the display device with a touch detection function according to the first embodiment.

FIG. 16 is a cross-sectional diagram illustrating a configuration example of the display device with a touch detection function according to the first embodiment. As illustrated in FIG. 16, the display device with a touch detection function 1 includes the display portion with a touch detection function 10, the COG 19, the cover member CG, a first optical element OD1, a second optical element OD2, the touch IC 49, the backlight BL, a first printed substrate, a second printed substrate, and a third printed substrate (for example, flexible printed substrates T, T2, and T3).

The COG 19 is mounted on the pixel substrate 2 of the display portion with a touch detection function 10. The flexible printed substrate T2 is coupled to the pixel substrate 2. Connectors CO1 and CO2 are mounted on the flexible printed substrate T2. The flexible printed substrate T2 is coupled to the host HST through the connector CO1.

The flexible printed substrate T couples the touch detection electrodes TDL and the connector CO2. The COG 19 is coupled to the touch IC 49 through the flexible printed substrate T2, the connector CO2, and the flexible printed substrate T. As an example of arrangement of the touch IC 49, the touch IC 49 can be mounted on one substrate of the flexible printed substrates T, T2, and T3 and the counter substrate 3, or can be divided into two or more parts and mounted on two or more substrates thereof.

The flexible printed substrate T3 couples the electrodes SUS and the flexible printed substrate T2. The host HST is coupled to the electrodes SUS through the connector CO1 and the flexible printed substrate T3. The electrodes SUS may be coupled to the touch IC 49 through the flexible printed substrate T3, the flexible printed substrate T2, and the flexible printed substrate T.

A method for coupling the host HST, the display portion with a touch detection function 10, the touch detection electrodes TDL, the light source LS, and the electrodes SUS can be variously changed.

For example, one flexible printed substrate may be used instead of the above-mentioned independent three flexible printed substrates T, T2, and T3 and connectors CO1 and CO2. In this case, one flexible printed substrate can be coupled to the host HST, a first branch portion of the flexible printed substrate can be coupled to the display portion with a touch detection function 10, a second branch portion of the flexible printed substrate can be coupled to the touch detection electrodes TDL, and a third branch portion of the flexible printed substrate can be coupled to the light source LS. Coupling between the flexible printed substrates or coupling between the flexible printed substrate and the host HST or the substrate may be made through a connector such as the connector CO1 and the connector CO2 or with soldering or the like instead of the connector.

The host HST, the COG 19, and the touch IC 49 function as the controller CTRL controlling the touch detector SE1 having the drive electrodes COML and the touch detection electrodes TDL of the display portion with a touch detection function 10.

The host HST, the COG 19, and the touch IC 49 function as the controller CTRL controlling the force detector SE2 having the drive electrodes COML and the electrodes SUS of the display portion with a touch detection function 10.

The host HST can be alternatively referred to as an application processor. The touch IC 49 can apply, to the COG 19, timing signals indicating drive times of the touch detector SE1 and the force detector SE2. Alternatively, the COG 19 can apply, to the touch IC 49, timing signals indicating drive times of the drive electrodes COML. Alternatively, the host HST can apply timing signals to each of the COG 19 and the touch IC 49. The timing signals enable synchronization of driving of the COG 19 and driving of the touch IC 49.

The cover member CG is located at the outer side of the display portion with a touch detection function 10 and faces the counter substrate 3. In this configuration example, the input surface IS of the display device with a touch detection function 1 corresponds to the surface of the cover member CG. The display device with a touch detection function 1 can detect the position and the contact area of the detection target object OBJ when the detection target object OBJ is in contact with the input surface IS.

When a detection target object OBJ applies a force to the input surface IS, the force detector SE2 of the display device with a touch detection function 1 can output, to the controller CTRL, a signal depending on a force. The signal depending on a force is a signal depending on a pressing force applied onto the input surface IS by the detection target object OBJ presses and varies depending on the magnitude of the force.

A spacer SP is provided between the display portion with a touch detection function 10 and the front frame FFR of the backlight BL, and an air gap AG is formed between the display portion with a touch detection function 10 and the reflective polarizing film DBEF. The spacer SP is made of a non-conductive material and is, for example, polyurethane.

When a force is applied to the input surface IS, the spacer SP is elastically deformed depending on the force, and the force detector SE2 can detect the force applied to the input surface IS.

The first optical element OD1 is arranged between the pixel substrate 2 and the backlight BL. The first optical element OD1 is bonded to the pixel substrate 2.

The second optical element OD2 is arranged between the display portion with a touch detection function 10 and the cover member CG. The second optical element OD2 is bonded to the counter substrate 3 and the touch detection electrodes TDL.

Each of the first optical element OD1 and the second optical element OD2 includes at least a polarizing plate and may include a retardation plate if necessary. An absorption axis of the polarizing plate included in the first optical element OD1 intersects with an absorption axis of the polarizing plate included in the second optical element OD2. The absorption axis of the polarizing plate included in the first optical element OD1 is, for example, orthogonal to the absorption axis of the polarizing plate included in the second optical element OD2.

The cover member CG is bonded to the second optical element OD2 with an adhesive layer AL. The adhesive layer AL is made of, for example, optically clear resin (OCR). The display portion with a touch detection function 10 detects the force, and the adhesive layer AL may therefore be elastically deformed. It is sufficient that the adhesive layer AL can transmit the force applied from the cover member CG to the second optical element OD2.

The touch detection electrodes TDL are arranged between the drive electrodes COML and the cover member CG. In this configuration example, the touch detection electrodes TDL are provided on the upper side of a surface of the counter substrate 3, the surface facing the second optical element OD2. The touch detection electrodes TDL may be in contact with the counter substrate 3 or may be separated from the counter substrate 3. When the touch detection electrodes TDL are separated from the counter substrate 3, a member such as an insulating film (not illustrated) is interposed between the counter substrate 3 and the touch detection electrodes TDL. The touch detection electrodes TDL extend in the Y direction as the second direction.

The drive electrodes COML and the touch detection electrodes TDL are included in the configuration of the touch detector SE1 using the mutual-capacitive method and the self-capacitive method. The drive electrodes COML function as the electrodes for display and also function as the sensor drive electrodes. The touch detector SE1 is used for detecting the position and the contact area of the detection target object OBJ.

In the first embodiment, the electrodes SUS are made of a conductive material (for example, aluminum). The touch IC 49 and the electrodes SUS are electrically coupled to each other, and the electrodes SUS output the force detection signals Vdet4 to the touch IC 49.

The electrodes SUS are arranged to be spaced from the display portion with a touch detection function 10. In the first embodiment, the air gap AG is provided between the display portion with a touch detection function 10 and the electrodes SUS. That is to say, the air gap AG is provided between the electrodes SUS and the drive electrodes COML. Presence of the air gap AG enables the space between the electrodes SUS and the drive electrodes COML to vary depending on the magnitude of the force applied to the input surface IS. When the force applied to the input surface IS is released, the space between the electrodes SUS and the drive electrodes COML is restored to the original space with a lapse of time.

In the embodiment, a multilayered body LB is provided between the electrodes SUS and the drive electrodes COML, the multilayered body LB being formed by stacking the reflective polarizing film DBEF, the luminance enhancing film BEF, the light diffusion sheet DI, the light guide body LG, and the light reflector RS included in the configuration of the backlight BL. That is to say, the electrodes SUS are provided on a surface on a side opposite to the input surface IS side of the multilayered body LB.

In the embodiment, the drive electrode COML corresponds to a "first electrode". The electrode SUS corresponds to a "second electrode". The air gap AG and the multilayered body LB correspond to a "dielectric layer".

Although the air gap AG is provided between the display portion with a touch detection function 10 and the backlight BL in the first embodiment, the configuration is not limited thereto. A resin layer having higher transmissivity of light that is output from the backlight BL may be provided between the display portion with a touch detection function 10 and the backlight BL instead of the air gap AG.

A distance d from the electrode SUS to the drive electrode COML is a distance in the Z direction as the third direction from a surface of the electrode SUS facing the drive electrode COML to a surface of the drive electrode COML facing the electrode SUS. The distance d varies depending on the magnitude of a force applied to the cover member CG and the position where the force is applied.

Capacitance C is present between the drive electrode COML and the electrode SUS. That is to say, the drive electrode COML makes capacitive coupling to the electrode SUS. The capacitance C varies depending on the distance d. Accordingly, the COG 19 can detect force information by detecting the variation in the capacitance C. The principle of the force detection will be described in detail later.

The display controller 11 and the detection controller 200 drive the drive electrodes COML and extract the force information based on the variations in the capacitance C from the electrodes SUS. The COG 19 and the touch IC 49 include the display controller 11 and the detection controller 200, for example. The COG 19 outputs the drive signal Vcomtm to the drive electrodes COML, and the touch IC 49 reads the force detection signals Vdet4 based on the variations in the capacitance C from the electrodes SUS. The COG 19 or the host HST may include the display controller 11. The touch IC 49 or the host HST may include the detection controller 200. The display controller 11, the detection controller 200, and the host HST may control the touch detector SE1, the display portion DP, and the force detector SE2 while cooperating with one another.

In the first embodiment, the touch detector SE1, the display portion DP, and the force detector SE2 commonly use the drive electrodes COML.

Figure 17:
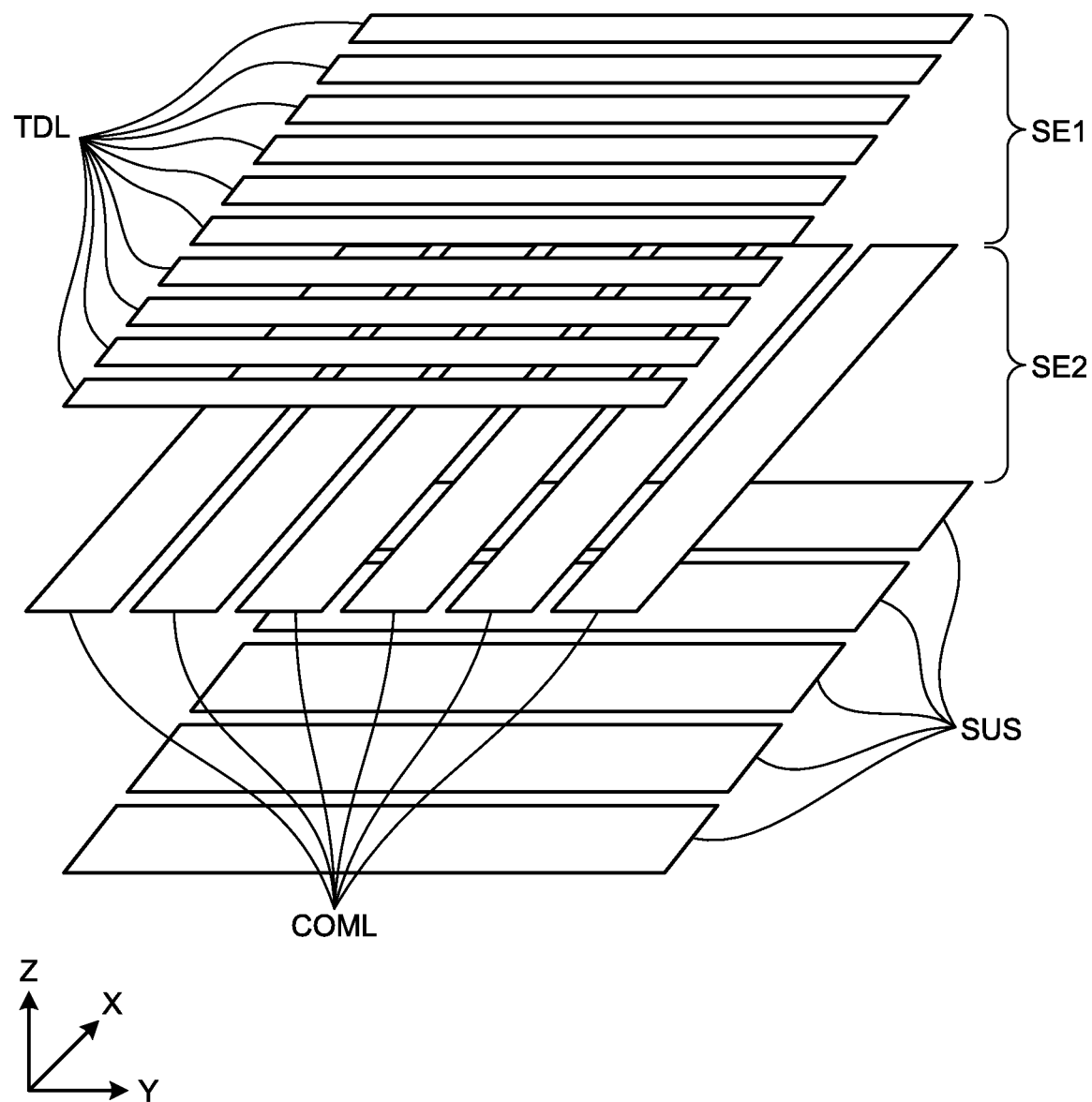
FIG. 17 is a perspective view of electrodes of the display device with a touch detection function according to the first embodiment.

FIG. 17 is a perspective view of the electrodes of the display device with a touch detection function according to the first embodiment. The touch detection electrodes TDL and the drive electrodes COML are included in the configuration of the touch detector SE1 in FIG. 1. The drive electrodes COML and the electrodes SUS are included in the configuration of the force detector SE2 in FIG. 1.

In the first embodiment, the touch detector SE1 and the force detector SE2 commonly use the drive electrodes COML and simultaneously perform the mutual-capacitive touch detection and the force detection as described above.

In the example illustrated in FIG. 17, the electrodes SUS are formed in the stripe-like electrode patterns extending in the direction intersecting with the extension direction of the electrode patterns of the drive electrodes COML. The electrodes SUS face the drive electrodes COML in the Z direction.

Electrode patterns with intersection of the drive electrodes COML and the electrodes SUS generate capacitance in intersection portions thereof. The force detector SE2 performs the force detection based on the force detection signals Vdet4 output from the electrodes SUS by application of the drive signal Vcomtm to the drive electrodes COML by the drive electrode driver 14.

The electrodes SUS may have a larger number of electrode patterns or a smaller number of electrode patterns than that in the example illustrated in FIG. 17.

1-3. Principle of Force Detector
1-3-1. Basic Principle

Figure 18:
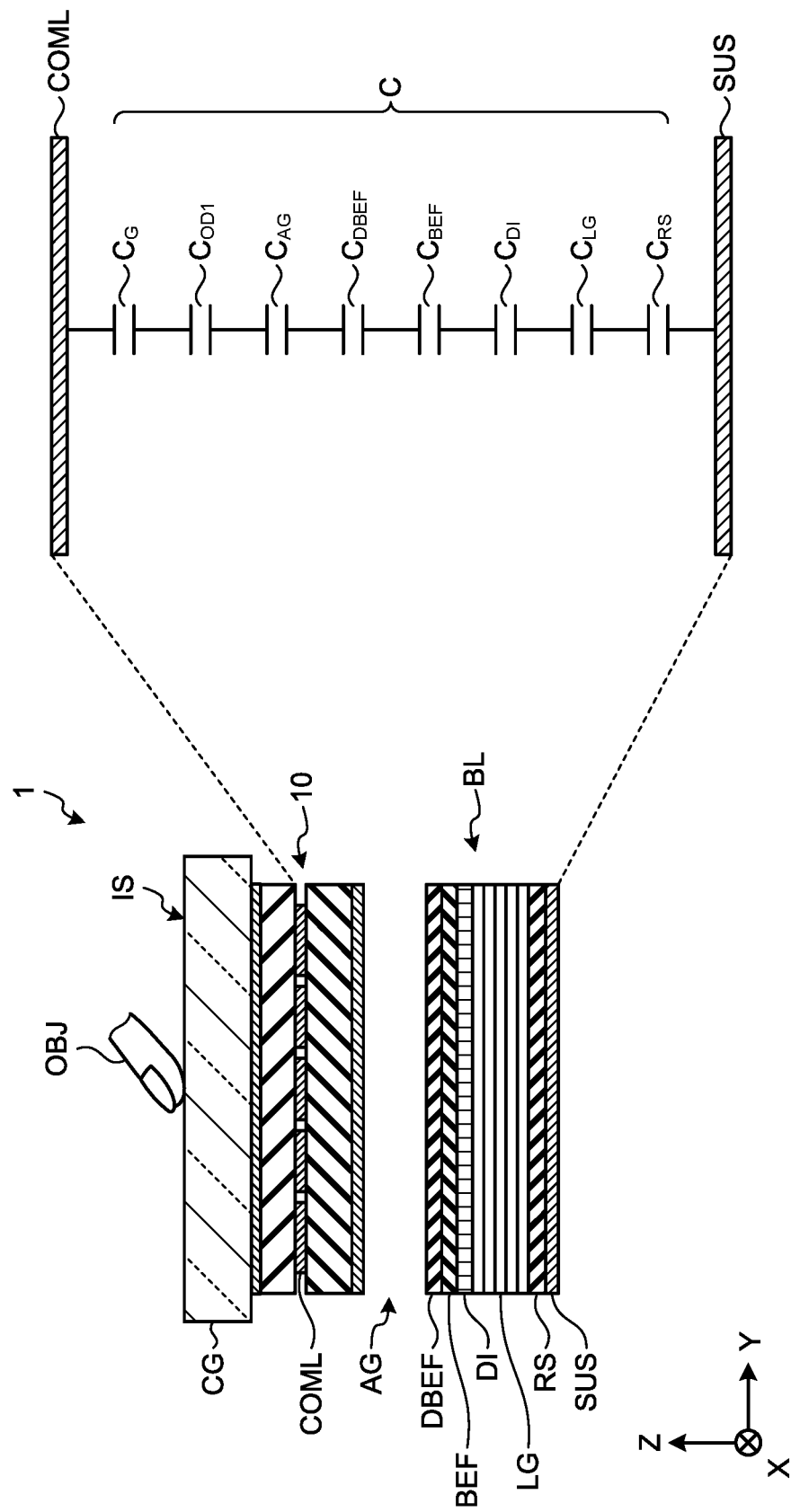
FIG. 18 is a cross-sectional diagram and an equivalent circuit diagram when no force is applied to an input surface of the display device with a touch detection function according to the first embodiment.

FIG. 18 is a cross-sectional diagram and an equivalent circuit diagram when no force is applied to the input surface of the display device with a touch detection function according to the first embodiment. The display device with a touch detection function 1 according to the first embodiment detects mutual capacitance between the drive electrodes COML and the electrodes SUS to perform the force detection.

As illustrated in FIG. 18, the capacitance C between the drive electrode COML and the electrode SUS when no force is applied to the input surface IS can be expressed by the following equation (1) under the assumption that capacitance generated by the second substrate 21 is $C_G$, capacitance generated by the first optical element OD1 is $C_{OD1}$, capacitance generated by the air gap AG is $C_{AG}$, capacitance generated by the reflective polarizing film DBEF is $C_{DBEF}$, capacitance generated by the luminance enhancing film BEF is $C_{BEF}$, capacitance generated by the light diffusion sheet DI is $C_{DI}$, capacitance generated by the light guide body LG is $C_{LG}$, and capacitance generated by the light reflector RS is $C_{RS}$.

$$1/C = (1/C_G) + (1/C_{OD1}) + (1/C_{AG}) + (1/C_{DBEF}) + (1/C_{BEF}) + (1/C_{DI}) + (1/C_{LG}) + (1/C_{RS}) \quad (1)$$

Figure 19:
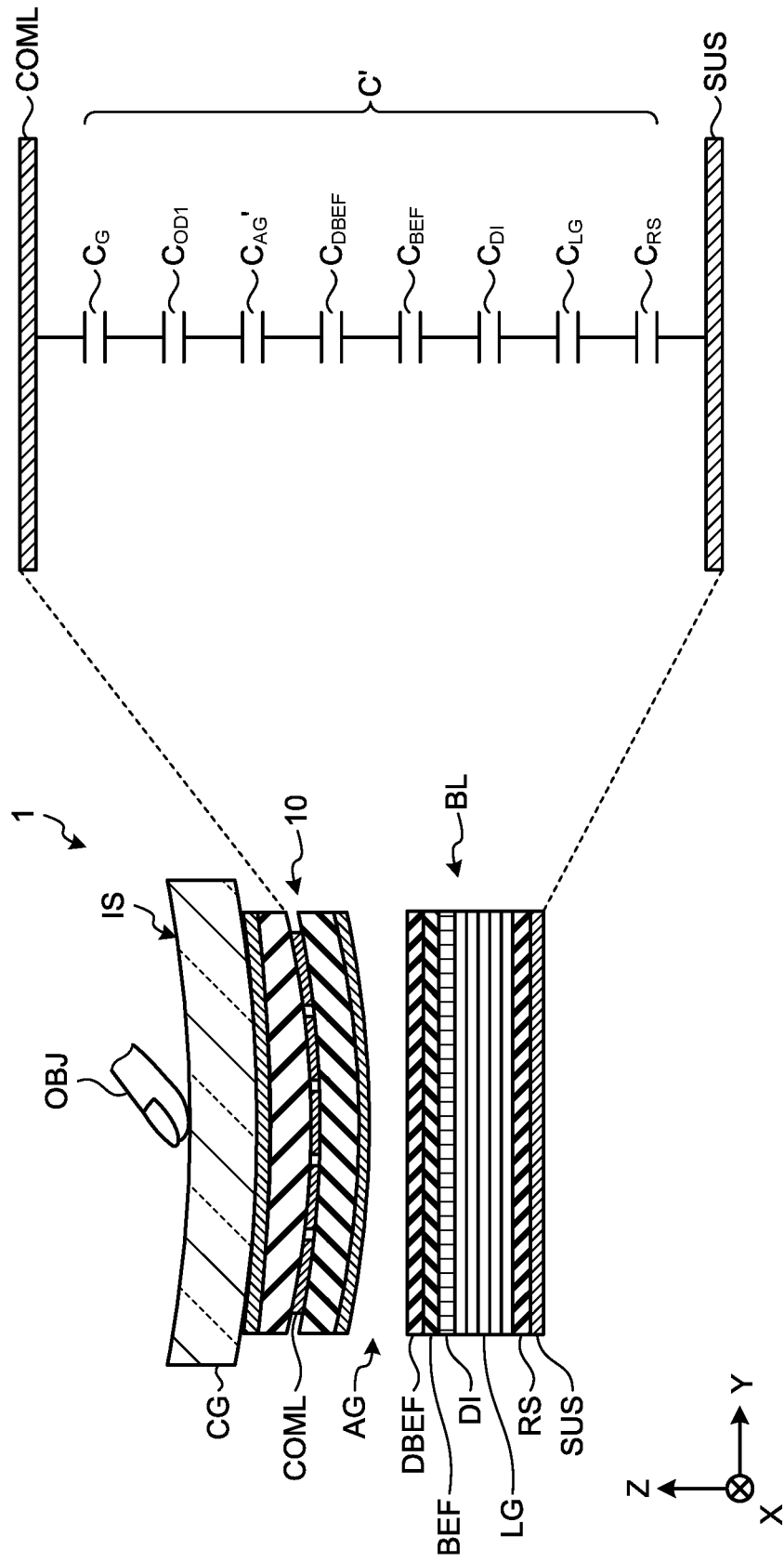
FIG. 19 is a cross-sectional diagram and an equivalent circuit diagram when a force is applied to the input surface of the display device with a touch detection function according to the first embodiment.

FIG. 19 is a cross-sectional diagram and an equivalent circuit diagram when a force is applied to the input surface of the display device with a touch detection function according to the first embodiment. As illustrated in FIG. 19, when a detection target object OBJ applies a force onto the input surface IS, the display portion with a touch detection function 10 is deflected. The deflection of the display portion with a touch detection function 10 reduces the thickness of the air gap AG. In this case, capacitance $C_{AG}'$ generated by the air gap AG is increased by $\Delta C_{AG}$ relative to the $C_{AG}$ generated by the air gap AG when no force is applied to the input surface IS, and is expressed by the following equation (2).

$$C_{AG}' = C_{AG} + \Delta C_{AG} \quad (2)$$

Capacitance C' between the drive electrode COML and the electrode SUS in this case can be expressed by the following equation (3).

$$1/C' = (1/C_G) + (1/C_{OD1}) + (1/C_{AG}') + (1/C_{DBEF}) + (1/C_{BEF}) + (1/C_{DI}) + (1/C_{LG}) + (1/C_{RS}) \quad (3)$$

The display device with a touch detection function 1 according to the first embodiment detects, as a force detection value Fcur, a variation amount (C'–C) of the capacitance generated between the drive electrode COML and the electrode SUS. That is to say, the force detection value Fcur is expressed by the following equation (4).

$$Fcur = C' - C \quad (4)$$

1-3-2. Correction Principle

Influence on the force detection processing by the position where a force is applied will be described.

Figure 20:
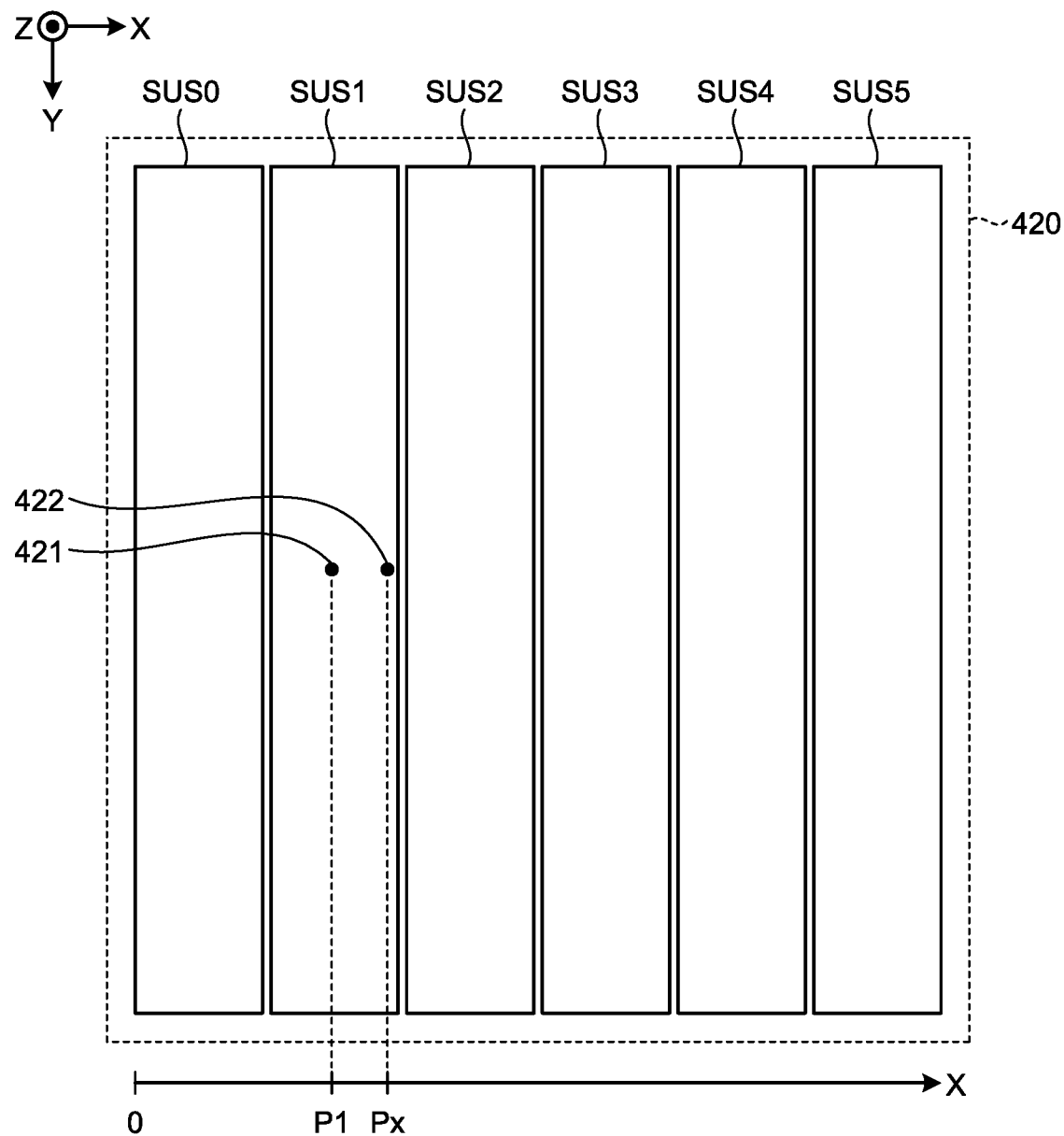
FIG. 20 is a diagram illustrating a detection region of the display device with a touch detection function according to the first embodiment.

FIG. 20 is a diagram illustrating a detection region of the display device with a touch detection function according to the first embodiment. In FIG. 20, the display device with a touch detection function 1 has six electrodes of an electrode SUS0 to an electrode SUS5 in a detection region 420. In this example, the number of electrodes SUS is six, but is not limited thereto. The number of electrodes SUS may be smaller than or larger than six.

The following describes a case in which a constant force is applied to two positions overlapping the electrode SUS1 when viewed from the Z direction (in X-Y plan view, that is, in the X direction and/or Y direction). One point 421 is a point with an X coordinate P1 overlapping, when viewed from the Z direction, a center portion of the electrode SUS1 in the X direction. The other point 422 is a point with an X coordinate Px overlapping, when viewed from the Z direction, the vicinity of an end portion of the electrode SUS1 in the X direction.

Figure 21:
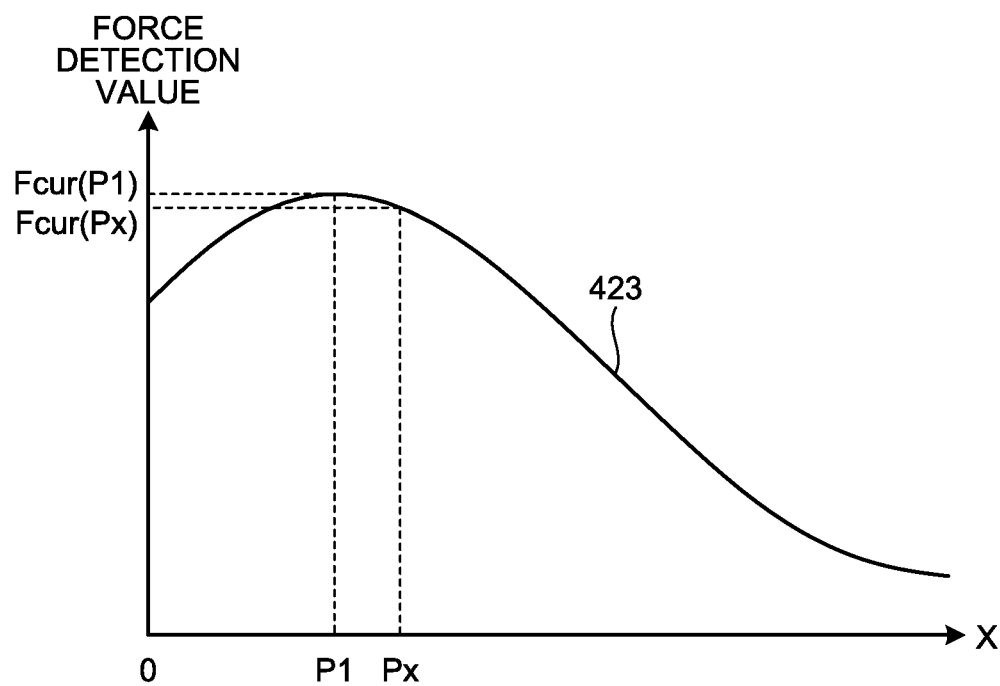
FIG. 21 is a graph illustrating a relation between a position where a force is applied and a force detection value in the display device with a touch detection function according to the first embodiment.

FIG. 21 is a graph illustrating a relation between the position where a force is applied and the force detection value in the display device with a touch detection function according to the first embodiment. To be specific, FIG. 21 illustrates a line 423 representing the force detection values Fcur when a reference force is applied to positions with different X coordinates. In FIG. 21, the transverse axis indicates the X coordinate and the longitudinal axis indicates the force detection value.

In a case in which the reference force is applied to a point overlapping, when viewed from the Z direction, the center portion of the electrode SUS1 in the X direction, the distance between the drive electrode COML and the electrode SUS1 is minimum. That is to say, in a case in which the reference force is applied to the point 421 (X coordinate P1) overlapping, when viewed from the Z direction, the center portion of the electrode SUS1 in the X direction, a force detection value Fcur(P1) is a maximum value.

The distance between the drive electrode COML and the electrode SUS1 is gradually increased as the position at which the reference force is applied is farther from the point 421. That is to say, the force detection value Fcur is gradually decreased as the position at which the reference force is applied is farther from the point 421. Accordingly, a force detection value Fcur(Px) obtained when the reference force is applied to the point 422 (X coordinate Px) is smaller than the force detection value Fcur(P1). As described above, the point 422 is a point overlapping, when viewed from the Z direction, the vicinity of the end portion of the electrode SUS1 in the X direction.

Thus, even when the constant reference force is applied, the force detection value Fcur differs depending on the positions at which the reference force is applied.

In the first embodiment, the display device with a touch detection function 1 acquires the force detection value Fcur based on the capacitance between the drive electrode COML and the electrode SUS. The display device with a touch detection function 1 performs, for each of the electrode SUS0 to the electrode SUS5, interpolation operation for the relation (see the line 423 in FIG. 21) between the position of the X coordinate at which the force is applied and the force detection values Fcur that are detected by the electrode SUS0 to the electrode SUS5. The display device with a touch detection function 1 then corrects the force detection value Fcur based on an interpolation value FA(Px) at the position of the X coordinate Px at which the force is applied to calculate a force detection value Fcor. Hereinafter, the force detection value Fcur is referred to as a "pre-correction force detection value Fcur", and the force detection value Fcor is referred to as a "post-correction force detection value Fcor".

1-4. Configuration and Operation of Force Detection Controller

In the first embodiment, the force detection controller 50 illustrated in FIG. 1 performs the force detection processing. To be more specific, for example, the force detection processor 442 of the signal processor 44 in the force detection controller 50 illustrated in FIG. 2 performs the force detection processing.

Figure 22:
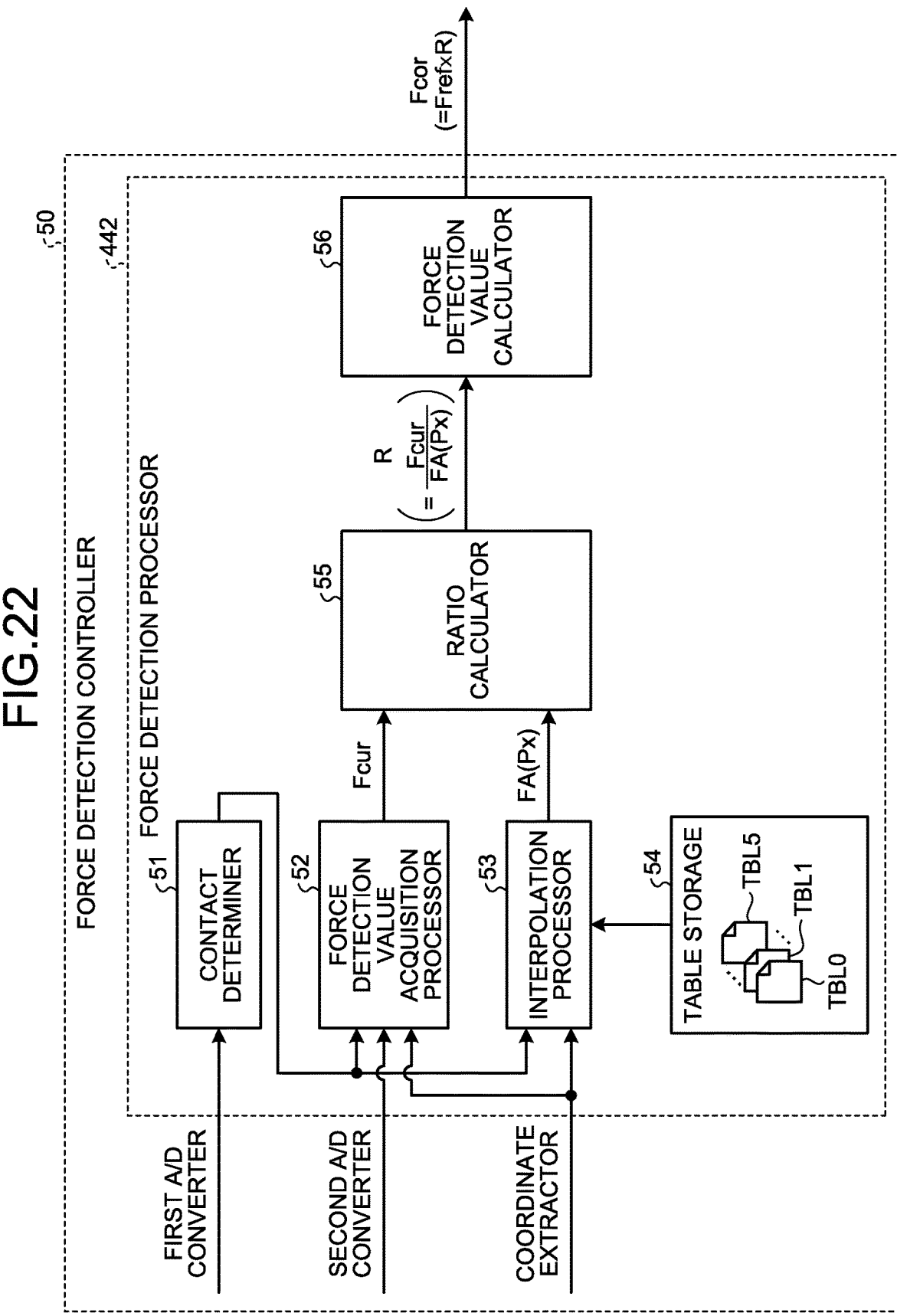
FIG. 22 is a functional block diagram of a force detection controller of the display device with a touch detection function according to the first embodiment.

FIG. 22 is a functional block diagram of the force detection controller of the display device with a touch detection function according to the first embodiment. In the first embodiment, the signal processor 44 of the detection controller 200 includes the force detection processor 442 of the force detection controller 50, as an example.

The force detection controller 50 is a component that detects the force applied on the input surface IS by a detection target object OBJ based on the capacitance generated between the drive electrode COML and the electrode SUS.

The force detection processor 442 of the force detection controller 50 includes a contact determiner 51, a force detection value acquisition processor 52, an interpolation processor 53, table storage 54, a ratio calculator 55, and a force detection value calculator 56. The table storage 54 is, for example, a read only memory (ROM), a random access memory (RAM), or a flash memory (registered trademark).

The contact determiner 51, the force detection value acquisition processor 52, the interpolation processor 53, the ratio calculator 55, and the force detection value calculator 56 are implemented by, for example, circuits. Alternatively, the touch IC 49 may execute, for example, programs to implement the contact determiner 51, the force detection value acquisition processor 52, the interpolation processor 53, the ratio calculator 55, and the force detection value calculator 56. In this case, for example, the COG 19 or the host HST may execute the programs to implement the contact determiner 51, the force detection value acquisition processor 52, the interpolation processor 53, the ratio calculator 55, and the force detection value calculator 56. Alternatively, for example, two or more of the COG 19, the touch IC 49, and the host HST may cooperate and execute the programs to implement the contact determiner 51, the force detection value acquisition processor 52, the interpolation processor 53, the ratio calculator 55, and the force detection value calculator 56.

The table storage 54 previously stores therein a table TBL0 to a table TBL5 set for each individual device in shipping the display device with a touch detection function 1.

Figure 23:
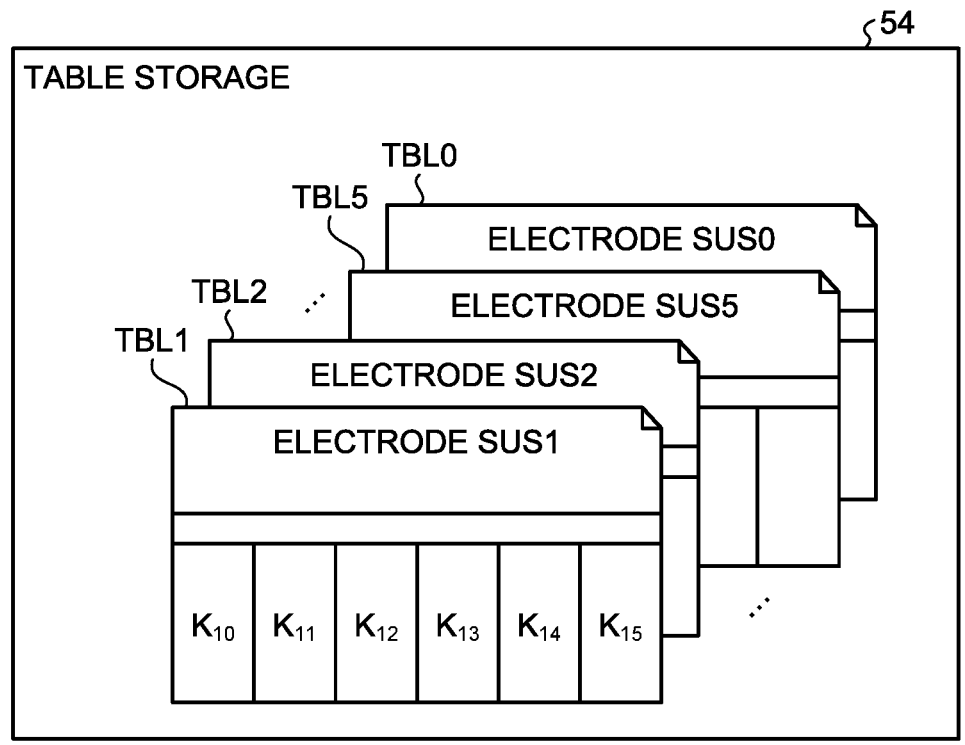
FIG. 23 is a diagram illustrating exemplary tables that are stored in the display device with a touch detection function according to the first embodiment.

FIG. 23 is a diagram illustrating exemplary tables that are stored in the display device with a touch detection function according to the first embodiment. The table storage 54 stores therein the table TBL0 to the table TBL5.

The table TBL1 is used for the interpolation processing for correcting the pre-correction force detection value Fcur1 detected by the electrode SUS1. The table TBL1 contains a constant $K_{10}$ to a constant $K_{15}$. The constant $K_{10}$ to the constant $K_{15}$ correspond to "reference values".

The constant $K_{10}$ is a value of the pre-correction force detection value Fcur1 that is detected by the electrode SUS1 when the reference force is applied to a position overlapping, when viewed from the Z direction, a reference position of the electrode SUS0. The reference position of the electrode SUS0 is, for example, a center portion of the electrode SUS0 in the X direction.

The constant $K_{11}$ is a value of the pre-correction force detection value Fcur1 that is detected by the electrode SUS1 when the reference force is applied to a position overlapping, when viewed from the Z direction, a reference position of the electrode SUS1. The reference position of the electrode SUS1 is, for example, a center portion of the electrode SUS1 in the X direction. The constant $K_{12}$ is a value of the pre-correction force detection value Fcur1 that is detected by the electrode SUS1 when the reference force is applied to a position overlapping, when viewed from the Z direction, a reference position of the electrode SUS2. The reference position of the electrode SUS2 is, for example, a center portion of the electrode SUS2 in the X direction.

The constant $K_{13}$ is a value of the pre-correction force detection value Fcur1 that is detected by the electrode SUS1 when the reference force is applied to a position overlapping, when viewed from the Z direction, a reference position of the electrode SUS3. The reference position of the electrode SUS3 is, for example, a center portion of the electrode SUS3 in the X direction. The constant $K_{14}$ is a value of the pre-correction force detection value Fcur1 that is detected by the electrode SUS1 when the reference force is applied to a position overlapping, when viewed from the Z direction, a reference position of the electrode SUS4. The reference position of the electrode SUS4 is, for example, a center portion of the electrode SUS4 in the X direction.

The constant $K_{15}$ is a value of the pre-correction force detection value Fcur1 that is detected by the electrode SUS1 when the reference force is applied to a position overlapping, when viewed from the Z direction, a reference position of the electrode SUS5. The reference position of the electrode SUS5 is, for example, a center portion of the electrode SUS5 in the X direction.

The constant $K_{10}$ to the constant $K_{15}$ are, for example, written into the table storage 54 as follows. In a test process of the display device with a touch detection function 1, a test device actually applies the reference force to the positions overlapping, when viewed from the Z direction, the reference positions of the electrode SUS0 to the electrode SUS5, acquires the pre-correction force detection values Fcur1 detected by the electrode SUS1, and writes them into the table storage 54.

The table TBL2 to the table TBL5, and the table TBL0 are similar to the table TBL1. The table TBL2 to the table TBL5, and the table TBL0 are provided corresponding to the electrode SUS2 to the electrode SUS5, and the electrode SUS0.

With reference to FIG. 22 again, the contact determiner 51 determines whether or not a detection target object OBJ is in contact with or in proximity to the input surface IS based on the signals output from the first A/D converter 43-1 (see FIG. 2). As a method for determining whether or not a detection target object OBJ is in contact with or in proximity to the input surface IS, for example, the absolute value |ΔV| of the difference between the waveform $V_0$ and the waveform $V_1$ illustrated in FIG. 5 may be detected, or the variation in the capacitance value of the capacitive element C11 illustrated in FIGS. 3 and 4 may be detected. The above-mentioned methods for determining whether or not a detection target object OBJ is in contact with or in proximity to the input surface IS do not limit the embodiment.

The force detection value acquisition processor 52 performs the following processing when the contact determiner 51 has determined that a detection target object OBJ is in contact with or in proximity to the input surface IS. The force detection value acquisition processor 52 specifies the electrode SUS overlapping, when viewed from the Z direction, the position where the force is applied by referring to the touch detection position Vout output from the coordinate extractor 45 (see FIG. 2). Then, the force detection value acquisition processor 52 acquires the pre-correction force detection value Fcur based on a capacitance value between the drive electrode COML and the specified electrode SUS by referring to the signals output from the second A/D converter 43-2 (see FIG. 2).

The interpolation processor 53 performs the following processing when the contact determiner 51 has determined that a detection target object OBJ is in contact with or in proximity to the input surface IS. The interpolation processor 53 specifies the electrode SUS overlapping, when viewed from the Z direction, the position where the force is applied by referring to the touch detection position Vout output from the coordinate extractor 45 (see FIG. 2). Then, the interpolation processor 53 reads the table TBL corresponding to the specified electrode SUS from the table storage 54. The interpolation processor 53 performs the interpolation processing to calculate an interpolation value FA(Px) when the reference force is assumed to be applied to an X coordinate Px as the position where the force is applied. Although the interpolation processor 53 performs polynomial interpolation in the first embodiment, the interpolation method is not limited thereto. The interpolation processor 53 may perform linear interpolation or interpolation using another function.

Figure 24:
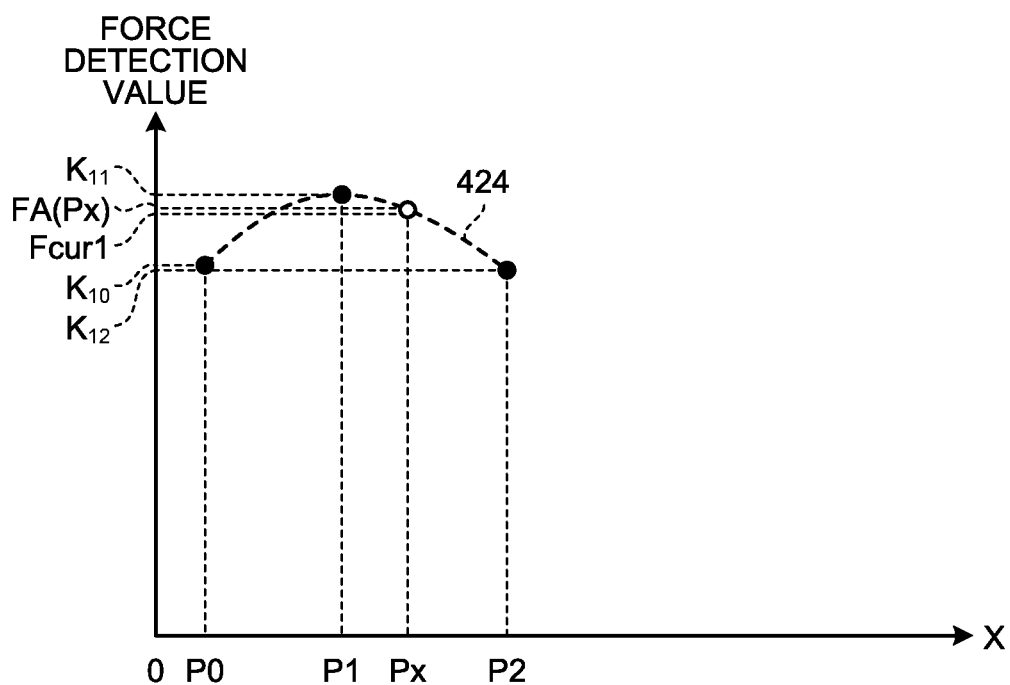
FIG. 24 is a graph for explaining interpolation processing in the display device with a touch detection function according to the first embodiment.

FIG. 24 is a graph for explaining the interpolation processing in the display device with a touch detection function according to the first embodiment. In FIG. 24, the transverse axis indicates the X coordinate, and the longitudinal axis indicates the force detection value.

A line 424 indicates a state of the interpolation processing based on a position of the X coordinate P1.

The interpolation processor 53 performs the polynomial interpolation to calculate the interpolation value FA(Px) at the X coordinate Px when force is applied to the position at the X coordinate Px.

With reference to FIG. 22 again, the ratio calculator 55 calculates a ratio R of the pre-correction force detection value Fcur relative to the interpolation value FA(Px). That is to say, R=Fcur/FA(Px) is satisfied.

With reference to FIG. 24 again, the pre-correction force detection value Fcur1 detected by the electrode SUS1 is smaller than the interpolation value FA(Px). That is to say, Fcur1<FA(Px) is satisfied. Accordingly, R<1 is satisfied. In this case, the force is smaller than the reference force.

When the pre-correction force detection value Fcur1 detected by the electrode SUS1 is equal to the interpolation value FA(Px), that is, Fcur1=FA(Px) is satisfied, R=1 is satisfied. In this case, the force is equal to the reference force.

When the pre-correction force detection value Fcur1 detected by the electrode SUS1 is greater than the interpolation value FA(Px), that is, Fcur1>FA(Px) is satisfied, R>1 is satisfied. In this case, the force is greater than the reference force.

With reference to FIG. 22 again, the force detection value calculator 56 calculates the post-correction force detection value Fcor by multiplying reference force Fref by the ratio R. That is to say, Fcor=Fref×R is satisfied.

Figure 25:
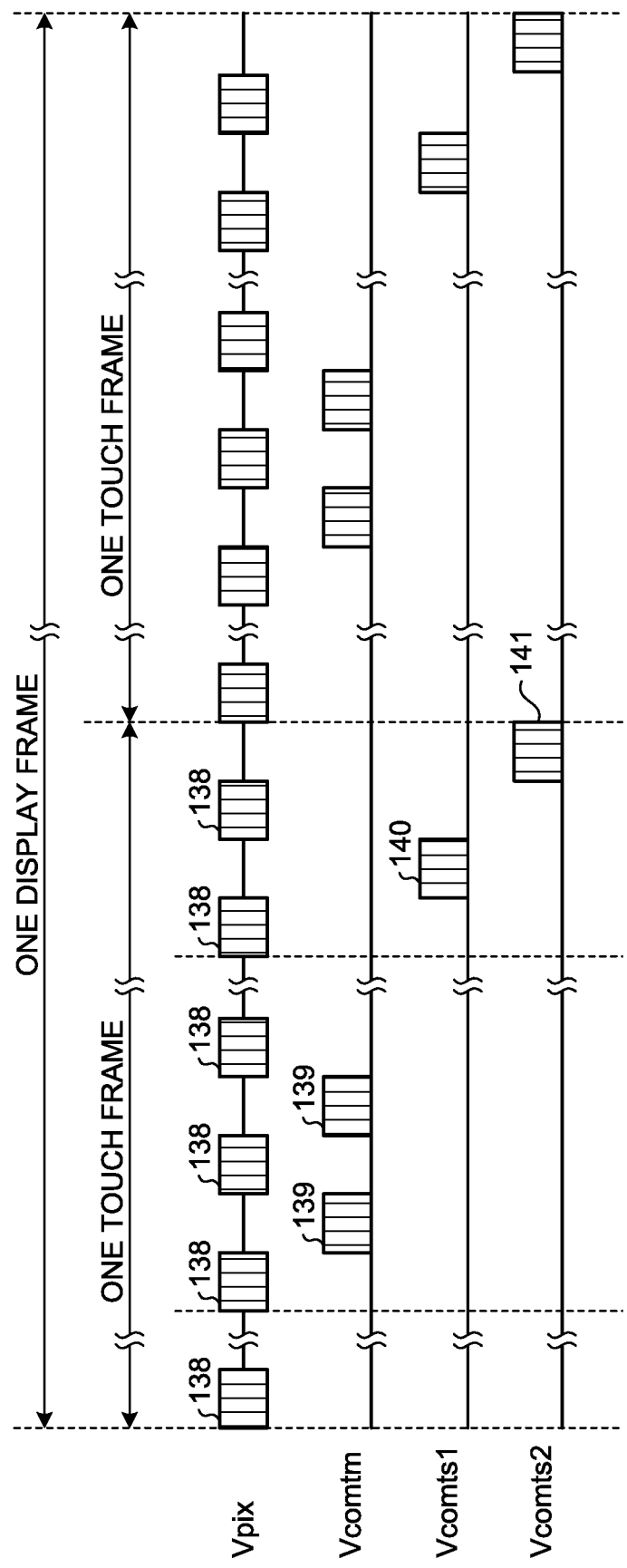
FIG. 25 is a timing chart illustrating an example of operation timing of the display device with a touch detection function according to the first embodiment.

FIG. 25 is a timing chart illustrating an example of operation timing of the display device with a touch detection function according to the first embodiment.

In the display device with a touch detection function 1 according to the first embodiment, one display frame (period) for displaying one image (one frame) includes two one-touch frames (periods) for performing the touch detection and the force detection on the input surface IS. The one display frame (period) may include one or three or more one-touch frames (periods).

In the first embodiment, blanking periods include mutual-capacitance detection periods 139, self-capacitance detection periods 140, and self-capacitance detection periods 141. The blanking periods are periods other than display periods 138. In the display period 138, the pixel signals Vpix are applied to the display portion DP, and the display portion DP performs display writing of an image. In the mutual-capacitance detection period 139, the mutual capacitance between the drive electrode COML and the touch detection electrode TDL and the mutual capacitance between the drive electrode COML and the electrode SUS are detected. In the self-capacitance detection period 140, the self-capacitance of the touch detection electrode TDL is detected. In the self-capacitance detection period 141, the self-capacitance of the drive electrode COML is detected.

The drive signal Vcomtm is applied to the drive electrodes COML in the mutual-capacitance detection period 139. The mutual capacitance values between the drive electrodes COML and the touch detection electrodes TDL detected in the mutual-capacitance detection period 139 are used for the touch detection in the touch detection controller 40. The mutual capacitance values between the drive electrodes COML and the electrodes SUS detected in the mutual-capacitance detection period 139 are used for the force detection in the touch detection controller 50.

In the self-capacitance detection period 140, the drive signal Vcomts1 is sequentially applied to the touch detection electrodes TDL, and the self-capacitance values of the touch detection electrodes TDL are detected. The self-capacitance values of the touch detection electrodes TDL detected in the self-capacitance detection period 140 are used for the touch detection in the touch detection controller 40.

In the self-capacitance detection period 141, the drive signal Vcomts2 is applied to the drive electrodes COML and the self-capacitance values of the drive electrodes COML are detected. The self-capacitance values of the drive electrodes COML detected in the self-capacitance detection period 141 are used for the touch detection in the touch detection controller 40.

The touch detection controller 40 performs the touch detection based on the mutual capacitance between the drive electrodes COML and the touch detection electrodes TDL detected in the mutual-capacitance detection periods 139, the self-capacitance of the touch detection electrodes TDL detected in the self-capacitance detection periods 140, and the self-capacitance of the drive electrodes COML detected in the self-capacitance detection periods 141. The touch detection controller 40 can suitably reduce influences of water droplets and the like and suitably detect the stylus pen or the like by taking into consideration the self-capacitance of the touch detection electrodes TDL and the self-capacitance of the drive electrodes COML in addition to the mutual capacitance between the drive electrodes COML and the touch detection electrodes TDL.

In the first embodiment, the force detection controller 50 performs the force detection based on the capacitance values detected by the electrodes SUS in the mutual-capacitance detection periods 139.

Figure 26:
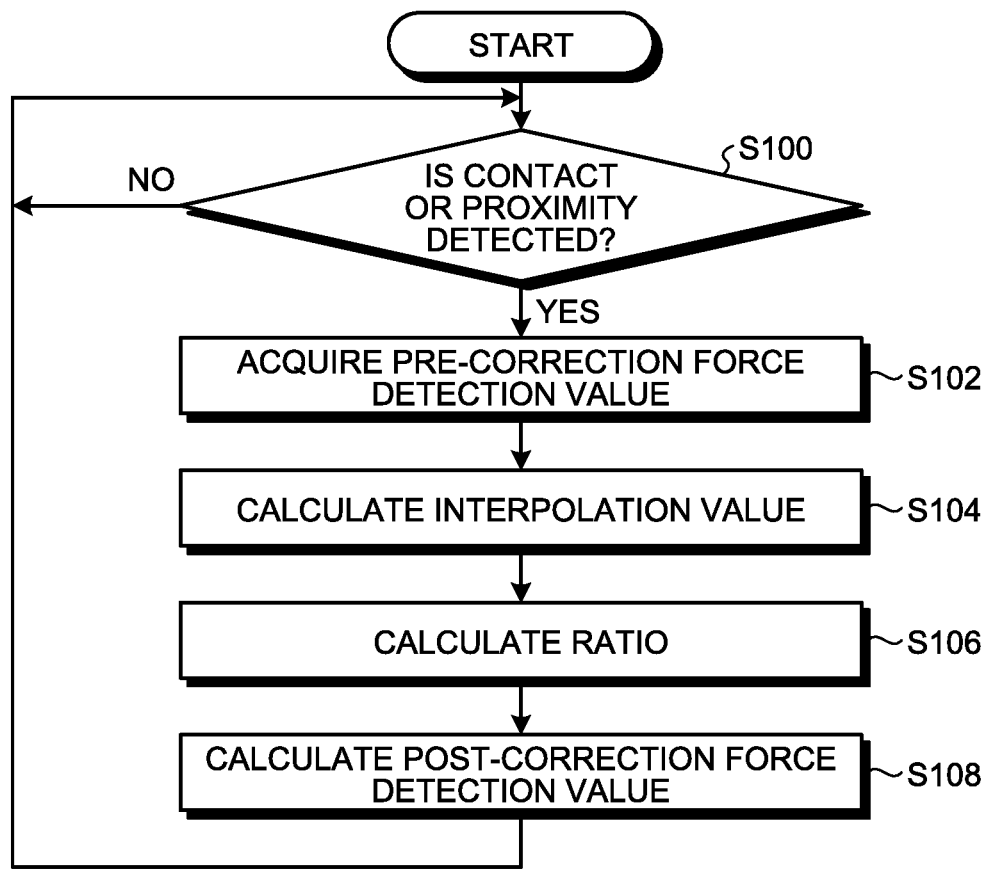
FIG. 26 is a flowchart of processing performed by the force detection controller of the display device with a touch detection function according to the first embodiment.

FIG. 26 is a flowchart of processing performed by the force detection controller of the display device with a touch detection function according to the first embodiment. The processing illustrated in FIG. 26 is performed in the above-mentioned mutual-capacitance detection periods 139.

At step S100, the contact determiner 51 determines whether or not a detection target object OBJ is in contact with or in proximity to the input surface IS. When the contact determiner 51 determines that no detection target object OBJ is in contact with or in proximity to the input surface IS (No at step S100), it stands by at step S100. When the contact determiner 51 determines that a detection target object OBJ is in contact with or in proximity to the input surface IS (Yes at step S100), the processing proceeds to step S102.

At step S102, the force detection value acquisition processor 52 specifies the electrode SUS overlapping, when viewed from the Z direction, a position where the force is applied by referring to the touch detection position Vout output from the coordinate extractor 45 (see FIG. 2). Then, the force detection value acquisition processor 52 acquires the pre-correction force detection value Fcur based on the capacitance value between the drive electrode COML and the specified electrode SUS by referring to the signals output from the second A/D converter 43-2 (see FIG. 2).

At step S104, the interpolation processor 53 specifies the electrode SUS overlapping, when viewed from the Z direction, the position where the force is applied by referring to the touch detection position Vout output from the coordinate extractor 45 (see FIG. 2). Then, the interpolation processor 53 reads the table TBL corresponding to the specified electrode SUS from the table storage 54. The interpolation processor 53 performs the interpolation processing to calculate the interpolation value FA(Px) when the reference force is assumed to be applied to the X coordinate Px as the position to which the force is applied. The interpolation processor 53 may not specify the electrode SUS corresponding to the position where the force is applied again at step S104 because the force detection value acquisition processor 52 has specified the electrode SUS corresponding to the position to which the force is applied at step S102. In this case, the interpolation processor 53 reads, from the table storage 54, the table TBL corresponding to the electrode SUS specified by the force detection value acquisition processor 52.

At step S106, the ratio calculator 55 calculates the ratio R of the pre-correction force detection value Fcur relative to the interpolation value FA(Px).

The force detection value calculator 56 calculates the post-correction force detection value Fcor by multiplying the reference force Fref by the ratio R at step S108, and the processing proceeds to step S100.

As described above, the display device with a touch detection function 1 according to the first embodiment can correct the pre-correction force detection value Fcur that differs depending on the position to which the force is applied to calculate the post-correction force detection value Fcor. The display device with a touch detection function 1 according to the first embodiment can thereby prevent force detection accuracy from being lowered depending on the position to which the force is applied and suitably detect the force.

1-5. First Modification

Figure 27:
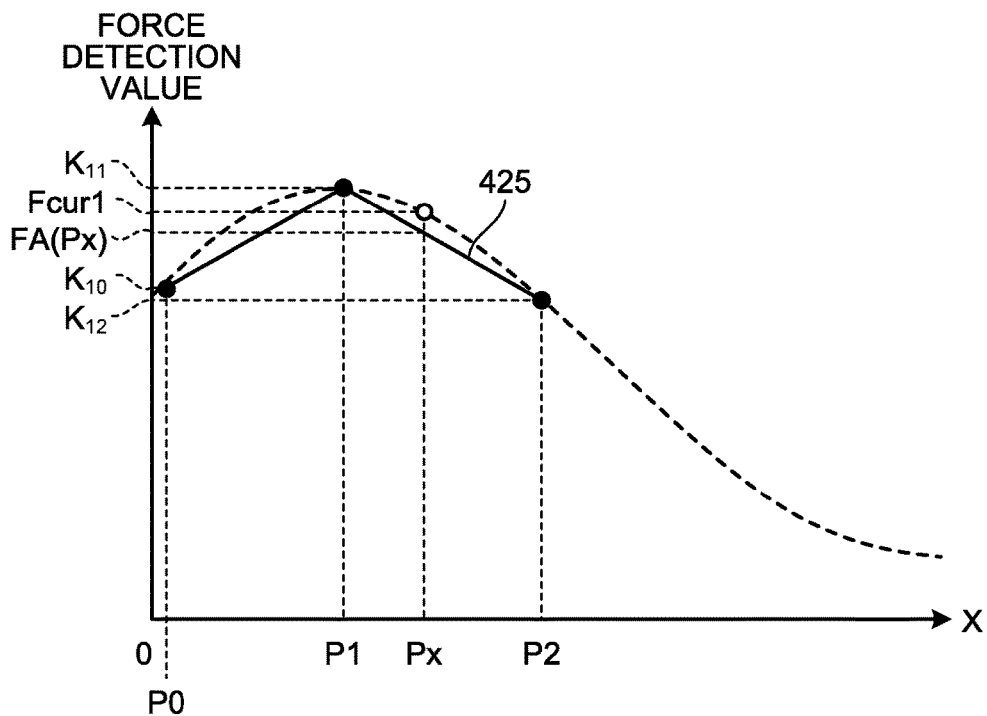
FIG. 27 is a graph for explaining interpolation processing in a display device with a touch detection function according to a first modification of the first embodiment.

The interpolation processor 53 may perform the linear interpolation. FIG. 27 is a graph for explaining interpolation processing in a display device with a touch detection function according to a first modification of the first embodiment. In FIG. 27, the transverse axis indicates the X coordinate and the longitudinal axis indicates the force detection value.

A line 425 is obtained by performing the linear interpolation on the constant $K_{10}$, the constant $K_{11}$, and the constant $K_{12}$.

When a force is applied to a position at the X coordinate Px, the interpolation processor 53 performs the linear interpolation to calculate an interpolation value FA(Px) at an X coordinate Px as a position where the force is applied.

The display device with a touch detection function according to the first modification of the first embodiment can reduce operation load of the interpolation processing although force detection accuracy is slightly lowered in comparison with the first embodiment.

1-6. Second Modification

Figure 28:
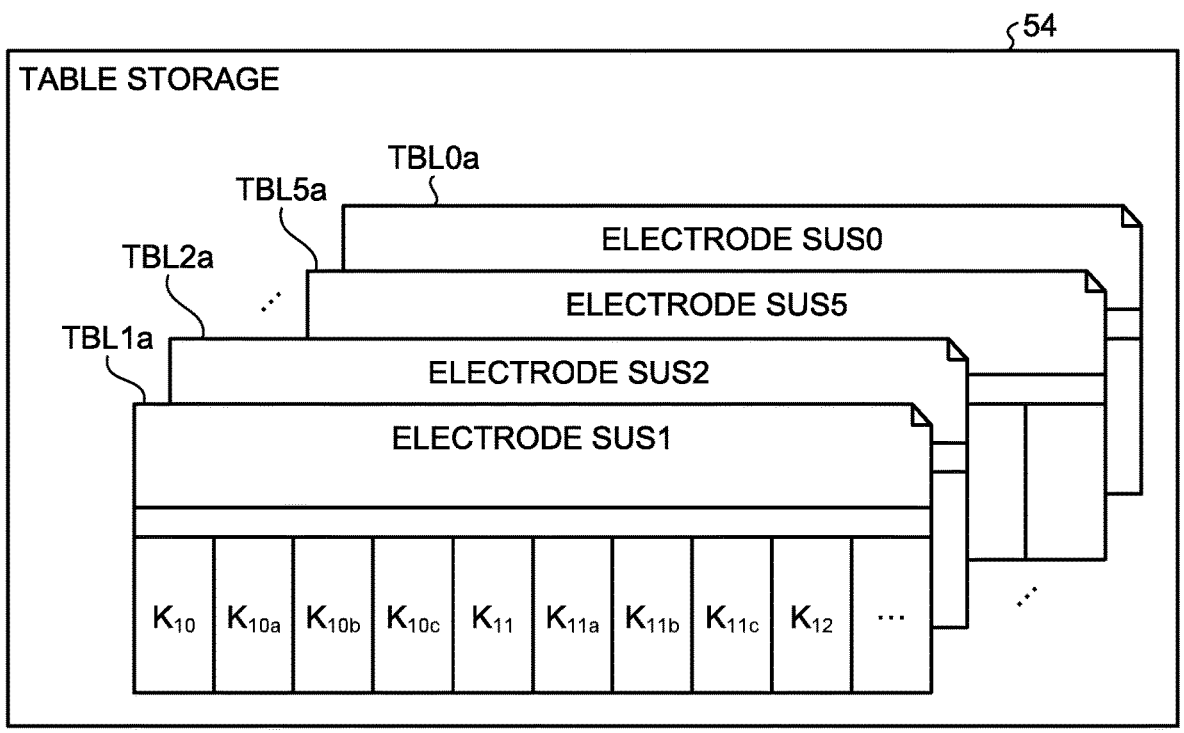
FIG. 28 is a diagram illustrating exemplary tables that are stored in a display device with a touch detection function according to a second modification of the first embodiment.

FIG. 28 is a diagram illustrating exemplary tables that are stored in a display device with a touch detection function according to a second modification of the first embodiment. The table storage 54 stores therein a table TBL0a to a table TBL5a.

The table TBL1a is used for interpolation processing for correcting a pre-correction force detection value Fcur1 detected by the electrode SUS1. The table TBL1a contains a constant $K_{10}$, a constant $K_{10a}$, a constant $K_{10b}$, a constant $K_{10c}$, a constant $K_{11}$, a constant $K_{11a}$, a constant $K_{11b}$, a constant $K_{11c}$, a constant $K_{12}$, and the like.

The constant $K_{10}$ is a value of the pre-correction force detection value Fcur1 that is detected by the electrode SUS1 when a reference force is applied to a position overlapping, when viewed from the Z direction, a reference position of the electrode SUS0. The reference position of the electrode SUS0 is, for example, a center portion of the electrode SUS0 in the X direction.

The constant $K_{11}$ is a value of the pre-correction force detection value Fcur1 that is detected by the electrode SUS1 when the reference force is applied to a position overlapping, when viewed from the Z direction, a reference position of the electrode SUS1. The reference position of the electrode SUS1 is, for example, a center portion of the electrode SUS1 in the X direction.

The constant $K_{12}$ is a value of the pre-correction force detection value Fcur1 that is detected by the electrode SUS1 when the reference force is applied to a position overlapping, when viewed from the Z direction, a reference position of the electrode SUS2. The reference position of the electrode SUS2 is, for example, a center portion of the electrode SUS2 in the X direction.

The constant $K_{10}$, the constant $K_{11}$, and the constant $K_{12}$ are, for example, written into the table storage 54 as follows. In a test process of the display device with a touch detection function 1, a test device actually applies the reference force to the positions overlapping, when viewed from the Z direction, the reference positions of the electrode SUS0 to the electrode SUS5, acquires the pre-correction force detection values Fcur1 detected by the electrode SUS1, and writes them into the table storage 54.

The constant $K_{10a}$, the constant $K_{10b}$, the constant $K_{10c}$, the constant $K_{11a}$, the constant $K_{11b}$, and the constant $K_{11c}$ are written into the table storage 54 as follows, for example.

An external device of the display device with a touch detection function 1 performs the polynomial interpolation on the constant $K_{10}$, the constant $K_{11}$, and the constant $K_{12}$ to calculate the constant $K_{10a}$, the constant $K_{10b}$, the constant $K_{10c}$, the constant $K_{11a}$, the constant $K_{11b}$, and the constant $K_{11c}$ and writes them into the table storage 54 before shipping the display device with a touch detection function 1. The external device is, for example, a computer.

Figure 29:
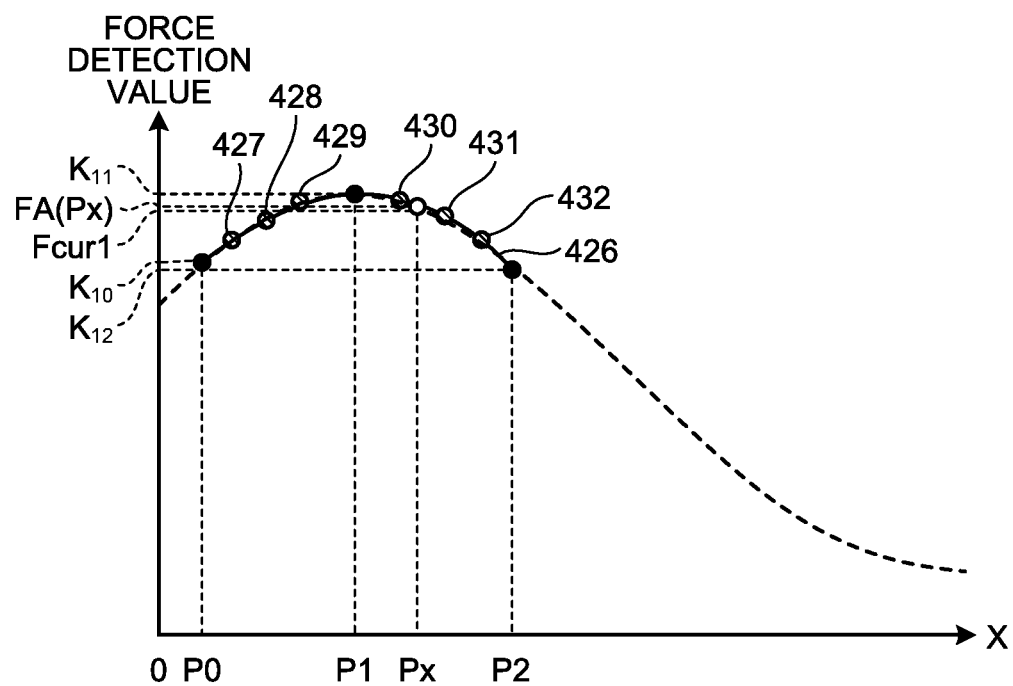
FIG. 29 is a graph for explaining interpolation processing in the display device with a touch detection function according to the second modification of the first embodiment.

The table TBL2a to the table TBL5a, and the table TBL0a are similar to the table TBL1a. FIG. 29 is a graph for explaining the interpolation processing in the display device with a touch detection function according to the second modification of the first embodiment. In FIG. 29, the transverse axis indicates the X coordinate and the longitudinal axis indicates the force detection value.

A line 426 is obtained by performing the linear interpolation on the constant $K_{10}$, the constant $K_{10a}$, the constant $K_{10b}$, the constant $K_{10c}$, the constant $K_{11}$, the constant $K_{11a}$, the constant $K_{11b}$, the constant $K_{11}$, and the constant $K_{12}$. A point 427 corresponds to the constant $K_{10a}$. A point 428 corresponds to the constant $K_{10b}$. A point 429 corresponds to the constant $K_{10c}$. A point 430 corresponds to the constant $K_{11a}$. A point 431 corresponds to the constant $K_{11b}$. A point 432 corresponds to the constant $K_{11c}$.

The interpolation processor 53 performs the linear interpolation on the constant $K_{10a}$ and the constant $K_{10b}$ to calculate an interpolation value FA(Px) at an X coordinate Px when a force is applied to a position at the X coordinate Px.

The display device with a touch detection function according to the second modification of the first embodiment can reduce operation load of the interpolation processing in comparison with the display device with a touch detection function 1 according to the first embodiment. The display device with a touch detection function according to the second modification of the first embodiment can increase force detection accuracy in comparison with the display device with a touch detection function according to the first modification of the first embodiment. That is to say, the display device with a touch detection function according to the second modification of the first embodiment can harmonize the force detection accuracy and the operation load of the interpolation processing.

The constant $K_{10a}$, the constant $K_{10b}$, the constant $K_{10c}$, the constant $K_{11a}$, the constant $K_{11b}$, and the constant $K_{11c}$ may be detected by the electrode SUS1 by actual application of the reference force by the test device in the test process of the display device with a touch detection function 1. In this case, a takt time in the test process is increased. Accordingly, it is preferable that the external device of the display device with a touch detection function 1 performs the polynomial interpolation on the constant $K_{10}$, the constant $K_{11}$, and the constant $K_{12}$ to calculate the constant $K_{10a}$, the constant $K_{10b}$, the constant $K_{10c}$, the constant $K_{11a}$, the constant $K_{11b}$, and the constant $K_{11c}$.

1-7. Third Modification

Figure 30:
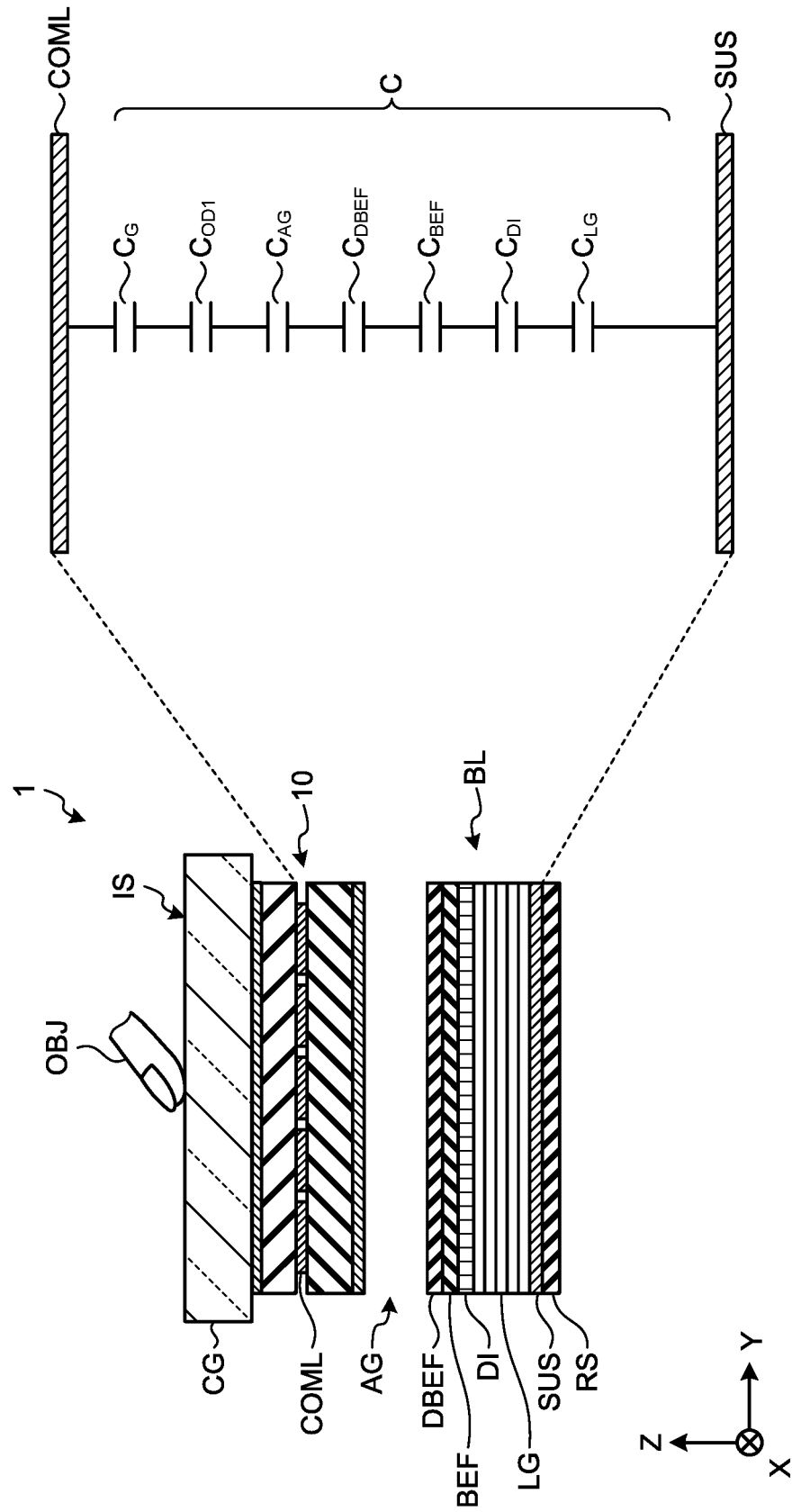
FIG. 30 is a cross-sectional diagram and an equivalent circuit diagram when no force is applied to an input surface of a display device with a touch detection function according to a third modification of the first embodiment.
Figure 31:
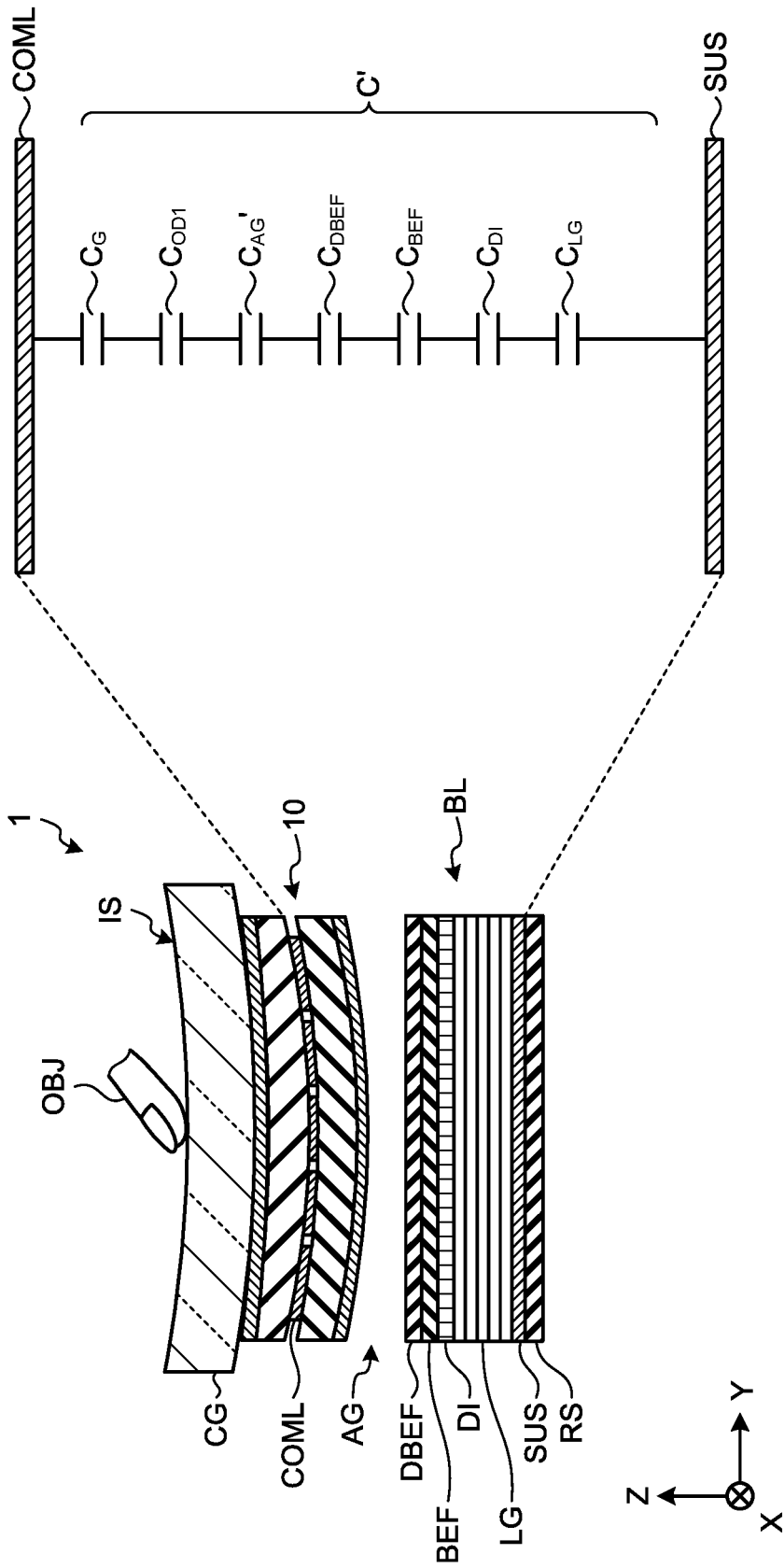
FIG. 31 is a cross-sectional diagram and an equivalent circuit diagram when a force is applied to the input surface of the display device with a touch detection function according to the third modification of the first embodiment.

FIG. 30 is a cross-sectional diagram and an equivalent circuit diagram when no force is applied to an input surface of a display device with a touch detection function according to a third modification of the first embodiment. FIG. 31 is a cross-sectional diagram and an equivalent circuit diagram when a force is applied to the input surface of the display device with a touch detection function according to the third modification of the first embodiment. As illustrated in FIG. 30 and FIG. 31, the electrodes SUS are provided between the light guide body LG and the light reflector RS in the third modification of the first embodiment. In this case, capacitance C between the drive electrode COML and the electrode SUS when no force is applied to the input surface IS can be expressed by the following equation (5).

$$1/C = (1/C_G) + (1/C_{OD1}) + (1/C_{AG}) + (1/C_{DBEF}) + (1/C_{BEF}) + (1/C_{DI}) + (1/C_{LG}) \quad (5)$$

In the third modification of the first embodiment, capacitance C' between the drive electrode COML and the electrode SUS when a force is applied to the input surface IS can be expressed by the following equation (6).

$$1/C' = (1/C_G) + (1/C_{OD1}) + (1/C_{AG}') + (1/C_{DBEF}) + (1/C_{BEF}) + (1/C_{DI}) + (1/C_{LG}) \quad (6)$$

In this case, the capacitance $C_{AG}'$ generated by the air gap AG is increased by $\Delta C_{AG}$ relative to the capacitance $C_{AG}$ generated by the air gap AG when no force is applied to the input surface IS, and is expressed by the above-mentioned equation (2).

1-8. Fourth Modification

Figure 32:
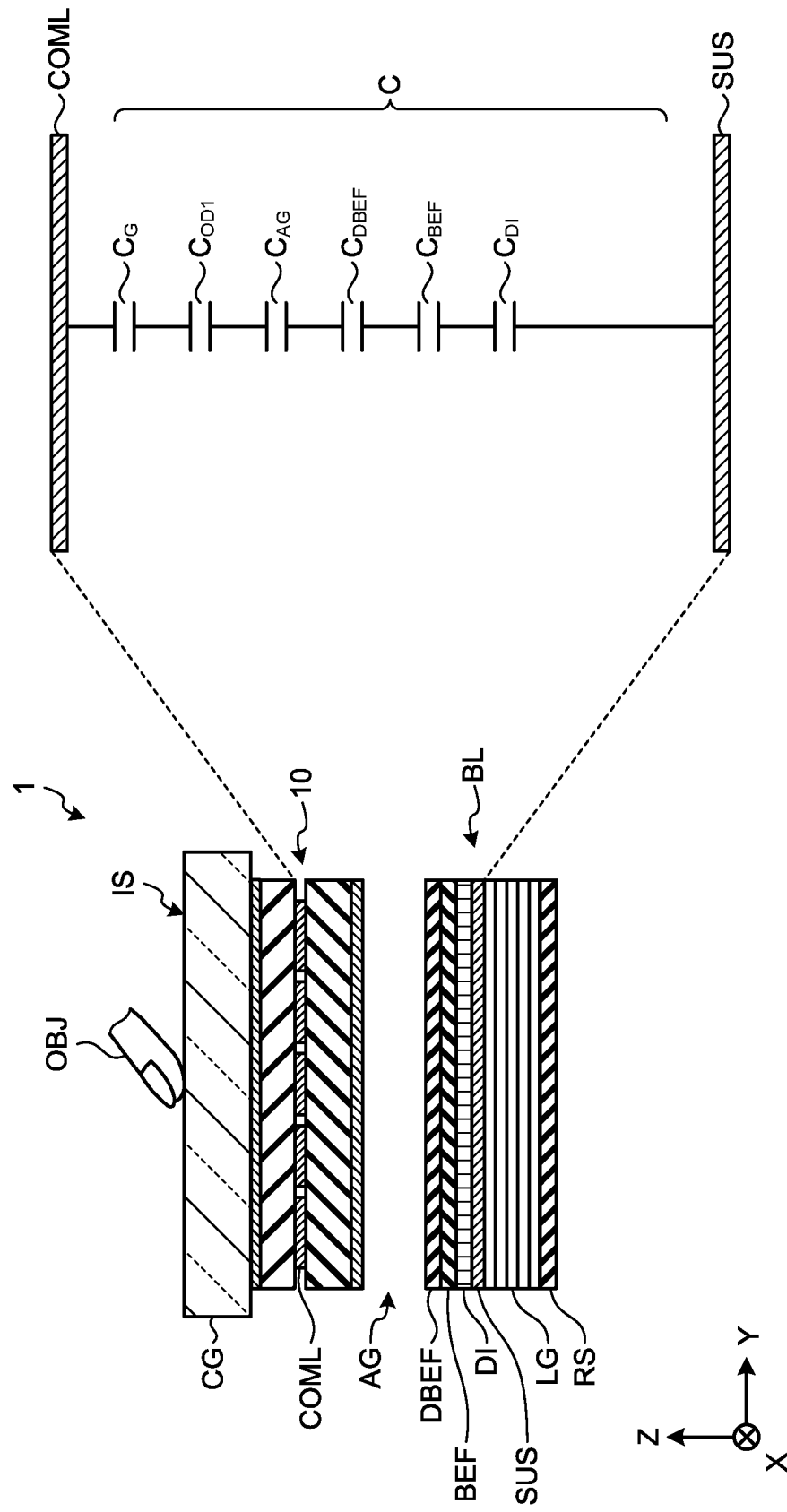
FIG. 32 is a cross-sectional diagram and an equivalent circuit diagram when no force is applied to an input surface of a display device with a touch detection function according to a fourth modification of the first embodiment.
Figure 33:
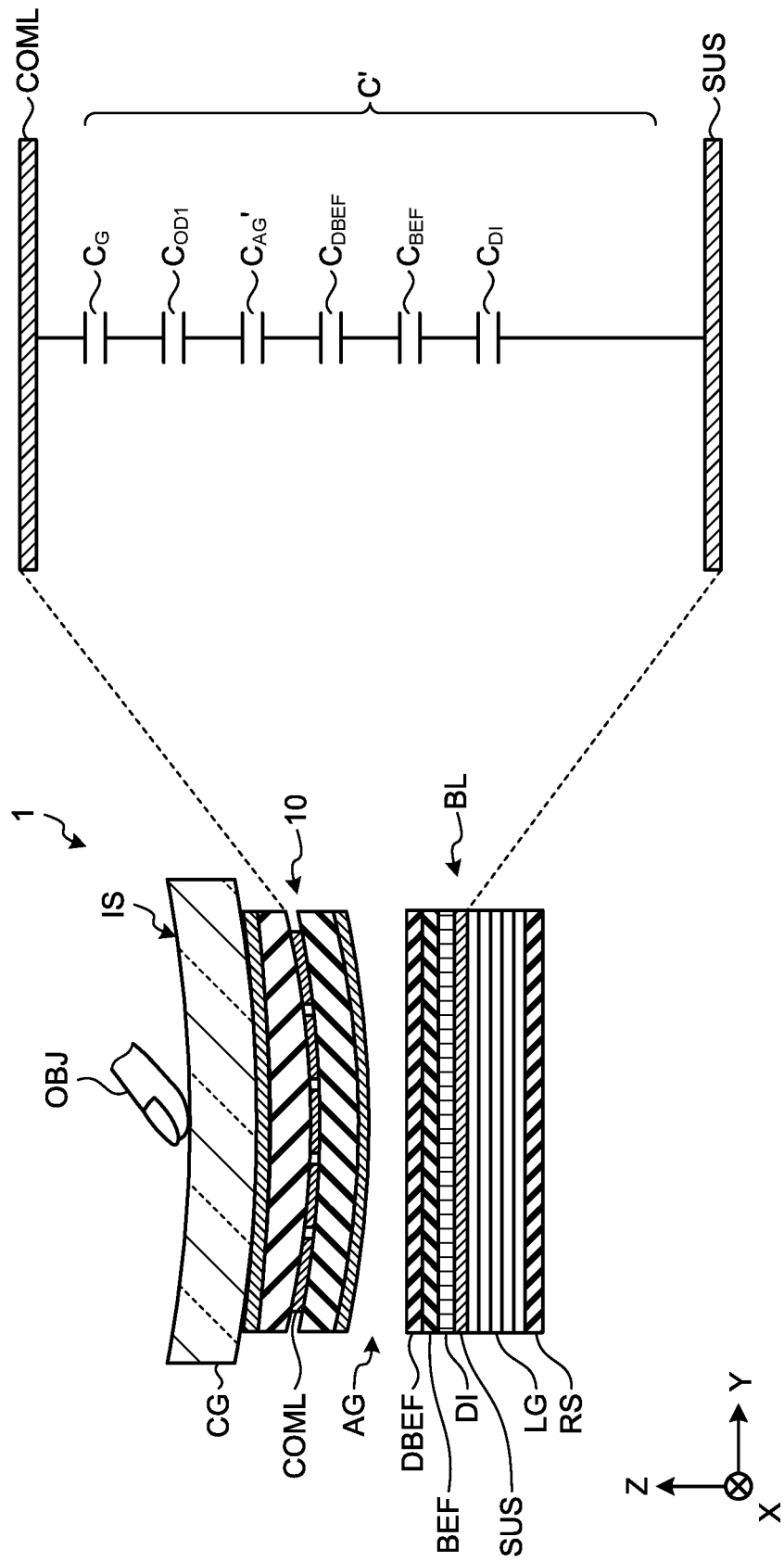
FIG. 33 is a cross-sectional diagram and an equivalent circuit diagram when a force is applied to the input surface of the display device with a touch detection function according to the fourth modification of the first embodiment.

FIG. 32 is a cross-sectional diagram and an equivalent circuit diagram when no force is applied to an input surface of a display device with a touch detection function according to a fourth modification of the first embodiment. FIG. 33 is a cross-sectional diagram and an equivalent circuit diagram when a force is applied to the input surface of the display device with a touch detection function according to the fourth modification of the first embodiment. As illustrated in FIG. 32 and FIG. 33, the electrodes SUS are provided between the light diffusion sheet DI and the light guide body LG in the fourth modification of the first embodiment. In this case, capacitance C between the drive electrode COML and the electrode SUS when no force is applied to the input surface IS can be expressed by the following equation (7).

$$1/C = (1/C_G) + (1/C_{OD1}) + (1/C_{AG}) + (1/C_{DBEF}) + (1/C_{BEF}) + (1/C_{DI}) \quad (7)$$

In the fourth modification of the first embodiment, capacitance C' between the drive electrode COML and the electrode SUS when a force is applied to the input surface IS can be expressed by the following equation (8).

$$1/C' = (1/C_G) + (1/C_{OD1}) + (1/C_{AG}') + (1/C_{DBEF}) + (1/C_{BEF}) + (1/C_{DI}) \quad (8)$$

In this case, the capacitance $C_{AG}'$ generated by the air gap AG is increased by $\Delta C_{AG}$ relative to the capacitance $C_{AG}$ generated by the air gap AG when no force is applied to the input surface IS, and is expressed by the above-mentioned equation (2).

1-9. Fifth Modification

Figure 34:
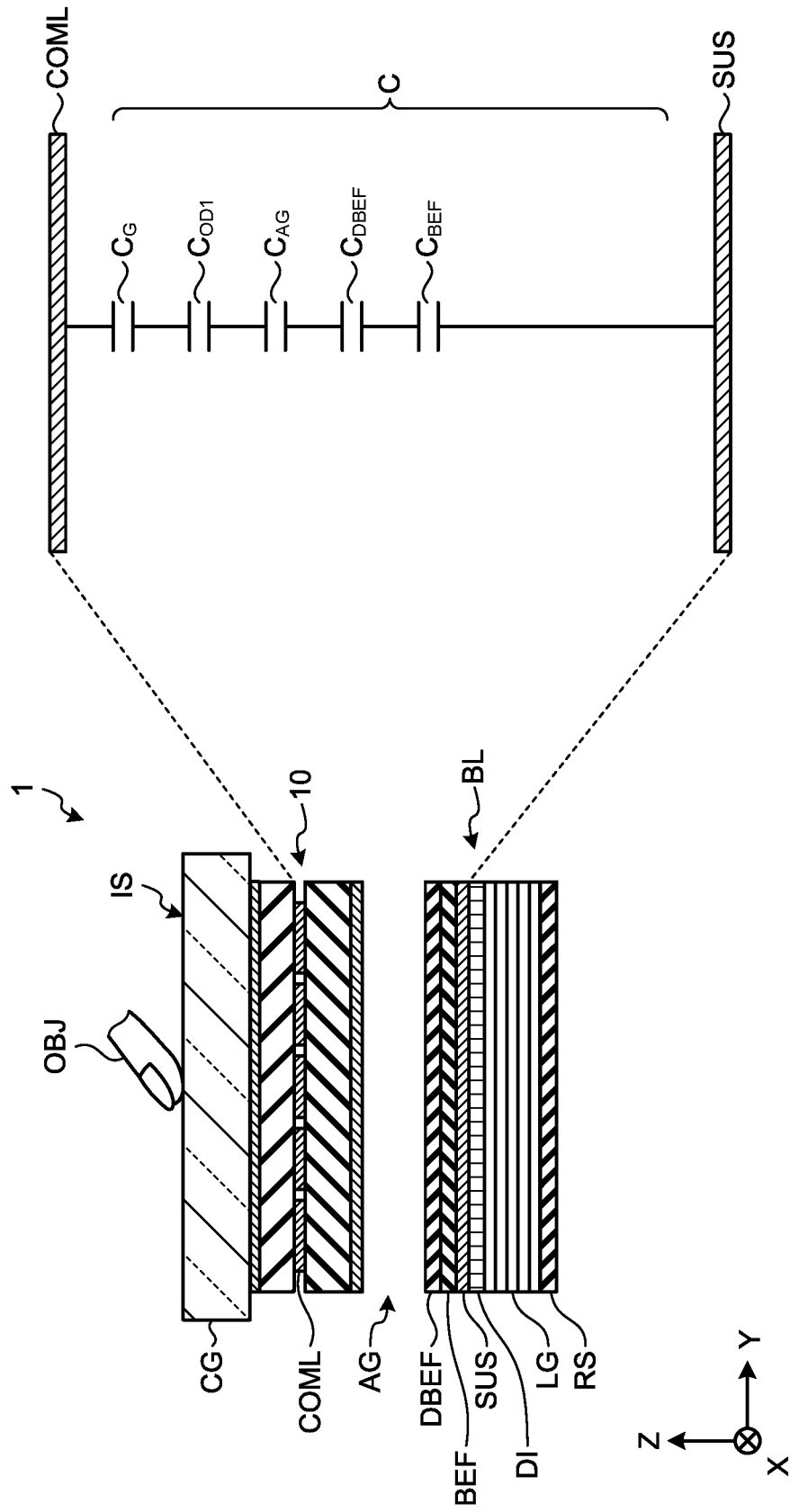
FIG. 34 is a cross-sectional diagram and an equivalent circuit diagram when no force is applied to an input surface of a display device with a touch detection function according to a fifth modification of the first embodiment.
Figure 35:
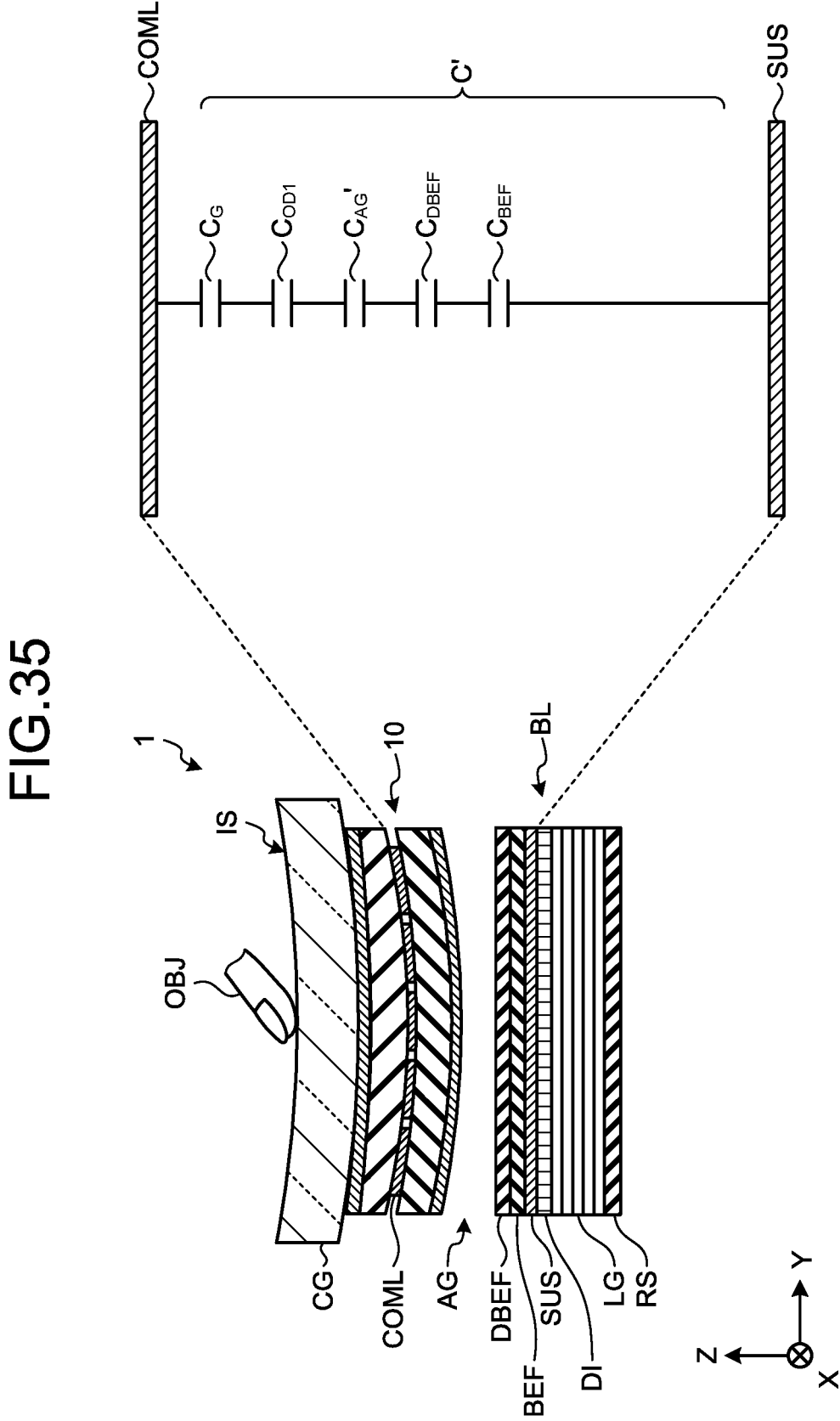
FIG. 35 is a cross-sectional diagram and an equivalent circuit diagram when a force is applied to the input surface of the display device with a touch detection function according to the fifth modification of the first embodiment.

FIG. 34 is a cross-sectional diagram and an equivalent circuit diagram when no force is applied to an input surface of a display device with a touch detection function according to a fifth modification of the first embodiment. FIG. 35 is a cross-sectional diagram and an equivalent circuit diagram when a force is applied to the input surface of the display device with a touch detection function according to the fifth modification of the first embodiment. As illustrated in FIG. 34 and FIG. 35, the electrodes SUS are provided between the luminance enhancing film BEF and the light diffusion sheet DI in the fifth modification of the first embodiment. In this case, capacitance C between the drive electrode COML and the electrode SUS when no force is applied to the input surface IS can be expressed by the following equation (9).

$$1/C = (1/C_G) + (1/C_{OD1}) + (1/C_{AG}) + (1/C_{DBEF}) + (1/C_{BEF}) \quad (9)$$

In the fifth modification of the first embodiment, capacitance C' between the drive electrode COML and the electrode SUS when a force is applied to the input surface IS can be expressed by the following equation (10).

$$1/C'=(1/C_G)+(1/C_{OD1})+(1/C_{AG}')+(1/C_{DBEF})+(1/C_{BEF}) \quad (10)$$

In this case, the capacitance $C_{AG}'$ generated by the air gap AG is increased by $\Delta C_{AG}$ relative to the capacitance $C_{AG}$ generated by the air gap AG when no force is applied to the input surface IS, and is expressed by the above-mentioned equation (2).

1-10. Sixth Modification

Figure 36:
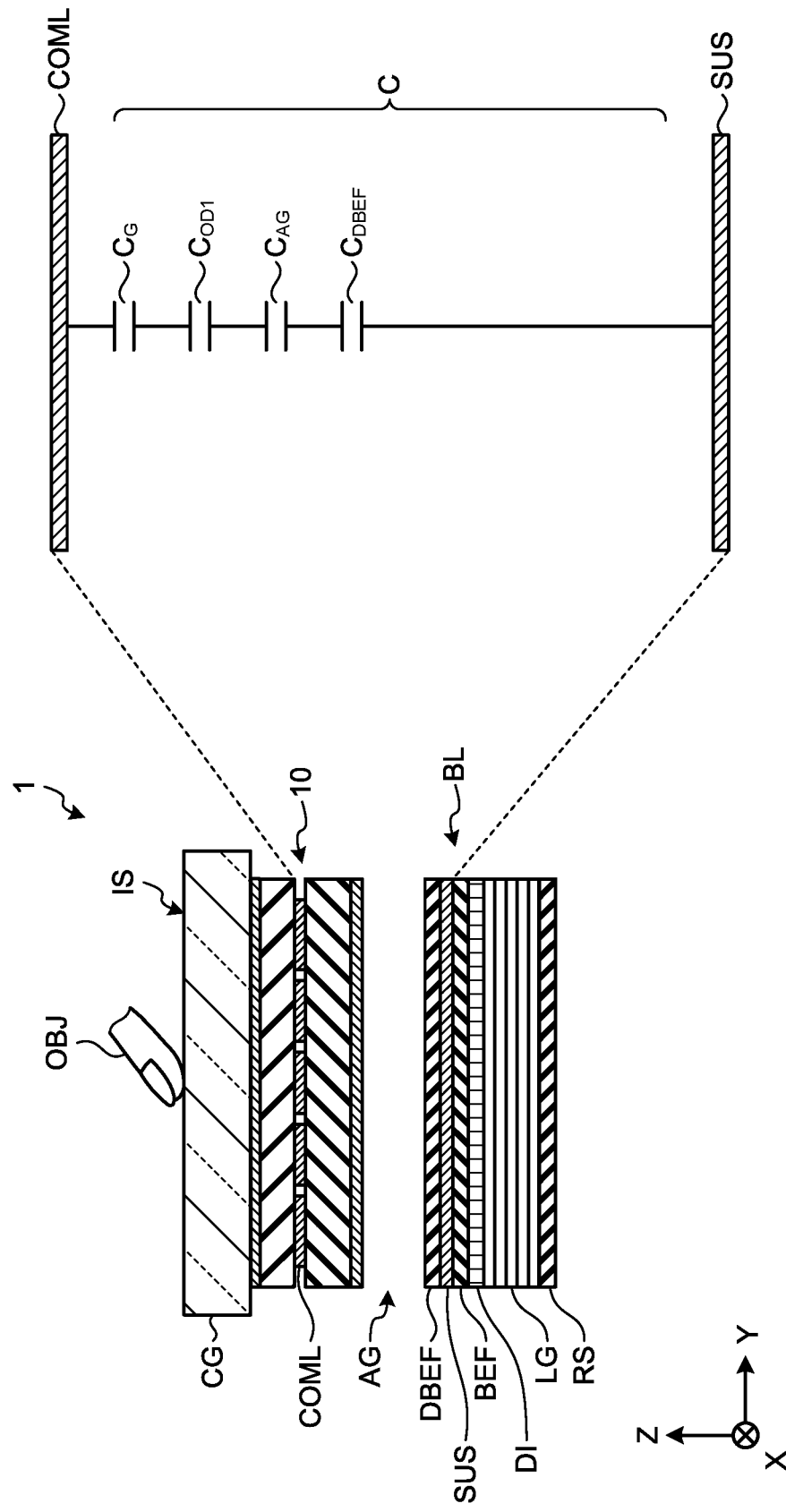
FIG. 36 is a cross-sectional diagram and an equivalent circuit diagram when no force is applied to an input surface of a display device with a touch detection function according to a sixth modification of the first embodiment.
Figure 37:
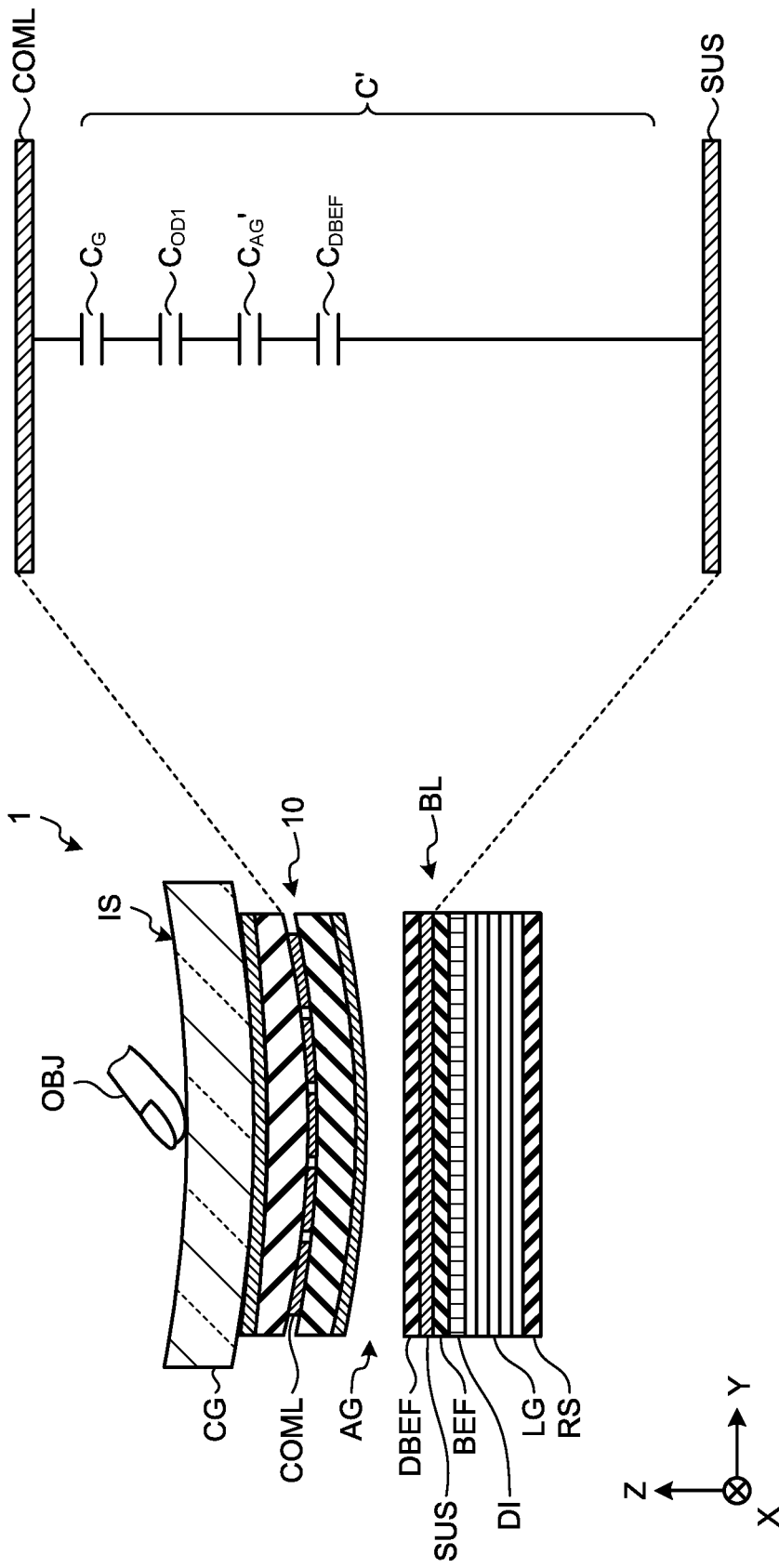
FIG. 37 is a cross-sectional diagram and an equivalent circuit diagram when a force is applied to the input surface of the display device with a touch detection function according to the sixth modification of the first embodiment.

FIG. 36 is a cross-sectional diagram and an equivalent circuit diagram when no force is applied to an input surface of a display device with a touch detection function according to a sixth modification of the first embodiment. FIG. 37 is a cross-sectional diagram and an equivalent circuit diagram when a force is applied to the input surface of the display device with a touch detection function according to the sixth modification of the first embodiment. As illustrated in FIG. 36 and FIG. 37, the electrodes SUS are provided between the reflective polarizing film DBEF and the luminance enhancing film BEF in the sixth modification of the first embodiment. In this case, capacitance C between the drive electrode COML and the electrode SUS when no force is applied to the input surface IS can be expressed by the following equation (11).

$$1/C=(1/C_G)+(1/C_{OD1})+(1/C_{AG})+(1/C_{DBEF}) \quad (11)$$

In the sixth modification of the first embodiment, capacitance C' between the drive electrode COML and the electrode SUS when a force is applied to the input surface IS can be expressed by the following equation (12).

$$1/C'=(1/C_G)+(1/C_{OD1})+(1/C_{AG}')+(1/C_{DBEF}) \quad (12)$$

In this case, the capacitance $C_{AG}'$ generated by the air gap AG is increased by $\Delta C_{AG}$ relative to the capacitance $C_{AG}$ generated by the air gap AG when no force is applied to the input surface IS, and is expressed by the above-mentioned equation (2).

1-11. Seventh Modification

Figure 38:
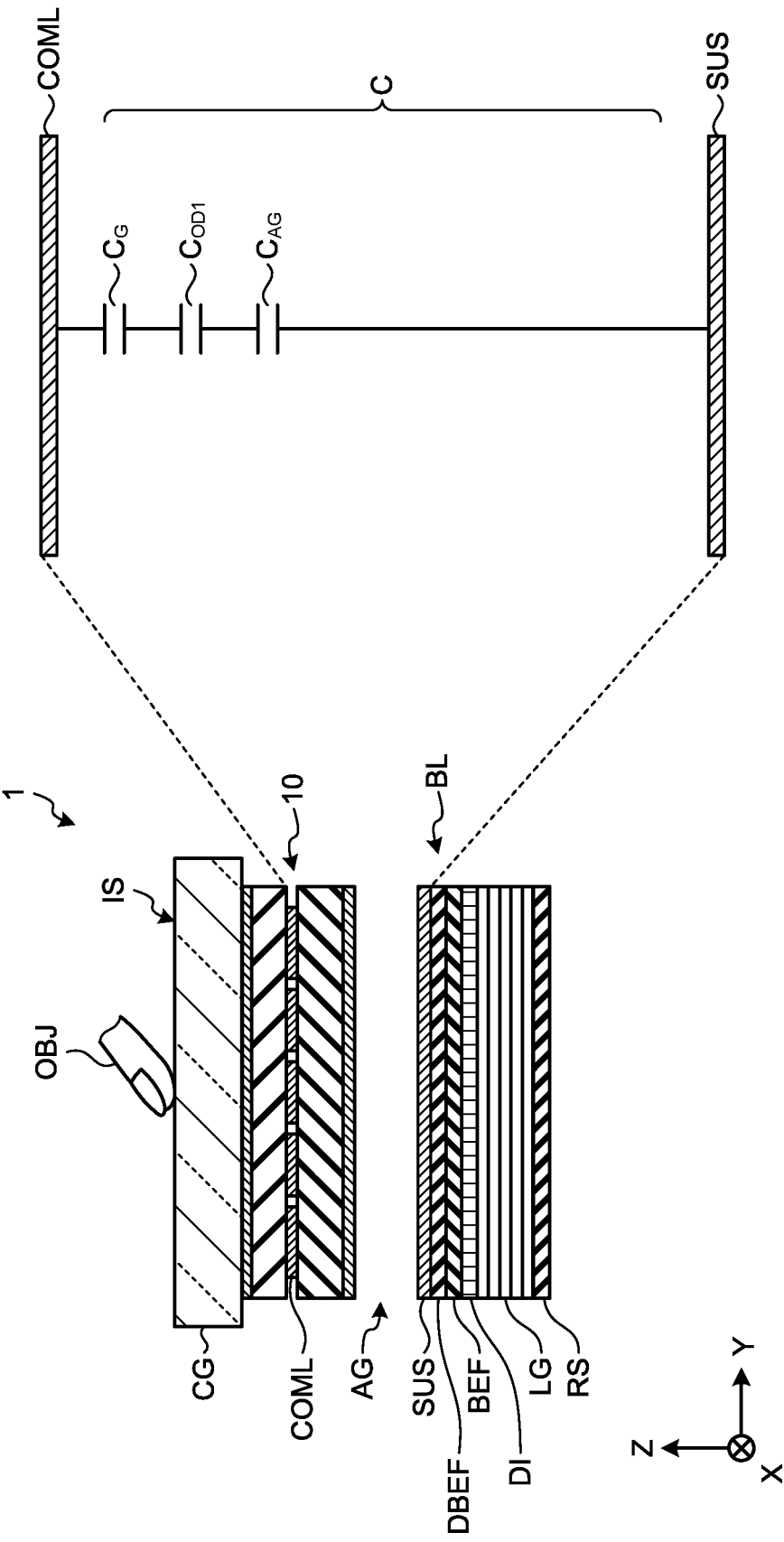
FIG. 38 is a cross-sectional diagram and an equivalent circuit diagram when no force is applied to an input surface of a display device with a touch detection function according to a seventh modification of the first embodiment.
Figure 39:
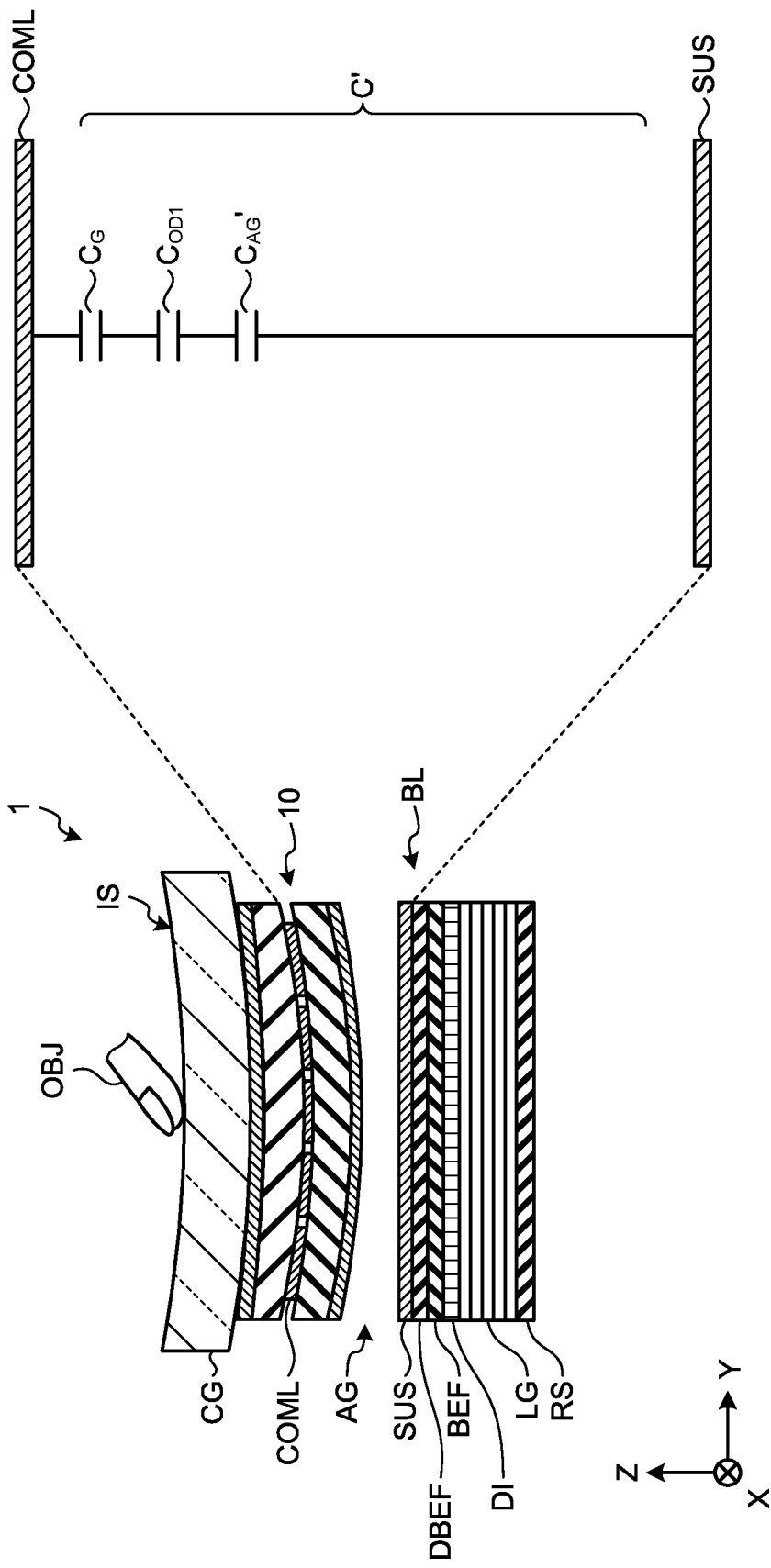
FIG. 39 is a cross-sectional diagram and an equivalent circuit diagram when a force is applied to the input surface of the display device with a touch detection function according to the seventh modification of the first embodiment.

FIG. 38 is a cross-sectional diagram and an equivalent circuit diagram when no force is applied to an input surface of a display device with a touch detection function according to a seventh modification of the first embodiment. FIG. 39 is a cross-sectional diagram and an equivalent circuit diagram when a force is applied to the input surface of the display device with a touch detection function according to the seventh modification of the first embodiment. As illustrated in FIG. 38 and FIG. 39, in the seventh modification of the first embodiment, the electrodes SUS are provided on a surface on the input surface IS side of the multilayered body LB included in the configuration of the backlight BL. In this case, capacitance C between the drive electrode COML and the electrode SUS when no force is applied to the input surface IS can be expressed by the following equation (13).

$$1/C=(1/C_G)+(1/C_{OD1})\pm(1/C_{AG}) \quad (13)$$

In the seventh modification of the first embodiment, capacitance C' between the drive electrode COML and the electrode SUS when a force is applied to the input surface IS can be expressed by the following equation (14).

$$1/C'=(1/C_G)+(1/C_{OD1})+(1/C_{AG}') \quad (14)$$

In this case, the capacitance $C_{AG}'$ generated by the air gap AG is increased by $\Delta C_{AG}$ relative to the capacitance $C_{AG}$ generated by the air gap AG when no force is applied to the input surface IS, and is expressed by the above-mentioned equation (2).

The configurations in the above-mentioned third to seventh modifications of the first embodiment can be provided by configuring the electrodes SUS using, for example, a conductive film having light transmissivity, such as indium tin oxide (ITO).

As described in the third to seventh modifications of the first embodiment, the display device with a touch detection function 1 according to the first embodiment can have a configuration in which the air gap AG (dielectric layer) is provided between the electrodes SUS and the drive electrodes COML, the air gap AG having the thickness varying with deflection of the display portion with a touch detection function 10 when a force is applied to the input surface IS by a detection target object OBJ. This configuration enables force information to be detected by detecting variations in the capacitance between the drive electrodes COML and the electrodes SUS with variations in the distances d from the electrodes SUS to the drive electrodes COML.

While the display device with a touch detection function 1 is applied to the configuration in which both of the mutual-capacitive touch detection and the self-capacitive touch detection are performed in the above-mentioned first embodiment, the display device with a touch detection function 1 can also be applied to the configuration in which the self-capacitive touch detection is not performed and only the mutual-capacitive touch detection is performed.

1-12. Eighth Modification

Figure 40:
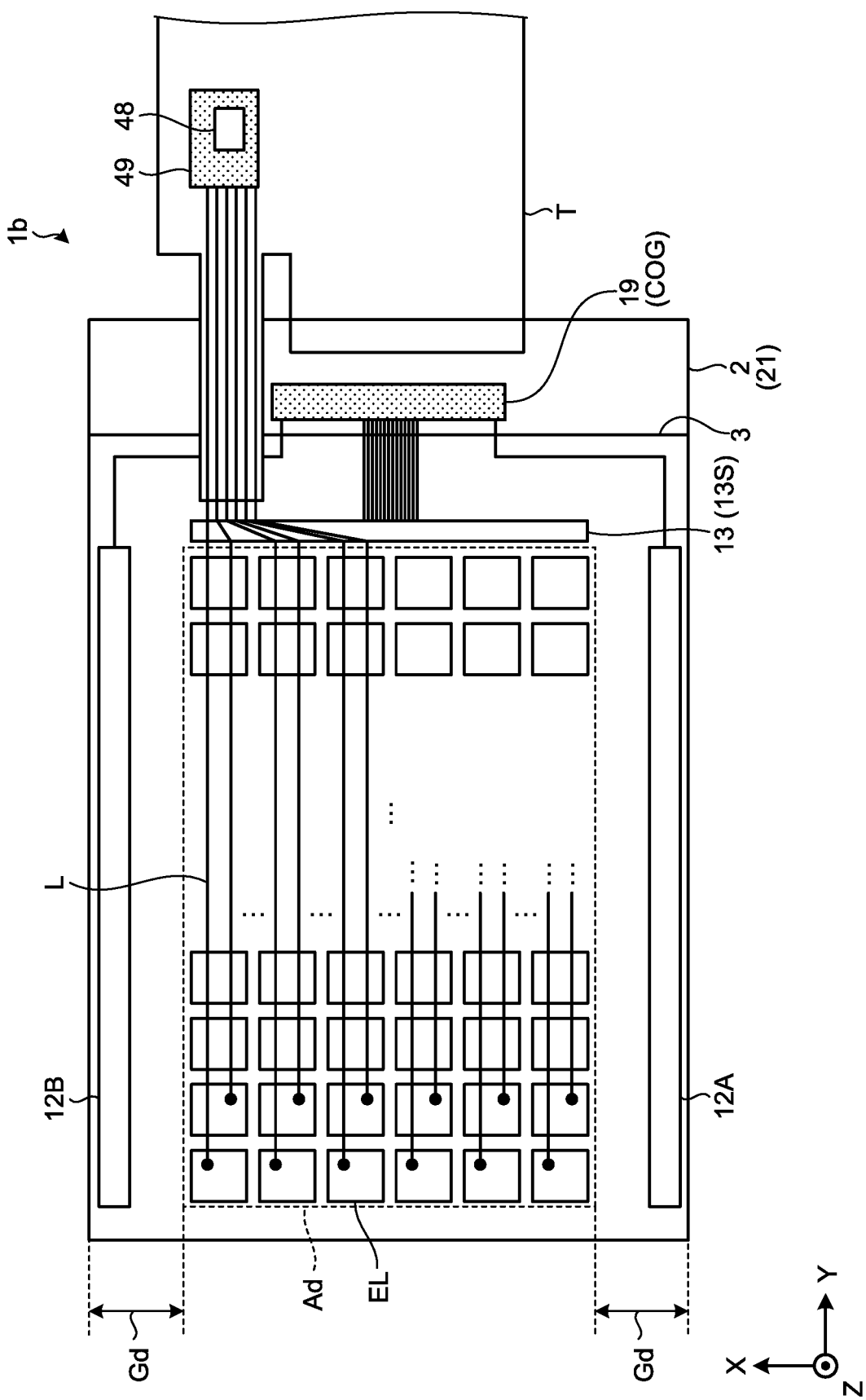
FIG. 40 is a diagram illustrating an example of a module in which a display device with a touch detection function according to an eighth modification of the first embodiment is mounted.
Figure 41:
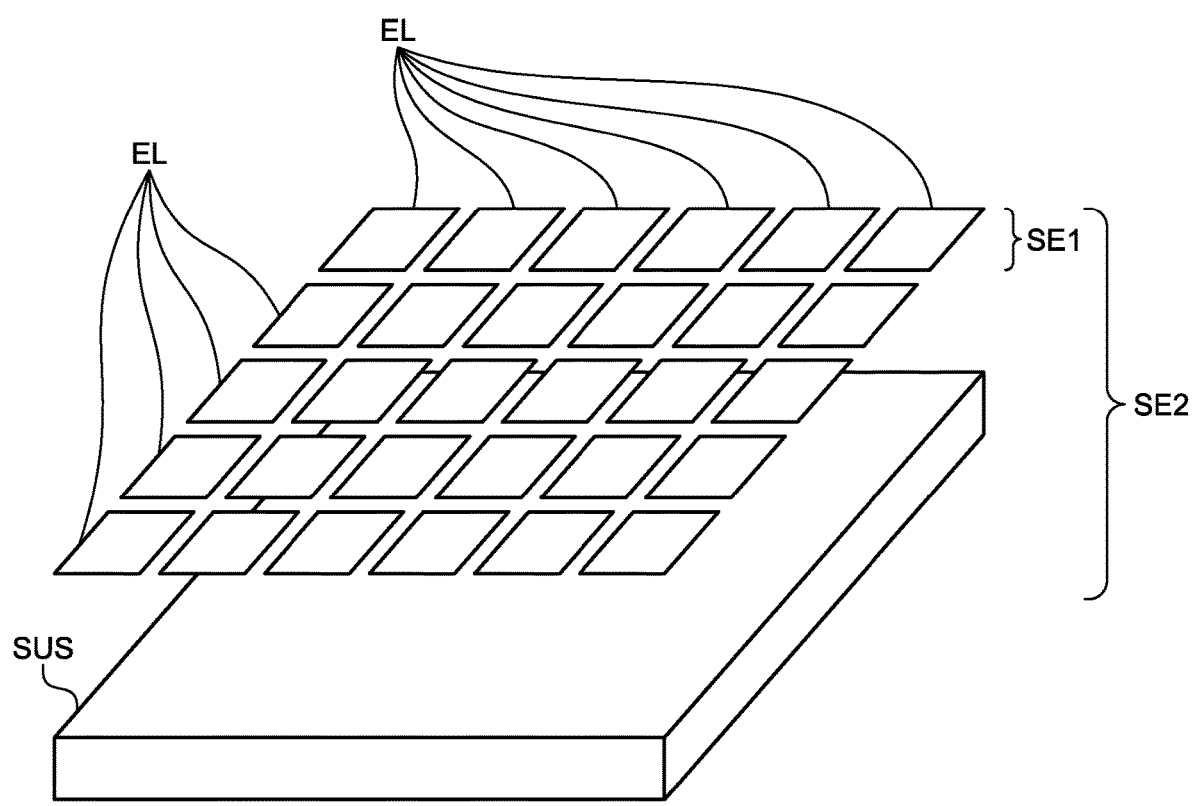
FIG. 41 is a perspective view of electrodes of the display device with a touch detection function according to the eighth modification of the first embodiment.

FIG. 40 is a diagram illustrating an example of a module in which a display device with a touch detection function according to an eighth modification of the first embodiment is mounted. FIG. 41 is a perspective view of electrodes of the display device with a touch detection function according to the eighth modification of the first embodiment. Duplicated explanations for components that are equivalent to or the same as those in the first embodiment are omitted.

A display device with a touch detection function 1b according to the eighth modification of the first embodiment performs touch detection based on the basic principle of the self-capacitive method. In the case of the self-capacitive method, a plurality of electrodes EL provided in a matrix form with the row-column configuration may be used as electrodes that commonly function as the touch detection electrodes TDL and the drive electrodes COML. In this case, each of the electrodes EL is coupled to a drive electrode controller 48 provided in the touch IC 49 through coupling portions such as wiring L. Although FIG. 40 illustrates that some electrodes EL are provided with the wiring L, actually, all of the electrodes EL are individually provided with wiring L or similar coupling portions. The drive electrode controller 48 may be provided on an array substrate (pixel substrate 2).

The shape and size of the electrodes EL are desirably set but the size of the electrodes EL may be set to correspond to the size of pixels, for example. In this case, one of electrodes (for example, the pixel electrode 22 or the drive electrode COML as a counter electrode in each pixel of a liquid crystal display device) included in the configuration of each pixel may be used as the electrode EL. That is to say, the electrode EL may also serve as an electrode provided in each pixel of the display device having the pixels.

As illustrated in FIG. 41, in the eighth modification of the first embodiment, the electrodes EL constitute the touch detector SE1 in FIG. 1. The electrodes EL and the electrode SUS constitute the force detector SE2 in FIG. 1.

In the eighth modification of the first embodiment, the electrode SUS is made of a conductive material (for example, aluminum). The potential of the electrode SUS is a reference potential. The reference potential is, for example, a ground potential GND. Any of the touch IC 49, the COG 19, and the host HST may be electrically coupled to the electrode SUS with a coupling wiring or the like, and any of the touch IC 49, the COG 19, and the host HST may supply the reference potential to the electrode SUS. The electrode SUS may be made up of, for example, the rear frame RFR made of a conductive material.

In the eighth modification of the first embodiment, the electrode EL corresponds to a "first electrode". The electrode SUS corresponds to a "second electrode".

When the electrode SUS is configured as an independent constituent member made of the conductive material, the same configuration as that in the first embodiment can be achieved by configuring the electrode SUS so that the electrode SUS is capable of being switched between a mode in which the electrode SUS is coupled to the force detection controller 50 of the detection controller 200 and a mode in which the potential of the electrode SUS is set to the reference potential. That is to say, the display device with a touch detection function 1b according to the eighth modification of the first embodiment can be configured to have the same configuration as that of the display device with a touch detection function 1 according to the first embodiment.

1-12-1. Principle of Force Detector
Basic Principle

Figure 42:
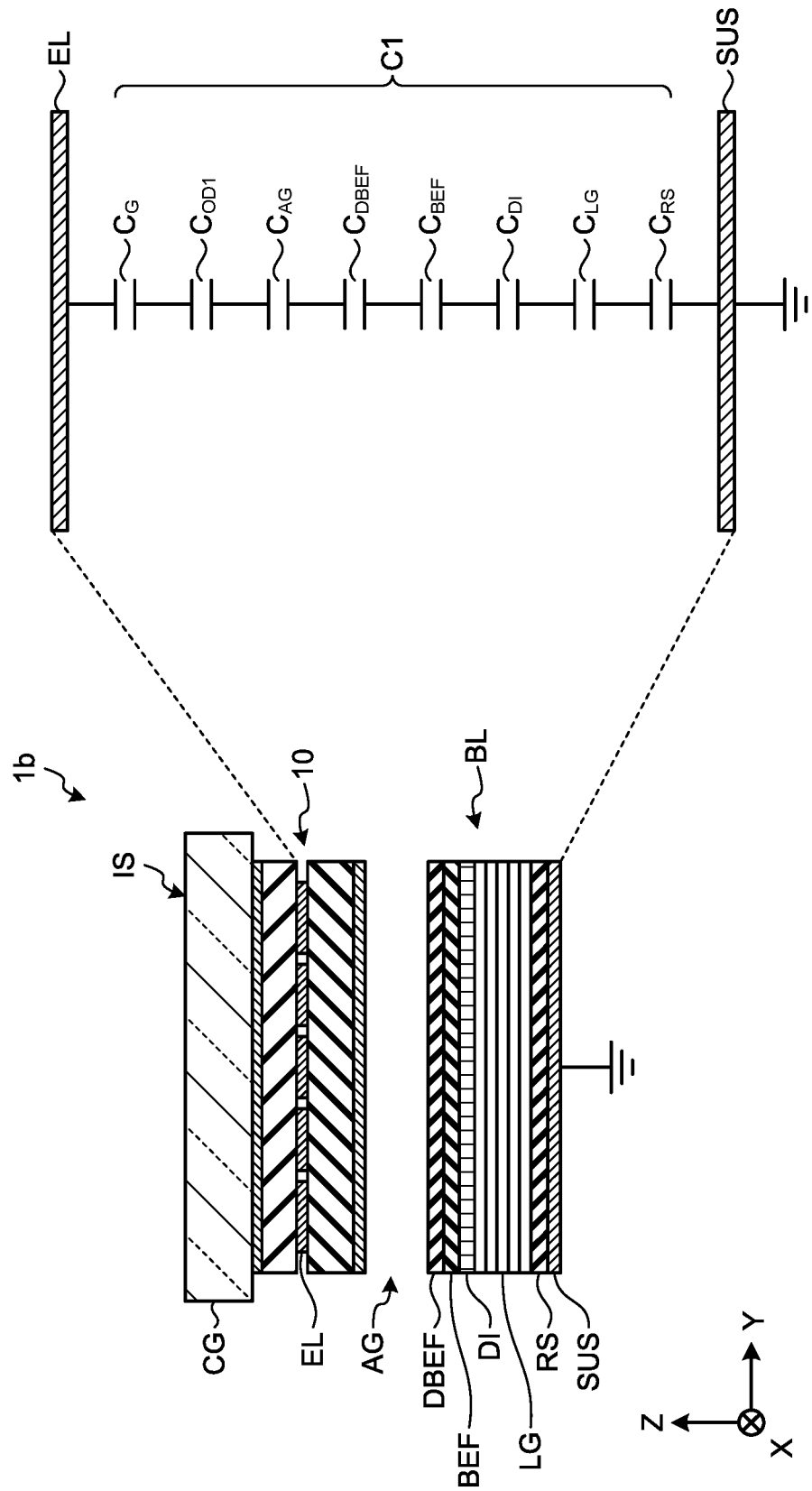
FIG. 42 is a cross-sectional diagram and an equivalent circuit diagram of the display device with a touch detection function according to the eighth modification of the first embodiment.

FIG. 42 is a cross-sectional diagram and an equivalent circuit diagram of the display device with a touch detection function according to the eighth modification of the first embodiment. As illustrated in FIG. 42, capacitance C1 expressed by the following equation (15) is present between the electrode EL and the electrode SUS when capacitance generated by the second substrate 21 is $C_G$, capacitance generated by the first optical element OD1 is $C_{OD1}$, capacitance generated by the air gap AG is $C_{AG}$, capacitance generated by the reflective polarizing film DBEF is $C_{DBEF}$, capacitance generated by the luminance enhancing film BEF is $C_{BEF}$, capacitance generated by the light diffusion sheet DI is $C_D'$, capacitance generated by the light guide body LG is $C_{LG}$, and capacitance generated by the light reflector RS is $C_{RS}$.

$$1/C = (1/C_G) + (1/C_{OD1}) + (1/C_{AG}) + (1/C_{DBEF}) + (1/C_{BEF}) + (1/C_{DI}) + (1/C_{LG}) + (1/C_{RS}) \quad (15)$$

In a state where no detection target object OBJ is in contact with or in proximity to the input surface IS, capacitance C that is detected by the electrode EL can be expressed by the following equation (16).

$$C = C1 \quad (16)$$

Figure 43:
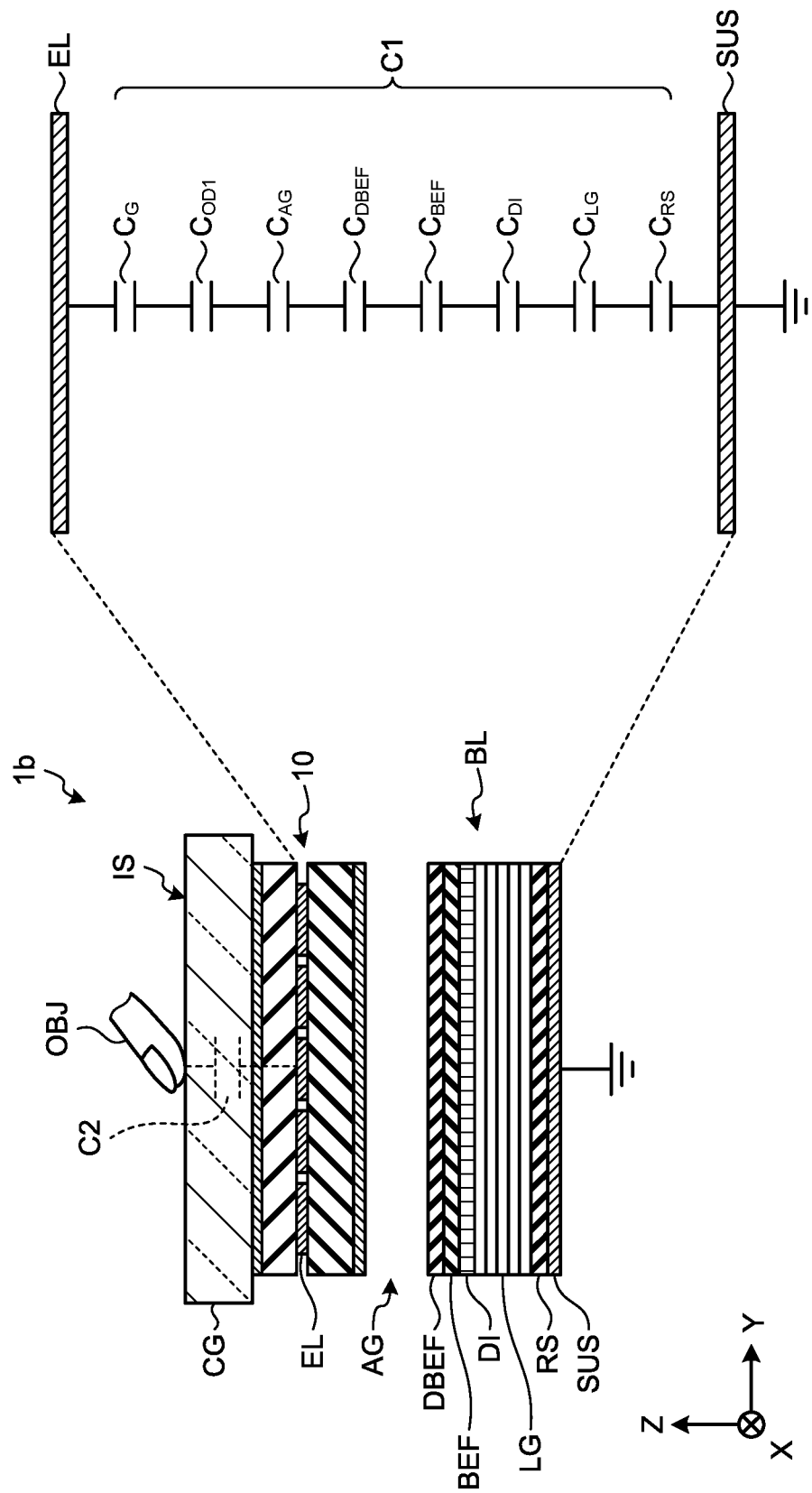
FIG. 43 is a cross-sectional diagram and an equivalent circuit diagram when a detection target object is in contact with or in proximity to an input surface of the display device with a touch detection function according to the eighth modification of the first embodiment.

FIG. 43 is a cross-sectional diagram and an equivalent circuit diagram when a detection target object is in contact with or in proximity to the input surface of the display device with a touch detection function according to the eighth modification of the first embodiment. As illustrated in FIG. 43, when a detection target object OBJ (a finger in this example) is in contact with or in proximity to the input surface IS, capacitance C2 is generated between the electrode EL and the detection target object OBJ. In this case, the capacitance C that is detected by the electrode EL can be expressed by the following equation (17).

$$C = C2 + C1 \quad (17)$$

Figure 44:
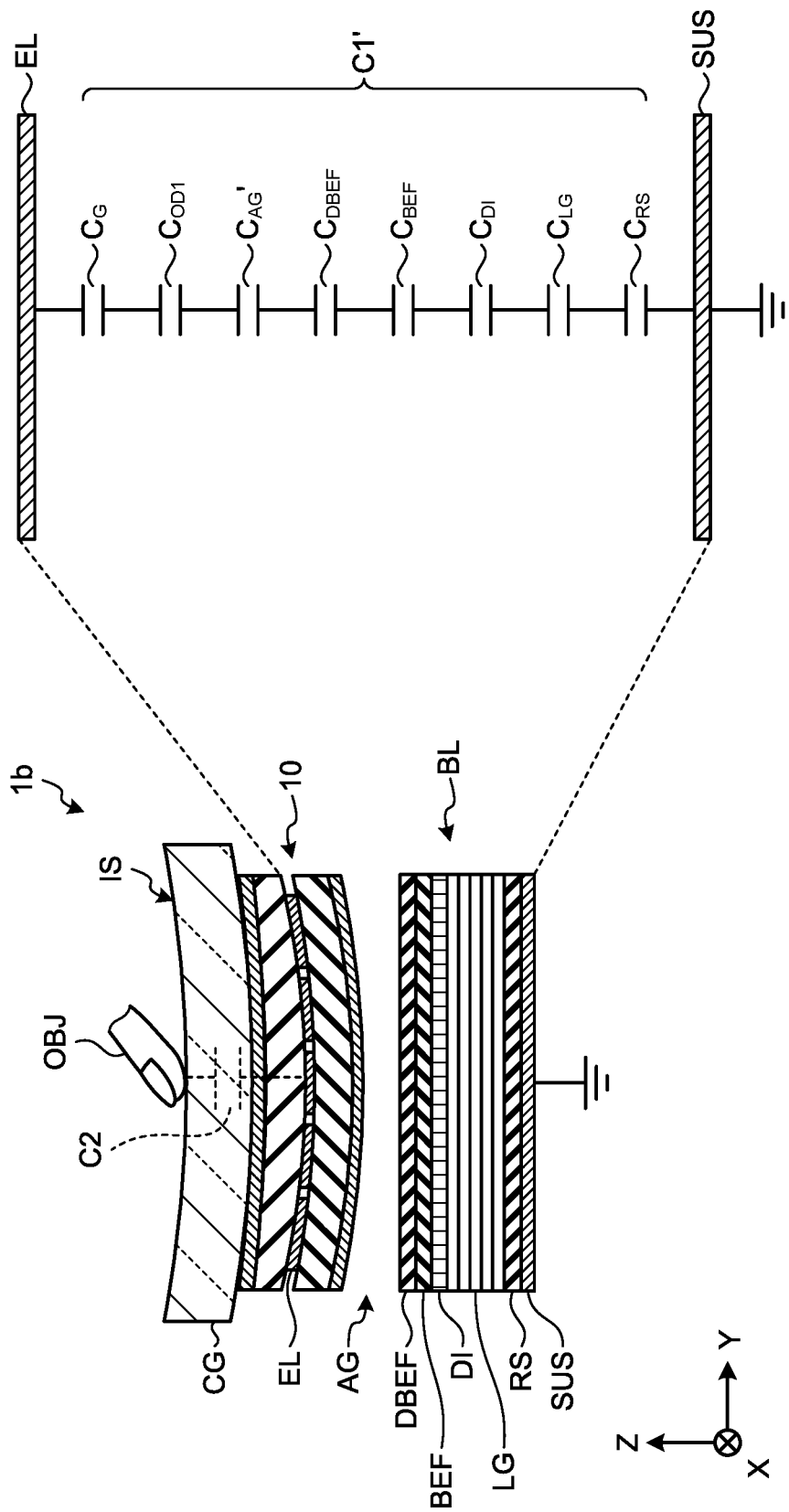
FIG. 44 is a cross-sectional diagram and an equivalent circuit diagram when a force is applied to the input surface of the display device with a touch detection function according to the eighth modification of the first embodiment.

FIG. 44 is a cross-sectional diagram and an equivalent circuit diagram when a force is applied to the input surface of the display device with a touch detection function according to the eighth modification of the first embodiment. As illustrated in FIG. 44, when the detection target object OBJ applies the force onto the input surface IS, the display portion with a touch detection function 10 is deflected. The deflection of the display portion with a touch detection function 10 reduces the thickness of the air gap AG. In this case, capacitance $C_{AG}$ generated by the air gap AG is increased by $\Delta C_{AG}$ relative to the capacitance $C_{AG}$ generated by the air gap AG when no force is applied to the input surface IS, and is expressed by the following equation (18).

$$C_{AG}' = C_{AG} + \Delta C_{AG} \quad (18)$$

Capacitance C1' between the electrode EL and the electrode SUS in this case can be expressed by the following equation (19).

$$1/C1' = (1/C_G) + (1/C_{OD1}) + (1/C_{AG}') + (1/C_{DBEF}) + (1/C_{BEF}) + (1/C_{DI}) + (1/C_{LG}) + (1/C_{RS}) \quad (19)$$

In this case, the capacitance C that is detected by the electrode EL can be expressed by the following equation (20).

$$C = C2 + C1' \quad (20)$$

The display device with a touch detection function 1b according to the eighth modification of the first embodiment simultaneously performs the self-capacitive touch detection and the force detection by the electrodes EL. That is to say, the touch detection and the force detection can be performed by detecting the capacitance value C in the state in which no detection target object OBJ is in contact with or in proximity to the input surface IS, the capacitance value C in the state in which a detection target object OBJ is in contact with or in proximity to the input surface IS, and the capacitance value C in the state in which the detection target object OBJ applies the force to the input surface IS.

Figure 45:
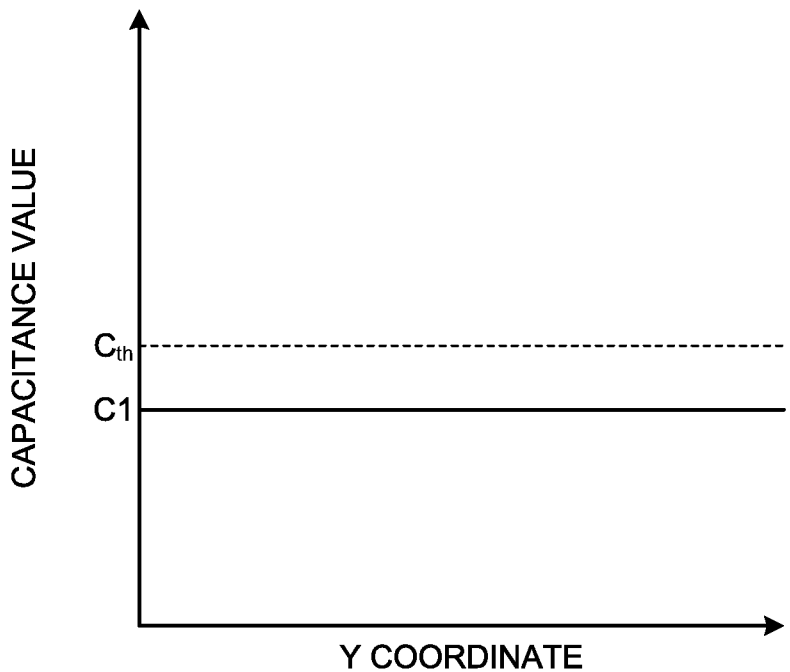
FIG. 45 is a graph illustrating a capacitance value in Y-axis direction while no detection target object is in contact with or in proximity to the input surface.
Figure 46:
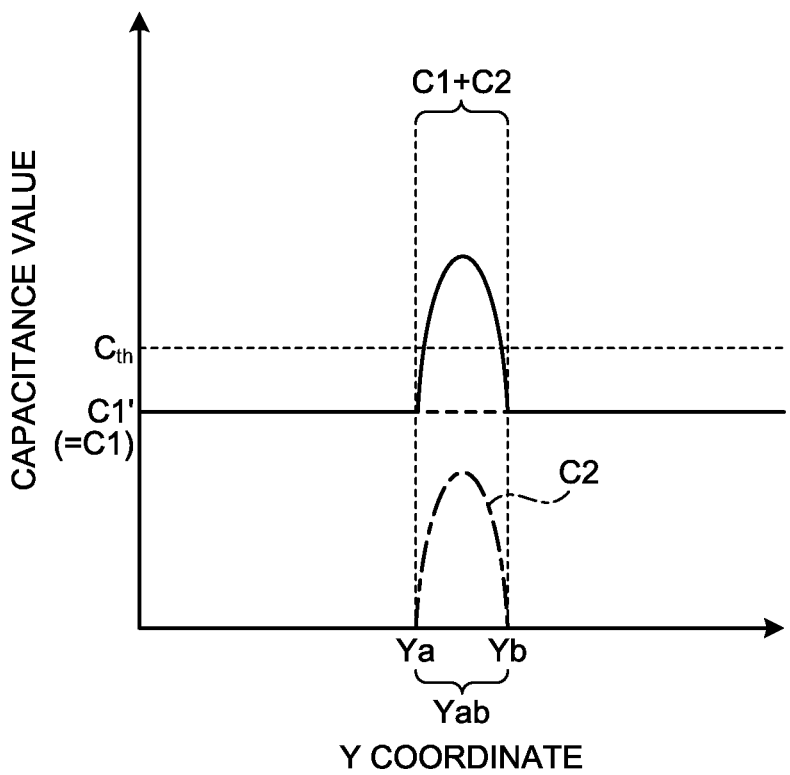
FIG. 46 is a graph illustrating the capacitance value in the Y-axis direction while a detection target object is in contact with or in proximity to the input surface.
Figure 47:
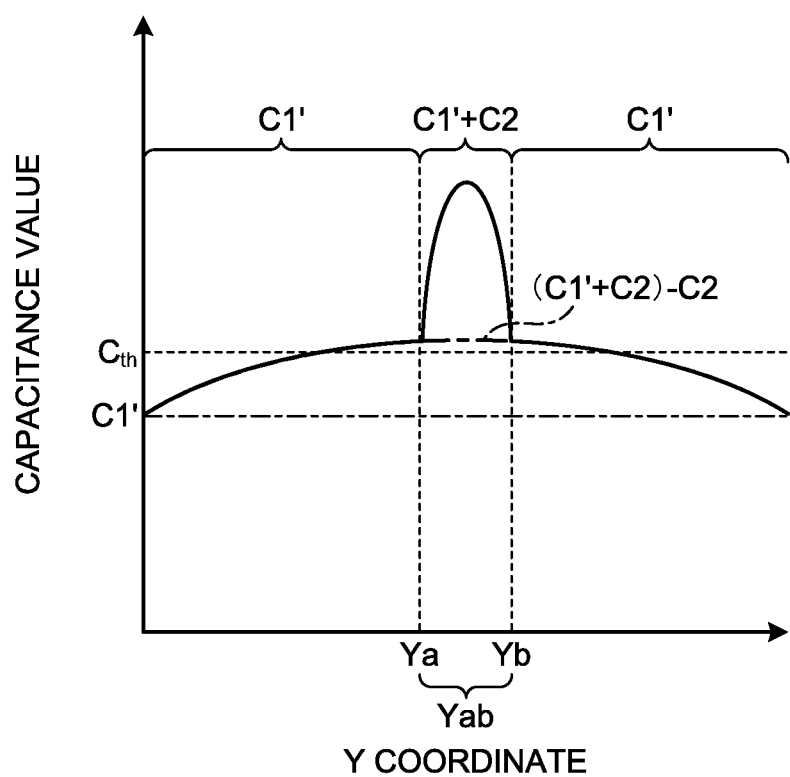
FIG. 47 is a graph illustrating the capacitance value in the Y-axis direction while a force is applied to the input surface.

FIG. 45 is a graph illustrating the capacitance value in the Y-axis direction while no detection target object is in contact with or in proximity to the input surface. FIG. 46 is a graph illustrating the capacitance value in the Y-axis direction while a detection target object is in contact with or in proximity to the input surface. FIG. 47 is a graph illustrating the capacitance value in the Y-axis direction while a force is applied to the input surface. In FIG. 45 to FIG. 47, the transverse axis indicates the Y coordinate and the longitudinal axis indicates the capacitance value that is detected by the electrode EL. In the examples illustrated in FIG. 45 to FIG. 47, the coordinate in the X-axis direction is a contact position or a proximity position of the detection target object OBJ on or to the input surface IS. Although the Y-axis direction of the force detection region on the input surface IS is described as an example, the same description can be used for the X-axis direction.

In the eighth modification of the first embodiment, as illustrated in FIG. 45 to FIG. 47, a predetermined threshold $C_{th}$ is set for the capacitance value C that is detected by the electrode EL. While no detection target object OBJ is in contact with or in proximity to the input surface IS, as illustrated in FIG. 45, the capacitance value C1 between the electrode EL and the electrode SUS is uniformly detected on the entire region of the force detection region on the input surface IS (C=C1).

While a detection target object OBJ is in contact with or in proximity to the input surface IS, the capacitance C2 generated between the electrode EL and the detection target object OBJ is added to the capacitance value C1 between the electrode EL and the electrode SUS, so that a capacitance value C obtained by adding the capacitance values C1 and C2 is detected in a region Yab from a coordinate Ya to a coordinate Yb in which the detection target object OBJ is in contact with or in proximity to the input surface IS (C=C1+C2), as illustrated in FIG. 46. In the eighth modification of the first embodiment, when a region in which the capacitance value C detected by the electrode EL exceeds the threshold $C_{th}$ is present, it is determined that a detection target object OBJ is in contact with or in proximity to the input surface IS.

The capacitance value C2 generated between the electrode EL and the detection target object OBJ can be determined by calculating a difference between the capacitance value C(=C1+C2) detected in the state in which the detection target object OBJ is in contact with or in proximity to the input surface IS and the capacitance value C(=C1) detected in the state in which no detection target object OBJ is in contact with or in proximity to the input surface IS (C2=(C1+C2)−C1).

While a force is applied to the input surface IS, as illustrated in FIG. 47, the capacitance value C1 between the electrode EL and the electrode SUS is increased in the entire region containing the region Yab in which the detection target object OBJ is in contact with the input surface IS (C1<C1'). In this case, the capacitance value C in the entire region of the force detection region on the input surface IS can be determined by subtracting the capacitance value C2 generated between the electrode EL and the detection target object OBJ calculated in the above-mentioned manner from the capacitance value C(=C1'+C2) detected by the electrode EL in the region Yab.

A method for calculating the capacitance value C in the region Yab in which a detection target object OBJ is in contact with the input surface IS is not limited to the above-mentioned method. For example, the coordinate Ya and the coordinate Yb as both end portions of the region Yab in which a detection target object OBJ is in contact with the input surface IS may be detected, and the capacitance value C between the coordinate Ya and the coordinate Yb may be determined by linear interpolation or curve interpolation using capacitance values at a plurality of coordinates. The method for calculating the capacitance value C in the region Yab in which a detection target object OBJ is in contact with the input surface IS does not limit the present disclosure.

1-12-2. Configuration and Operation of Force Detection Controller

In the eighth modification of the first embodiment, the force detection controller 50 illustrated in FIG. 1 performs force detection processing. To be more specific, for example, the force detection processor 442 of the signal processor 44 in the force detection controller 50 illustrated in FIG. 2 performs the force detection processing. For example, the force detection processor 442 in the force detection controller 50 illustrated in FIG. 22 performs the force detection processing in the eighth modification of the first embodiment. The following describes a configuration example of a force detection processor 442b in a force detection controller 50b by which the force detection processor 442 in the force detection controller 50 illustrated in FIG. 2 can be replaced.

Figure 48:
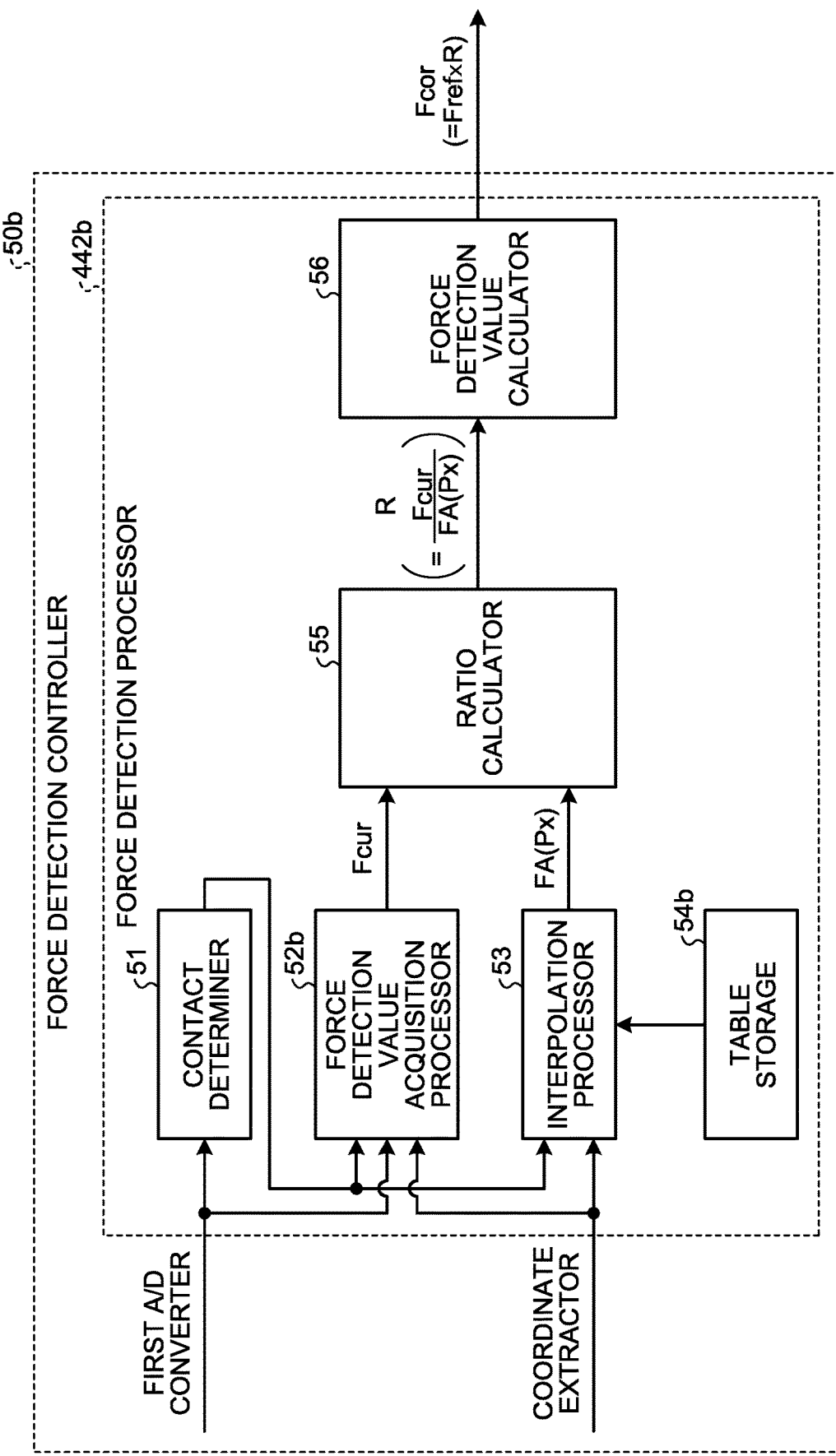
FIG. 48 is a functional block diagram of a force detection controller of the display device with a touch detection function according to the eighth modification of the first embodiment.

FIG. 48 is a functional block diagram of the force detection controller of the display device with a touch detection function according to the eighth modification of the first embodiment.

The force detection processor 442b of the force detection controller 50b in the eighth modification of the first embodiment is different from the force detection processor 442 (see FIG. 22) in the first embodiment in the point that the force detection processor 442b includes a force detection value acquisition processor 52b instead of the force detection value acquisition processor 52. The force detection processor 442b of the force detection controller 50b in the eighth modification of the first embodiment is different from the force detection processor 442 (see FIG. 22) in the first embodiment in the point that force detection processor 442b includes table storage 54b instead of the table storage 54.

Figure 49:
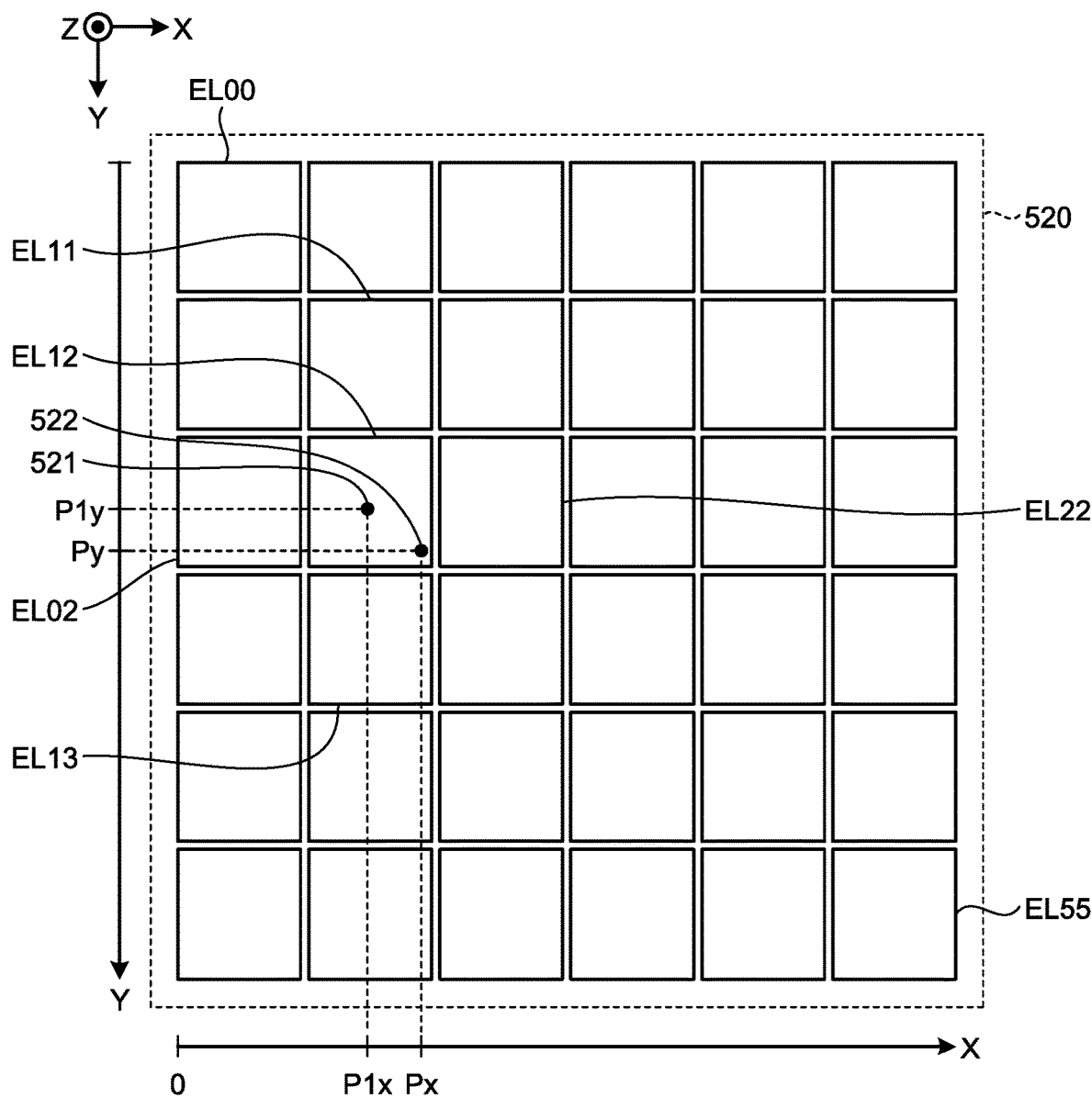
FIG. 49 is a diagram illustrating a detection region of the display device with a touch detection function according to the eighth modification of the first embodiment.

FIG. 49 is a diagram illustrating a detection region of the display device with a touch detection function according to the eighth modification of the first embodiment. In FIG. 49, the display device with a touch detection function 1b has 6×6 electrodes of an electrode EL00, . . . , an electrode EL11, . . . , an electrode EL02, an electrode EL12, an electrode EL22, . . . , an electrode EL13, . . . , and an electrode EL55 in a detection region 520. The number of electrodes EL illustrated in FIG. 49 is an example. The number of electrodes EL is not limited thereto and may be smaller than or larger than 6×6.

Force is assumed to be applied to a point 522 (Px, Py) overlapping the electrode EL12 when viewed from the Z direction.

FIG. 50 is diagram illustrating an example of a table stored in the display device with a touch detection function according to the eighth modification of the first embodiment. The table storage 54b stores therein a table TBL12.

The table TBL12 is used for interpolation processing for correcting a pre-correction force detection value Fcur12 detected by the electrode EL12. The table TBL12 contains a constant $K_{1200}$, . . . , a constant $K_{1211}$, . . . , a constant $K_{1202}$, a constant $K_{1212}$, a constant $K_{1222}$, . . . , a constant $K_{1213}$, . . . , and a constant $K_{1255}$.

The constant $K_{1200}$ is a value of the pre-correction force detection value Fcur12 that is detected by the electrode EL12 when a reference force is applied to a position overlapping, when viewed from the Z direction, a reference position of the electrode EL00. The reference position of the electrode EL00 is, for example, a center portion of the electrode EL00 in the X direction and the Y direction.

The constant $K_{1211}$ is a value of the pre-correction force detection value Fcur12 that is detected by the electrode EL12 when the reference force is applied to a position overlapping, when viewed from the Z direction, a reference position of the electrode EL11. The reference position of the electrode EL11 is, for example, a center portion of the electrode EL11 in the X direction and the Y direction.

The constant $K_{1202}$ is a value of the pre-correction force detection value Fcur12 that is detected by the electrode EL12 when the reference force is applied to a position overlapping, when viewed from the Z direction, a reference position of the electrode EL02. The reference position of the electrode EL02 is, for example, a center portion of the electrode EL02 in the X direction and the Y direction.

The constant $K_{1212}$ is a value of the pre-correction force detection value Fcur12 that is detected by the electrode EL12 when the reference force is applied to a position overlapping, when viewed from the Z direction, a reference position of the electrode EL12. The reference position of the electrode EL12 is, for example, a point 521 (P1x, P1y) corresponding to a center portion of the electrode EL12 in the X direction and the Y direction.

The constant $K_{1222}$ is a value of the pre-correction force detection value Fcur12 that is detected by the electrode EL12 when the reference force is applied to a position overlapping, when viewed from the Z direction, a reference position of the electrode EL22. The reference position of the electrode EL22 is, for example, a center portion of the electrode EL22 in the X direction and the Y direction.

The constant $K_{1213}$ is a value of the pre-correction force detection value Fcur12 that is detected by the electrode EL12 when the reference force is applied to a position overlapping, when viewed from the Z direction, a reference position of the electrode EL13. The reference position of the electrode EL13 is, for example, a center portion of the electrode EL13 in the X direction and the Y direction.

The constant $K_{1255}$ is a value of the pre-correction force detection value Fcur12 that is detected by the electrode EL12 when the reference force is applied to a position overlapping, when viewed from the Z direction, a reference position of the electrode EL55. The reference position of the electrode EL55 is, for example, a center portion of the electrode EL55 in the X direction and the Y direction.

The table storage 54b stores therein tables for the other electrodes EL similar to the table TBL12.

With reference to FIG. 48 again, the force detection value acquisition processor 52b performs the following processing when the contact determiner 51 has determined that a detection target object OBJ is in contact with or in proximity to the input surface IS. The force detection value acquisition processor 52b specifies the electrode EL overlapping, when viewed from the Z direction, a position where the force is applied by referring to the touch detection position Vout output from the extractor 45 (see FIG. 2). Then, the force detection value acquisition processor 52b acquires the pre-correction force detection value Fcur based on the capacitance value of the electrode EL by referring to signals output from the first A/D converter 43-1 (see FIG. 2).

The interpolation processor 53 performs the following processing when the contact determiner 51 has determined that a detection target object OBJ is in contact with or in proximity to the input surface IS. The interpolation processor 53 specifies the electrode EL overlapping, when viewed from the Z direction, the position where the force is applied by referring to the touch detection position Vout output from the coordinate extractor 45 (see FIG. 2). Then, the interpolation processor 53 reads the table TBL corresponding to the specified electrode EL from the table storage 54b. The interpolation processor 53 calculates, by the interpolation processing in the X direction and the Y direction, an interpolation value FA(Px, Py) when the reference force is assumed to be applied to the position where the force is applied (Px, Py). The interpolation processor 53 may perform the interpolation processing only in the X direction or the Y direction.

A flowchart of processing performed by the force detection controller 50b of the display device with a touch detection function 1b according to the eighth modification of the first embodiment is similar to the flowchart, illustrated in FIG. 26, of the processing performed by the force detection controller 50 of the display device with a touch detection function 1 according to the first embodiment, and illustration and explanation thereof are therefore omitted.

As described above, the display device with a touch detection function 1b according to the eighth modification of the first embodiment can calculate the post-correction force detection value Fcor by correcting the pre-correction force detection value Fcur that differs depending on the position where a force is applied. The display device with a touch detection function 1b according to the eighth modification of the first embodiment can thereby prevent force detection accuracy from being lowered depending on the position where a force is applied and suitably detect the force.

1-13. Ninth Modification

Figure 51:
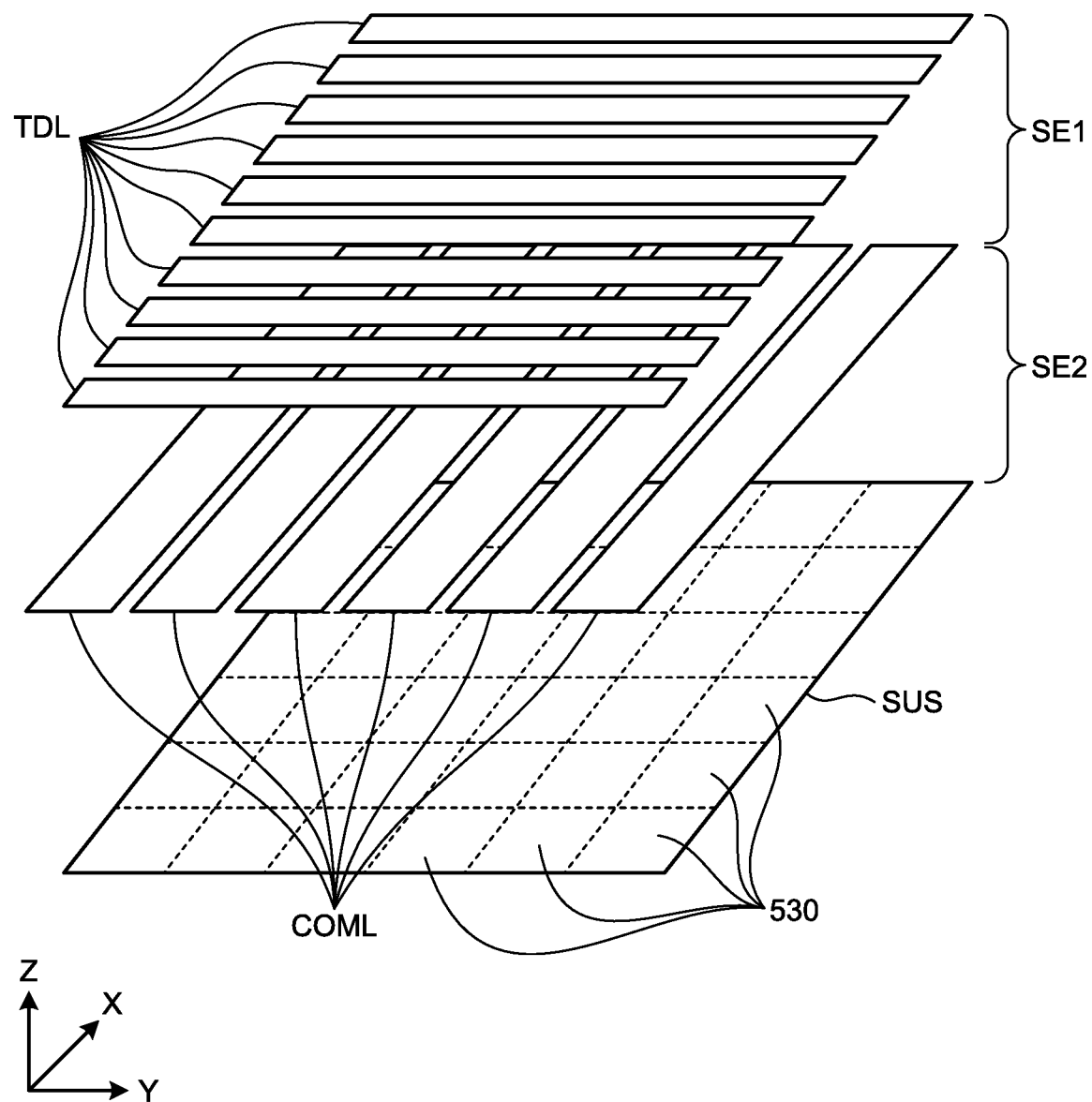
FIG. 51 is a perspective view of touch detection electrodes, drive electrodes, and an electrode of a display device with a touch detection function according to a ninth modification of the first embodiment.

FIG. 51 is a perspective view of touch detection electrodes, drive electrodes, and an electrode of a display device with a touch detection function according to a ninth modification of the first embodiment. As illustrated in FIG. 51, the electrode SUS may be configured as one electrode.

In this case, it can be considered that one electrode SUS is configured by aligning a plurality of virtual electrodes 530 in a matrix form with the row-column configuration. Accordingly, the display device with a touch detection function according to the ninth modification of the first embodiment can perform interpolation processing in the same manner as that in the eighth modification of the first embodiment. The display device with a touch detection function according to the ninth modification of the first embodiment can thereby prevent force detection accuracy from being lowered depending on the position where a force is applied and suitably detect a force as in the eighth modification of the first embodiment.

2. Second Embodiment

With reference to FIG. 20 according to the first embodiment again, the display device with a touch detection function may perform the following processing when a force is applied to the point 422 close to the electrode SUS2 relative to the point 421 at the center portion of the electrode SUS1. The display device with a touch detection function may calculate a weighted average of a first ratio R1 detected by the electrode SUS1 and a second ratio R2 detected by the electrode SUS2.

In a second embodiment, the force detection controller 50 illustrated in FIG. 1 performs force detection processing. To be more specific, for example, the force detection processor 442 of the signal processor 44 in the force detection controller 50 illustrated in FIG. 2 performs the force detection processing. For example, the force detection processor 442b in the force detection controller 50b illustrated in FIG. 48 performs the force detection processing in the second embodiment. The following describes a configuration example of a force detection processor 442c in a force detection controller 50c by which the force detection processor 442 in the force detection controller 50 illustrated in FIG. 2 can be replaced.

Figure 52:
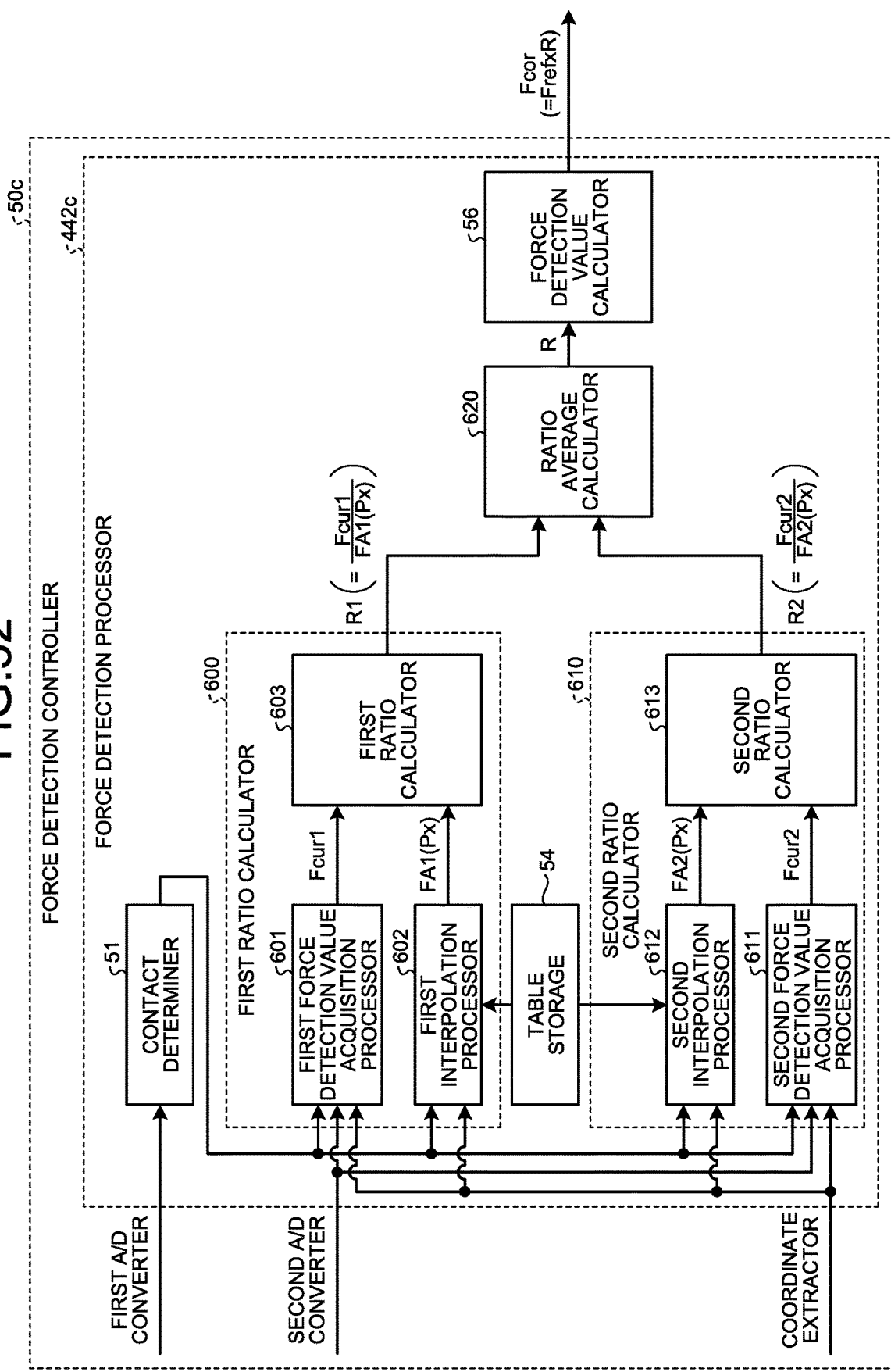
FIG. 52 is a functional block diagram of a force detection controller of a display device with a touch detection function according to a second embodiment.

FIG. 52 is a functional block diagram of the force detection controller of the display device with a touch detection function according to the second embodiment.

The force detection processor 442c of the force detection controller 50c according to the second embodiment includes the contact determiner 51, the table storage 54, the force detection value calculator 56, a first ratio calculator 600, a second ratio calculator 610, and a ratio average calculator 620. The first ratio calculator 600 includes a first force detection value acquisition processor 601, a first interpolation processor 602, and a first ratio calculator 603. The second ratio calculator 610 includes a second force detection value acquisition processor 611, a second interpolation processor 612, and a second ratio calculator 613.

The first force detection value acquisition processor 601 performs the following processing when the contact determiner 51 has determined that a detection target object OBJ is in contact with or in proximity to the input surface IS. The first force detection value acquisition processor 601 specifies the electrode SUS (see the electrode SUS1 in FIG. 20) overlapping, when viewed from the Z direction, a position where the force is applied (see the point 422 in FIG. 20) by referring to a touch detection position Vout output from the coordinate extractor 45 (see FIG. 2). The first force detection value acquisition processor 601 acquires a first pre-correction force detection value Fcur1 based on a capacitance value between the drive electrode COML and the specified electrode SUS by referring to signals output from the second A/D converter 43-2 (see FIG. 2).

The first interpolation processor 602 performs the following processing when the contact determiner 51 has determined that a detection target object OBJ is in contact with or in proximity to the input surface IS. The first interpolation processor 602 specifies the electrode SUS (see the electrode SUS1 in FIG. 20) overlapping, when viewed from the Z direction, the position where the force is applied (see the point 422 in FIG. 20) by referring to the touch detection position Vout output from the coordinate extractor 45 (see FIG. 2). The first interpolation processor 602 reads the table TBL corresponding to the specified electrode SUS from the table storage 54. The first interpolation processor 602 calculates, by interpolation processing, a first interpolation value FA1(Px) when a reference force is assumed to be applied to the X coordinate Px as the position where the force is applied. Although the first interpolation processor 602 performs polynomial interpolation in the second embodiment, the interpolation method is not limited thereto. The first interpolation processor 602 may perform linear interpolation or interpolation using another function.

The first ratio calculator 603 calculates the first ratio R1 of the first pre-correction force detection value Fcur1 relative to the first interpolation value FA1(Px). That is to say, R1=Fcur1/FA1(Px) is satisfied.

The second force detection value acquisition processor 611 performs the following processing when the contact determiner 51 has determined that a detection target object OBJ is in contact with or in proximity to the input surface IS. The second force detection value acquisition processor 611 refers to the touch detection position Vout output from the coordinate extractor 45 (see FIG. 2). The second force detection value acquisition processor 611 specifies the electrode SUS (see the electrode SUS2 in FIG. 20) close to the position where the force is applied (see the point 422 in FIG. 20) among the electrodes SUS (see the electrode SUS0 and the electrode SUS2 in FIG. 20) adjacent to the electrode SUS (see the electrode SUS1 in FIG. 20) overlapping, when viewed from the Z direction, the position where the force is applied. The second force detection value acquisition processor 611 acquires a second pre-correction force detection value Fcur2 based on a capacitance value between the drive electrode COML and the specified electrode SUS by referring to the signals output from the second A/D converter 43-2 (see FIG. 2).

The second interpolation processor 612 performs the following processing when the contact determiner 51 has determined that a detection target object OBJ is in contact with or in proximity to the input surface IS. The second interpolation processor 612 refers to the touch detection position Vout output from the coordinate extractor 45 (see FIG. 2). The second interpolation processor 612 specifies the electrode SUS (see the electrode SUS2 in FIG. 20) close to the position where the force is applied (see the point 422 in FIG. 20) among the electrodes SUS (see the electrode SUS0 and the electrode SUS2 in FIG. 20) adjacent to the electrode SUS (see the electrode SUS1 in FIG. 20) overlapping, when viewed from the Z direction, the position where the force is applied. The second interpolation processor 612 reads the table TBL corresponding to the specified electrode SUS from the table storage 54. The second interpolation processor 612 calculates, by the interpolation processing, a second interpolation value FA2(Px) when the reference force is assumed to be applied to the X coordinate Px as the position where the force is applied. Although the second interpolation processor 612 performs the polynomial interpolation in the third embodiment, the interpolation method is not limited thereto. The second interpolation processor 612 may perform the linear interpolation or interpolation using another function.

The second ratio calculator 613 calculates the second ratio R2 of the second pre-correction force detection value Fcur2 relative to the second interpolation value FA2(Px). That is to say, R2=Fcur2/FA2(Px) is satisfied.

The ratio average calculator 620 calculates a distance |P1−Px| between the position where the force is applied (see the point 422 in FIG. 20) and the reference position of the electrode SUS (see the electrode SUS1 in FIG. 20) overlapping, when viewed from the Z direction, the position where the force is applied. The ratio average calculator 620 calculates a distance |P2−Px| between the position where the force is applied (see the point 422 in FIG. 20) and the reference position of the electrode SUS (see the electrode SUS2 in FIG. 20) close to the position where the force is applied (see the point 422 in FIG. 20) among the electrodes SUS (see the electrode SUS0 and the electrode SUS2 in FIG. 20) adjacent to the electrode SUS overlapping, when viewed from the Z direction, the position where the force is applied. The ratio average calculator 620 calculates the ratio R by deriving a weighted average of the first ratio R1 and the second ratio R2 in accordance with the distance |P1−Px| and the distance |P2−Px|.

That is to say, R=(R1×|P2−Px|+R2×|P1−Px|)/|P1−P21| is satisfied. P1 is the X coordinate of the reference position of the electrode SUS overlapping, when viewed from the Z direction, the position where the force is applied. P2 is the X coordinate of the reference position of the electrode SUS close to the position where the force is applied among the electrodes SUS adjacent to the electrode SUS overlapping, when viewed from the Z direction, the position where the force is applied.

The ratio average calculator 620 may calculate the ratio R by deriving an average of the first ratio R1 and the second ratio R2. That is to say, R=(R1+R2)/2 may be employed.

Figure 53:
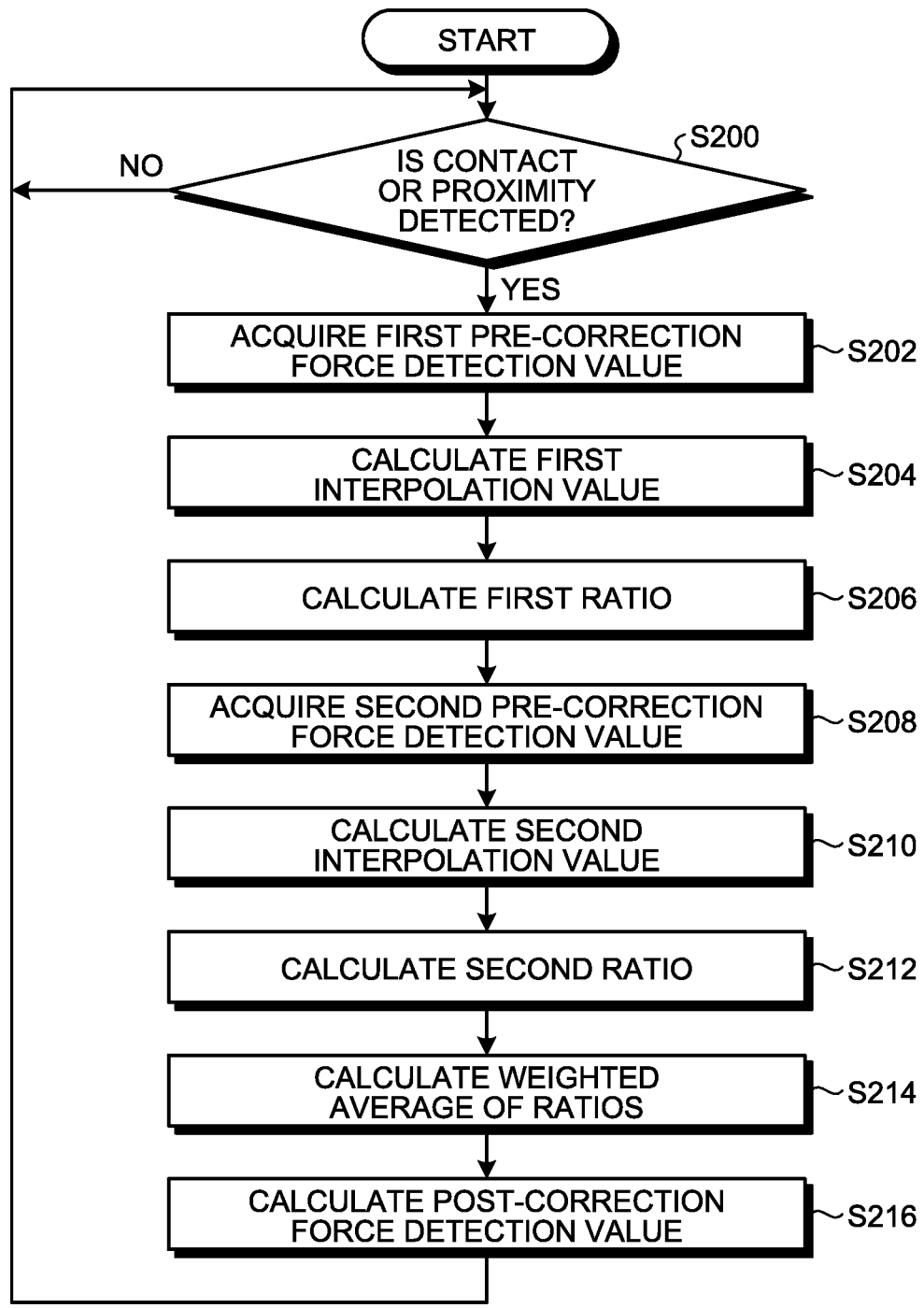
FIG. 53 is a flowchart of processing performed by the force detection controller of the display device with a touch detection function according to the second embodiment.

FIG. 53 is a flowchart of processing performed by the force detection controller of the display device with a touch detection function according to the second embodiment. The processing illustrated in FIG. 53 is performed in the above-mentioned mutual-capacitance detection periods 139.

At step S200, the contact determiner 51 determines whether or not a detection target object OBJ is in contact with or in proximity to the input surface IS. When the contact determiner 51 determines that no detection target object OBJ is in contact with or in proximity to the input surface IS (No at step S200), it stands by at step S200. When the contact determiner 51 determines that a detection target object OBJ is in contact with or in proximity to the input surface IS (Yes at step S200), the processing proceeds to step S202.

At step S202, the first force detection value acquisition processor 601 specifies the electrode SUS overlapping, when viewed from the Z direction, the position where the force is applied by referring to the touch detection position Vout output from the coordinate extractor 45 (see FIG. 2). Then, the first force detection value acquisition processor 601 acquires the first pre-correction force detection value Fcur1 based on the capacitance value between the drive electrode COML and the specified electrode SUS by referring to the signals output from the second A/D converter 43-2 (see FIG. 2).

At step S204, the first interpolation processor 602 specifies the electrode SUS overlapping, when viewed from the Z direction, the position where the force is applied by referring to the touch detection position Vout output from the coordinate extractor 45 (see FIG. 2). Subsequently, the first interpolation processor 602 reads the table TBL corresponding to the specified electrode SUS from the table storage 54. The first interpolation processor 602 calculates, by the interpolation processing, the first interpolation value FA1 (Px) when the reference force is assumed to be applied to the X coordinate Px as the position where the force is applied.

At step S206, the first ratio calculator 603 calculates the first ratio R1 of the first pre-correction force detection value Fcur1 relative to the first interpolation value FA1(Px).

At step S208, the second force detection value acquisition processor 611 specifies the electrode SUS close to the position where the force is applied among the electrodes SUS adjacent to the electrode SUS overlapping, when viewed from the Z direction, the position where the force is applied by referring to the touch detection position Vout output from the coordinate extractor 45 (see FIG. 2). Then, the second force detection value acquisition processor 611 acquires the second pre-correction force detection value Fcur2 based on the capacitance value between the drive electrode COML and the specified electrode SUS by referring to the signals output from the second A/D converter 43-2 (see FIG. 2).

At step S210, the second interpolation processor 612 specifies the electrode SUS close to the position where the force is applied among the electrodes SUS adjacent to the electrode SUS overlapping, when viewed from the Z direction, the position where the force is applied by referring to the touch detection position Vout output from the coordinate extractor 45 (see FIG. 2). Subsequently, the second interpolation processor 612 reads the table TBL corresponding to the specified electrode SUS from the table storage 54. The second interpolation processor 612 calculates, by the interpolation processing, the second interpolation value FA2(Px) when the reference force is assumed to be applied to the X coordinate Px as the position where the force is applied.

At step S212, the second ratio calculator 613 calculates the second ratio R2 of the second pre-correction force detection value Fcur2 relative to the second interpolation value FA2(Px).

At step S214, the ratio average calculator 620 calculates the ratio R by deriving the weighted average of the first ratio R1 and the second ratio R2 in accordance with the distance between the position where the force is applied and the reference position of the electrode SUS overlapping, when viewed from the Z direction, the position where the force is applied and the distance between the position where the force is applied and the reference position of the electrode SUS close to the position where the force is applied among the electrodes SUS adjacent to the electrode SUS overlapping, when viewed from the Z direction, with the position where the force is applied.

The force detection value calculator 56 calculates a post-correction force detection value Fcor by multiplying the reference force Fref by the ratio R at step S216, and the processing proceeds to step S200.

As described above, the display device with a touch detection function according to the second embodiment can calculate the post-correction force detection value Fcor in consideration of the first pre-correction force detection value Fcur1 and the second pre-correction force detection value Fcur2. The first pre-correction force detection value Fcur1 is a pre-correction force detection value detected by the electrode SUS overlapping, when viewed from the Z direction, the position where the force is applied. The second pre-correction force detection value Fcur2 is a pre-correction force detection value detected by the electrode SUS close to the position where the force is applied among the electrodes SUS adjacent to the electrode SUS overlapping, when viewed from the Z direction, the position where the force is applied. The display device with a touch detection function according to the second embodiment can thereby prevent force detection accuracy from being lowered depending on the position where the force is applied and suitably detect the force.

Modifications

The force detection controller 50c illustrated in FIG. 52 and the electrode structure illustrated in FIG. 41 or the electrode structure illustrated in FIG. 51 can also be combined. In this case, the first force detection value acquisition processor 601 can acquire the first pre-correction force detection value Fcur1 of one portion of the electrode SUS that overlaps, when viewed from the Z direction, the position where the force is applied based on the signals output from the first A/D converter 43-1 (see FIG. 2). The second force detection value acquisition processor 611 can acquire the second pre-correction force detection value Fcur2 of another portion of the electrode SUS adjacent to the one portion based on the signals output from the first A/D converter 43-1.

3. Third Embodiment

With reference to FIG. 20 according to the first embodiment again, the display device with a touch detection function may perform the following processing when a force is applied to the point 422 close to the electrode SUS2 side relative to the point 421 at the center portion of the electrode SUS1 in the X direction. The display device with a touch detection function calculates an average pre-correction force detection value Fave as an average of the first pre-correction force detection value Fcur1 on the electrode SUS1 and the second pre-correction force detection value Fcur2 on the electrode SUS2. The display device with a touch detection function calculates an average interpolation value FAave (Px) as an average of the first interpolation value FA1(Px) on the electrode SUS1 and the second interpolation value FA2(Px) on the electrode SUS2. The display device with a touch detection function may calculate a ratio R of the average pre-correction force detection value Fave relative to the average interpolation value FAave(Px). The average interpolation value FAave(Px) corresponds to a "first average" and the average pre-correction force detection value Fave corresponds to a "second average".

3-1. Principle of Force Detection
Correction Principle

Figure 54:
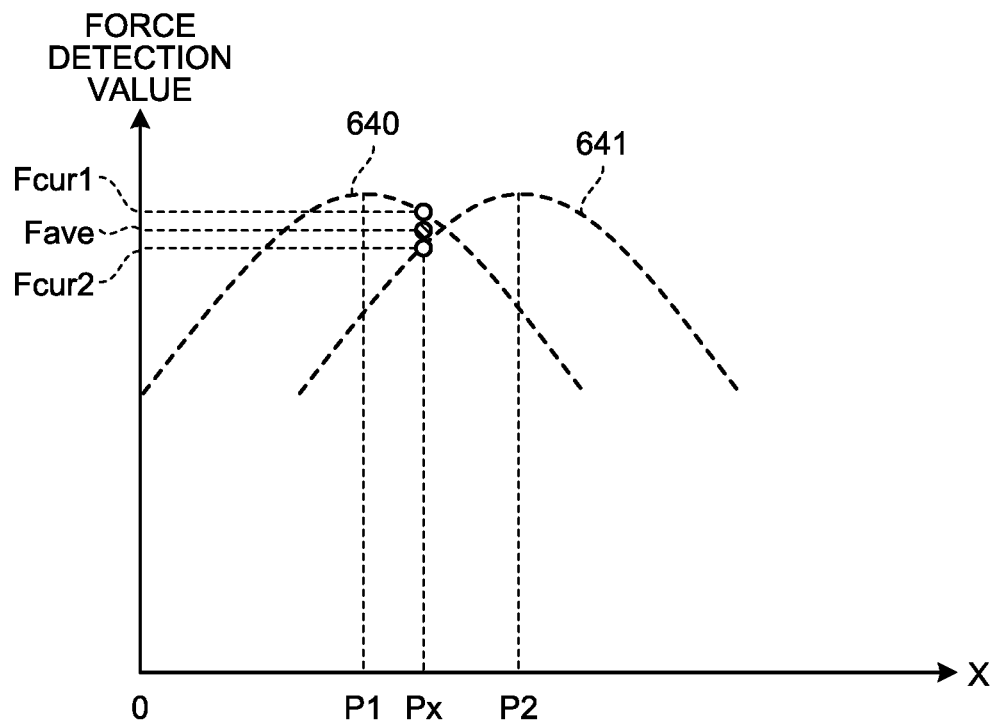
FIG. 54 is a graph illustrating a relation between a position where a force is applied and a force detection value in a display device with a touch detection function according to a third embodiment.

FIG. 54 is a graph illustrating a relation between a position where a force is applied and a force detection value in a display device with a touch detection function according to a third embodiment. To be specific, FIG. 54 illustrates a line 640 representing first pre-correction force detection values Fcur1 that are detected by the electrode SUS1 when a reference force is applied to positions with different X coordinates. FIG. 54 illustrates a curve 641 representing second pre-correction force detection values Fcur2 that are detected by the electrode SUS2 when the reference force is applied to positions with different X coordinates. In FIG. 54, the transverse axis indicates the X coordinate and the longitudinal axis indicates the force detection value.

The display device with a touch detection function according to the third embodiment detects the first pre-correction force detection value Fcur1 by the electrode SUS1 when a force is applied to the point 422 (see FIG. 20). The display device with a touch detection function according to the third embodiment detects the second pre-correction force detection value Fcur2 by the electrode SUS2 when a force is applied to the point 422. The display device with a touch detection function according to the third embodiment calculates the average pre-correction force detection value Fave as the average of the first pre-correction force detection value Fcur1 and the second pre-correction force detection value Fcur2.

Figure 55:
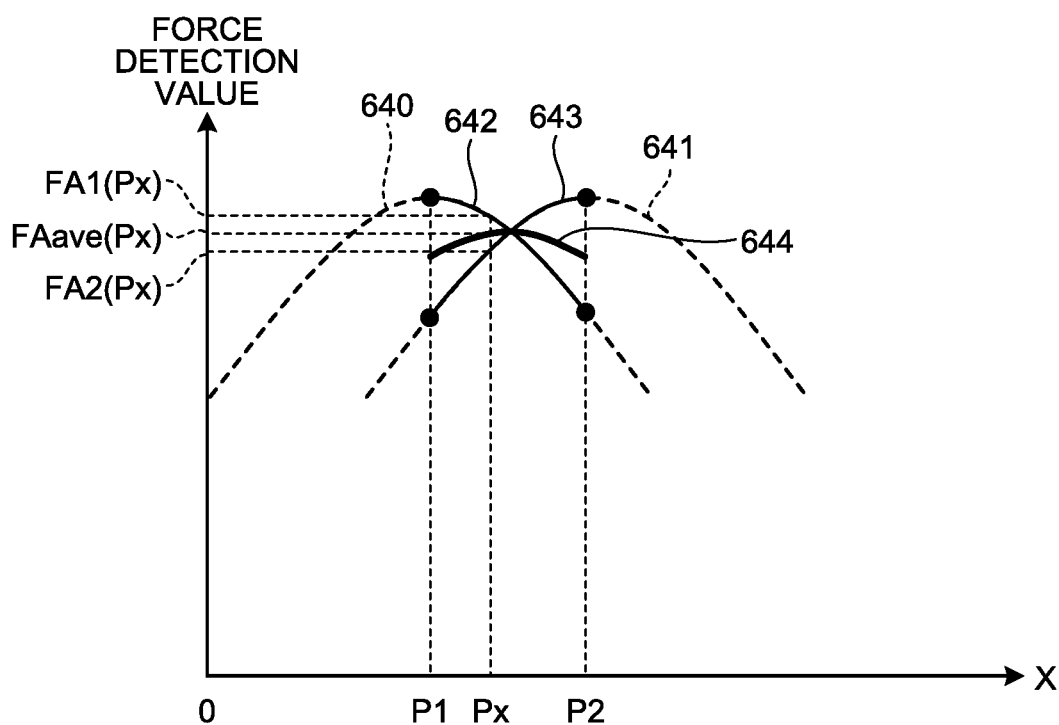
FIG. 55 is a graph for explaining interpolation processing in the display device with a touch detection function according to the third embodiment.

FIG. 55 is a graph for explaining interpolation processing in the display device with a touch detection function according to the third embodiment. In FIG. 55, the transverse axis indicates the X coordinate and the longitudinal axis indicates the force detection value.

A line 642 is provided by performing polynomial interpolation on the table TBL1 (see FIG. 23) stored in the table storage 54.

A line 643 is provided by performing the polynomial interpolation on the table TBL2 stored in the table storage 54.

A line 644 represents an average of a polynomial interpolation result indicated by the line 642 and a polynomial interpolation result indicated by the line 643.

The display device with a touch detection function according to the third embodiment calculates the average interpolation value FAave(Px) as the average of the first interpolation value FA1(Px) and the second interpolation value FA2(Px) when a force is applied to the X coordinate Px.

The display device with a touch detection function according to the third embodiment calculates the ratio R of the average pre-correction force detection value Fave relative to the average interpolation value FAave(Px). That is to say, R=Fave/FAave(Px) is satisfied.

3-2. Configuration and Operation of Force Detection Controller

In the third embodiment, the force detection controller 50 illustrated in FIG. 1 performs force detection processing. To be more specific, for example, the force detection processor 442 of the signal processor 44 in the force detection controller 50 illustrated in FIG. 2 performs the force detection processing. For example, the force detection processor 442 in the force detection controller 50 illustrated in FIG. 22 performs the force detection processing in the third embodiment. For example, the force detection processor 442b in the force detection controller 50b illustrated in FIG. 48 performs the force detection processing in the third embodiment. For example, the force detection processor 442c in the force detection controller 50c illustrated in FIG. 52 performs the force detection processing in the third embodiment. The following describes a configuration example of a force detection processor 442d in a force detection controller 50d by which the force detection processor 442 in the force detection controller 50 illustrated in FIG. 2 can be replaced.

Figure 56:
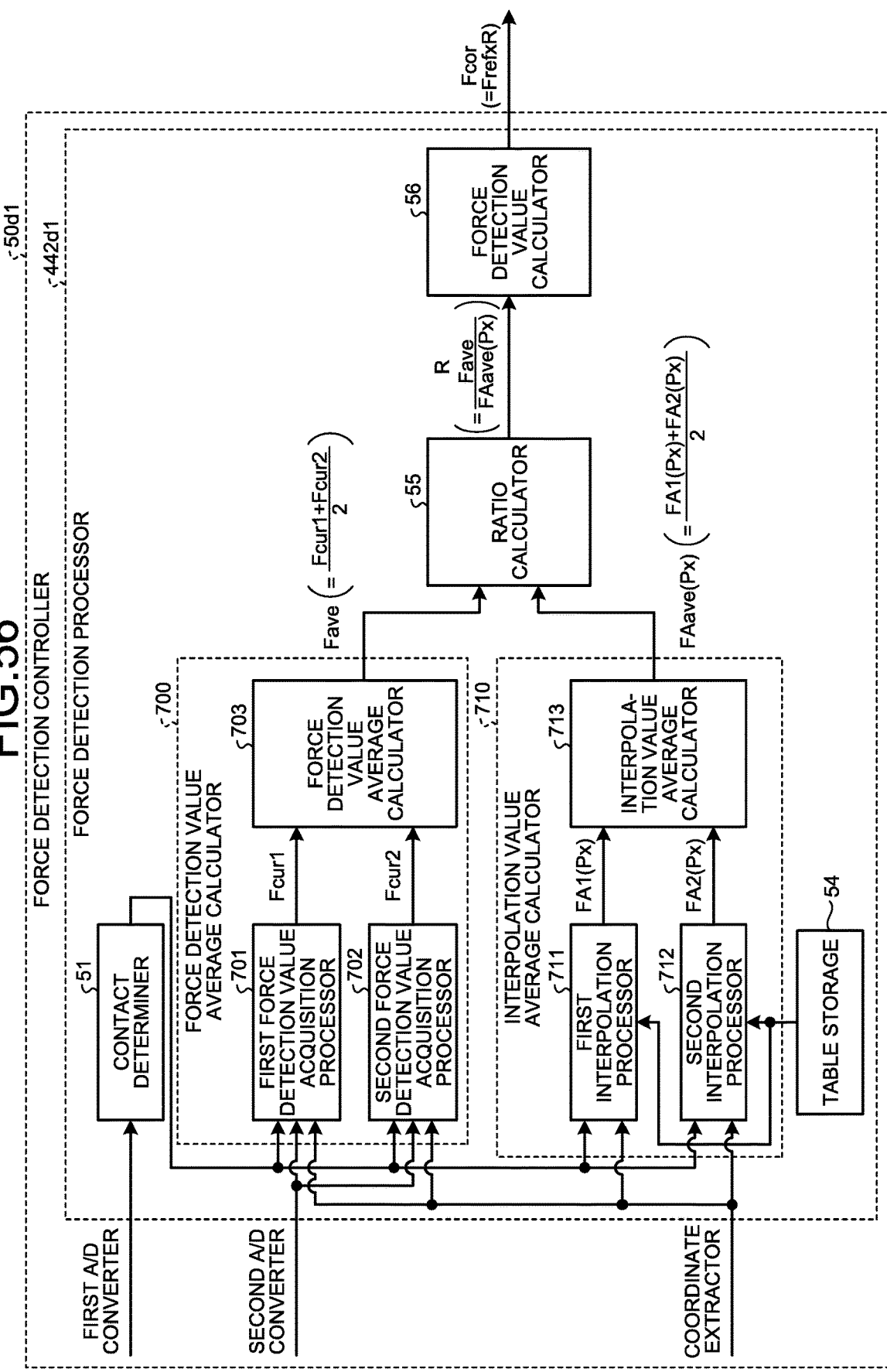
FIG. 56 is a functional block diagram of a force detection controller of the display device with a touch detection function according to the third embodiment.

FIG. 56 is a functional block diagram of the force detection controller of the display device with a touch detection function according to the third embodiment.

The force detection processor 442d of the force detection controller 50d according to the third embodiment includes the contact determiner 51, the table storage 54, the ratio calculator 55, the force detection value calculator 56, a force detection value average calculator 700, and an interpolation value average calculator 710. The force detection value average calculator 700 includes a first force detection value acquisition processor 701, a second force detection value acquisition processor 702, and a force detection value average calculator 703. The interpolation value average calculator 710 includes a first interpolation processor 711, a second interpolation processor 712, and an interpolation value average calculator 713.

The first force detection value acquisition processor 701 performs the following processing when the contact determiner 51 has determined that a detection target object OBJ is in contact with or in proximity to the input surface IS. The first force detection value acquisition processor 701 specifies the electrode SUS (see the electrode SUS1 in FIG. 20) overlapping, when viewed from the Z direction, a position where the force is applied (see the point 422 in FIG. 20) by referring to the touch detection position Vout output from the coordinate extractor 45 (see FIG. 2). Then, the first force detection value acquisition processor 701 acquires the first pre-correction force detection value Fcur1 based on a capacitance value between the drive electrode COML and the specified electrode SUS by referring to signals output from the second A/D converter 43-2 (see FIG. 2).

The second force detection value acquisition processor 702 performs the following processing when the contact determiner 51 has determined that a detection target object OBJ is in contact with or in proximity to the input surface IS. The second force detection value acquisition processor 702 refers to the touch detection position Vout output from the coordinate extractor 45 (see FIG. 2). The second force detection value acquisition processor 702 specifies the electrode SUS (see the electrode SUS2 in FIG. 20) close to the position where the force is applied (see the point 422 in FIG. 20) among the electrodes SUS (see the electrode SUS0 and the electrode SUS2 in FIG. 20) adjacent to the electrode SUS (see the electrode SUS1 in FIG. 20) overlapping, when viewed from the Z direction, the position where the force is applied. The second detection value acquisition processor 702 acquires the second pre-correction force detection value Fcur2 based on a capacitance value between the drive electrode COML and the specified electrode SUS by referring to the signals output from the second A/D converter 43-2 (see FIG. 2).

The force detection value average calculator 703 calculates the average pre-correction force detection value Fave as the average of the first pre-correction force detection value Fcur1 and the second pre-correction force detection value Fcur2. That is to say, Fave=(Fcur1+Fcur2)/2 is satisfied.

The first interpolation processor 711 performs the following processing when the contact determiner 51 has determined that a detection target object OBJ is in contact with or in proximity to the input surface IS. The first interpolation processor 711 specifies the electrode SUS (see the electrode SUS1 in FIG. 20) overlapping, when viewed from the Z direction, the position where the force is applied (see the point 422 in FIG. 20) by referring to the touch detection position Vout output from the coordinate extractor 45 (see FIG. 2). The first interpolation processor 711 reads the table TBL corresponding to the specified electrode SUS from the table storage 54. The first interpolation processor 711 calculates, by the interpolation processing, the first interpolation value FA1(Px) when a reference force is assumed to be applied to the X coordinate Px as the position where the force is applied. Although the first interpolation processor 711 performs polynomial interpolation in the third embodiment, the interpolation method is not limited thereto. The first interpolation processor 711 may perform linear interpolation or interpolation using another function.

The second interpolation processor 712 performs the following processing when the contact determiner 51 has determined that a detection target object OBJ is in contact with or in proximity to the input surface IS. The second interpolation processor 712 refers to the touch detection position Vout output from the coordinate extractor 45 (see FIG. 2). The second interpolation processor 712 specifies the electrode SUS (see the electrode SUS2 in FIG. 20) close to the position where the force is applied (see the point 422 in FIG. 20) among the electrodes SUS (see the electrode SUS0 and the electrode SUS2 in FIG. 20) adjacent to the electrode SUS (see the electrode SUS1 in FIG. 20) overlapping, when viewed from the Z direction, the position where the force is applied. The second interpolation processor 712 reads the table TBL corresponding to the specified electrode SUS from the table storage 54. The second interpolation processor 712 calculates, by the interpolation processing, the second interpolation value FA2(Px) when the reference force is assumed to be applied to the X coordinate Px as the position where the force is applied. Although the second interpolation processor 712 performs the polynomial interpolation in the third embodiment, the interpolation method is not limited thereto. The second interpolation processor 712 may perform the linear interpolation or interpolation using another function.

The interpolation value average calculator 713 calculates the average interpolation value FAave(Px) as the average of the first interpolation value FA1(Px) and the second interpolation value FA2(Px). That is to say, FAave(Px)=(FA1(Px)+FA2(Px))/2 is satisfied.

The ratio calculator 55 calculates the ratio R of the average pre-correction force detection value Fave relative to the average interpolation value FAave(Px). That is to say, R=Fave/FAave(Px) is satisfied.

Figure 57:
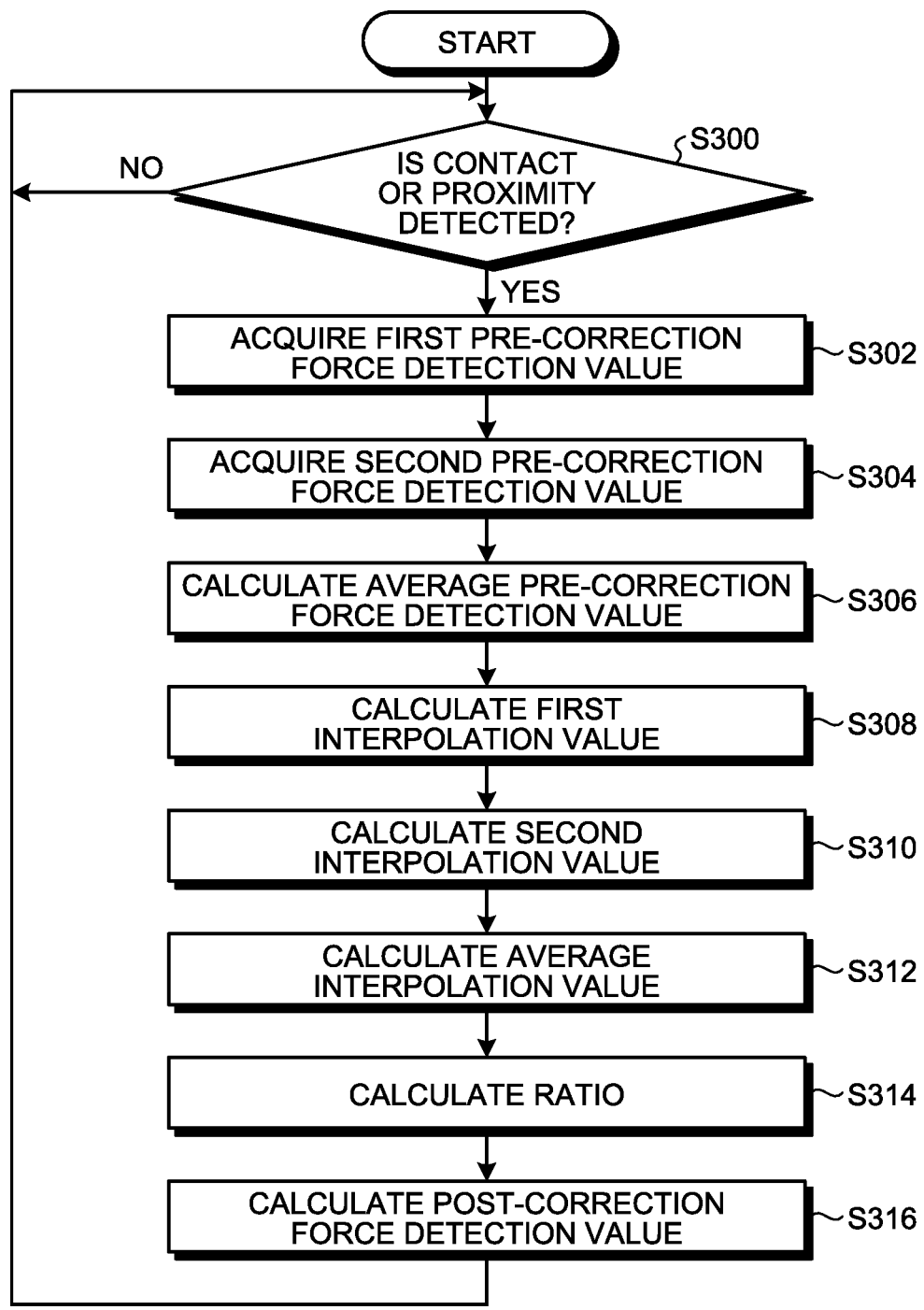
FIG. 57 is a flowchart of processing performed by the force detection controller of the display device with a touch detection function according to the third embodiment.

FIG. 57 is a flowchart of processing performed by the force detection controller of the display device with a touch detection function according to the third embodiment performs. The processing illustrated in FIG. 57 is performed in the above-mentioned mutual-capacitance detection periods 139.

At step S300, the contact determiner 51 determines whether or not a detection target object OBJ is in contact with or in proximity to the input surface IS. When the contact determiner 51 determines that no detection target object OBJ is in contact with or in proximity to the input surface IS (No at step S300), it stands by at step S300. When the contact determiner 51 determines that a detection target object OBJ is in contact with or in proximity to the input surface IS (Yes at step S300), the processing proceeds to step S302.

At step S302, the first force detection value acquisition processor 701 specifies the electrode SUS overlapping, when viewed from the Z direction, the position where the force is applied by referring to the touch detection position Vout output from the coordinate extractor 45 (see FIG. 2). The first force detection value acquisition processor 701 acquires the first pre-correction force detection value Fcur1 based on the capacitance value between the drive electrode COML and the specified electrode SUS by referring to the signals output from the second A/D converter 43-2 (see FIG. 2).

At step S304, the second force detection value acquisition processor 702 specifies the electrode SUS close to the position where the force is applied among the electrodes SUS adjacent to the electrode SUS overlapping, when viewed from the Z direction, the position where the force is applied by referring to the touch detection position Vout output from the coordinate extractor 45 (see FIG. 2). The second detection value acquisition processor 702 acquires the second pre-correction force detection value Fcur2 based on the capacitance value between the drive electrode COML and the specified electrode SUS by referring to signals output from the second A/D converter 43-2 (see FIG. 2).

At step S306, the force detection value average calculator 703 calculates the average pre-correction force detection value Fave as the average of the first pre-correction force detection value Fcur1 and the second pre-correction force detection value Fcur2.

At step S308, the first interpolation processor 711 specifies the electrode SUS overlapping, when viewed from the Z direction, the position where the force is applied by referring to the touch detection position Vout output from the coordinate extractor 45 (see FIG. 2). The first interpolation processor 711 reads the table TBL corresponding to the specified electrode SUS from the table storage 54. The first interpolation processor 711 calculates, by the interpolation processing, the first interpolation value FA1(Px) when the reference force is assumed to be applied to the X coordinate Px as the position where the force is applied.

At step S310, the second interpolation processor 712 specifies the electrode SUS close to the position where the force is applied among the electrodes SUS adjacent to the electrode SUS overlapping, when viewed from the Z direction, the position where the force is applied by referring to the touch detection position Vout output from the coordinate extractor 45 (see FIG. 2). The second interpolation processor 712 reads the table TBL corresponding to the specified electrode SUS from the table storage 54. The second interpolation processor 712 calculates, by the interpolation processing, the second interpolation value FA2(Px) when the reference force is assumed to be applied to the X coordinate Px as the position where the force is applied.

At step S312, the interpolation value average calculator 713 calculates the average interpolation value FAave(Px) as the average of the first interpolation value FA1(Px) and the second interpolation value FA2(Px).

At step S314, the ratio calculator 55 calculates the ratio R of the average pre-correction force detection value Fave relative to the average interpolation value FAave(Px).

The force detection value calculator 56 calculates the post-correction force detection value Fcor by multiplying the reference force Fref by the ratio R at step S316, and the processing proceeds to step S300.

As described above, the display device with a touch detection function according to the third embodiment can calculate the post-correction force detection value Fcor in consideration of the first pre-correction force detection value Fcur1 and the second pre-correction force detection value Fcur2. The first pre-correction force detection value Fcur1 is a pre-correction force detection value detected by the electrode SUS overlapping, when viewed from the Z direction, the position where the force is applied. The second pre-correction force detection value Fcur2 is a pre-correction force detection value detected by the electrode SUS close to the position where the force is applied among the electrodes SUS adjacent to the electrode SUS overlapping, when viewed from the Z direction, the position where the force is applied. The display device with a touch detection function according to the third embodiment can thereby prevent force detection accuracy from being lowered depending on the position where the force is applied and suitably detect the force.

3-3. Modifications

The force detection controller 50*d* illustrated in FIG. 56 and the electrode structure illustrated in FIG. 41 or the electrode structure illustrated in FIG. 51 can also be combined. In this case, the first force detection value acquisition processor 701 can acquire the first pre-correction force detection value Fcur1 of one portion of the electrode SUS that overlaps, when viewed from the Z direction, the position where the force is applied based on the signals output from the first A/D converter 43-1 (see FIG. 2). The second force detection value acquisition processor 702 can acquire the second pre-correction force detection value Fcur2 of another portion of the electrode SUS adjacent to the one portion based on the signals output from the first A/D converter 43-1 (see FIG. 2).

The components of the embodiments described above can be combined as appropriate. Other operational advantages accruing from the aspects described in the embodiments that are obvious from the description herein, or that are appropriately conceivable by those skilled in the art will naturally be understood as accruing from the present invention.

The present disclosure includes the following aspects:

(1) A display device with a touch detection function, the display device comprising:
  a first substrate having an input surface;
  a touch detection electrode provided to the first substrate and facing the input surface;
  a first electrode provided to a second substrate and facing the touch detection electrode;
  a second electrode facing the first electrode with a dielectric layer interposed between the first electrode and the second electrode;
  a touch detection controller configured to detect a position at which a detection target object is in contact with or in proximity to the input surface based on capacitance between the first electrode and the touch detection electrode;
  a force detection controller configured to detect a force applied to the input surface by the detection target object based on capacitance between the first electrode and the second electrode and calculate a force detection value indicating the force; and
    storage configured to store therein a plurality of reference values detected by the force detection controller,
    wherein the force detection controller configured to
    perform interpolation processing on the reference values to calculate an interpolation value when a reference force is applied to a position at which the force has been applied, and
    calculate the force detection value based on a ratio of a detection value detected based on the capacitance between the first electrode and the second electrode relative to the interpolation value,
  wherein the position at which the force is applied is specified based on a position detected by the touch detection controller as the position of contact with the input surface by the detection target object, and
  wherein the reference values are detected based on the capacitance between the first electrode and the second electrode when the reference force is applied to a plurality of reference positions.

(2) The display device with a touch detection function according to (1),
  wherein the display device comprises a plurality of the second electrodes,
  wherein the storage stores therein a plurality of reference values of a first group for one second electrode that are detected based on capacitance between the first electrode and the one second electrode when the reference force is applied to the reference positions,
    wherein the force detection controller
    performs the interpolation processing on the reference values of the first group to calculate a first interpolation value when the reference force is applied to the position at which the force has been applied,
    calculates a first ratio of a first detection value detected based on capacitance between the first electrode and the one second electrode relative to the first interpolation value,
    detects a plurality of reference values of a second group for another second electrode based on capacitance between the first electrode and the other second electrode when the reference force is applied to the reference positions,
    performs the interpolation processing on the reference values of the second group to calculate a second interpolation value when the reference force is applied to the position at which the force has been applied,
    calculates a second ratio of a second detection value detected based on capacitance between the first electrode and the other second electrode relative to the second interpolation value,
    calculates a weighted average or an average of the first ratio and the second ratio, and
    calculates the force detection value based on the weighted average or the average.

(3) The display device with a touch detection function according to (1),
  wherein the display device comprises a plurality of the second electrodes,
  wherein the storage stores therein a plurality of reference values of a first group for one second electrode that are detected based on capacitance between the first electrode and the one second electrode when the reference force is applied to the reference positions, and
    wherein the force detection controller
    performs the interpolation processing on the reference values of the first group to calculate a first interpolation value when the reference force is applied to the position at which the force has been applied,
    detects a plurality of reference values of a second group for another second electrode based on capacitance between the first electrode and the other second electrode when the reference force is applied to the reference positions,
    performs the interpolation processing on the reference values of the second group to calculate a second interpolation value when the reference force is applied to the position at which the force has been applied,
    calculates a first average of the first interpolation value and the second interpolation value,
    calculates a second average of a first detection value detected based on the capacitance between the first electrode and the one second electrode and a second detection value detected based on the capacitance between the first electrode and the other second electrode, and
    calculates the force detection value based on a ratio of the first average relative to the second average.

(4) The display device with a touch detection function according to (1),
  wherein the force detection controller detects the force applied to the input surface by the detection target object in a period during which the touch detection controller detects the position at which the detection target object is in contact with or in proximity to the input surface.

(5) The display device with a touch detection function according to (1),
wherein the dielectric layer includes an air gap.

(6) The display device with a touch detection function according to (1),
wherein the dielectric layer includes a multilayered body included in a configuration of a backlight illuminating the input surface.

(7) The display device with a touch detection function according to (6),
wherein the second electrode is provided on a surface of the multilayered body opposite to a surface on a side of the input surface.

(8) The display device with a touch detection function according to (6),
wherein the second electrode is provided on a surface of the multilayered body on a side of the input surface.

(9) The display device with a touch detection function according to (6),
wherein the second electrode is provided in an inner layer of the multilayered body.

(10) The display device with a touch detection function according to (1),
wherein the interpolation processing is polynomial interpolation or linear interpolation. (11) A display device with a touch detection function, the display device comprising:
a first substrate having an input surface;
a first electrode provided to the first substrate;
a second electrode facing the first electrode with a dielectric layer interposed between the first electrode and the second electrode;
a touch detection controller configured to detect a position at which a detection target object is in contact with or in proximity to the input surface based on capacitance of the first electrode; and
a force detection controller configured to detect a force applied to the input surface by the detection target object based on capacitance between the first electrode and the second electrode and calculate a force detection value indicating the force; and
storage configured to store therein a plurality of reference values detected by the force detection controller,
wherein the force detection controller configured to
perform interpolation processing on the reference values to calculate an interpolation value when a reference force is applied to a position at which the force has been applied, and
calculate the force detection value based on a ratio of a detection value detected based on the capacitance between the first electrode and the second electrode relative to the interpolation value,
wherein the position at which the force has been applied is specified based on a position detected by the touch detection controller as the position of contact with the input surface by the detection target object, and
wherein the reference values are detected based on the capacitance between the first electrode and the second electrode when the reference force is applied to a plurality of reference positions.

(12) The display device with a touch detection function according to claim 11),
wherein the storage stores therein a plurality of reference values of a first group for one portion of the second electrode that are detected based on capacitance between the first electrode and the one portion of the second electrode when the reference force is applied to the reference positions, and
wherein the force detection controller
performs the interpolation processing on the reference values of the first group to calculate a first interpolation value when the reference force is applied to the position at which the force has been applied,
calculates a first ratio of a first detection value detected based on capacitance between the first electrode and the one portion relative to the first interpolation value,
detects a plurality of reference values of a second group for another portion of the second electrode based on capacitance between the first electrode and the other portion of the second electrode when the reference force is applied to the reference positions,
performs the interpolation processing on the reference values of the second group to calculate a second interpolation value when the reference force is applied to the position at which the force has been applied,
calculates a second ratio of a second detection value detected based on capacitance between the first electrode and the other portion relative to the second interpolation value,
calculates a weighted average or an average of the first ratio and the second ratio, and
calculates the force detection value based on the weighted average or the average.

(13) The display device with a touch detection function according to claim 11),
wherein the storage stores therein a plurality of reference values of a first group for one portion of the second electrode that are detected based on capacitance between the first electrode and the one portion of the second electrode when the reference force is applied to the reference positions, and
wherein the force detection controller
performs the interpolation processing on the reference values of the first group to calculate a first interpolation value when the reference force is applied to the position at which the force has been applied,
detects a plurality of reference values of a second group for another portion of the second electrode based on capacitance between the first electrode and the other portion of the second electrode when the reference force is applied to the reference positions,
performs the interpolation processing on the reference values of the second group to calculate a second interpolation value when the reference force is applied to the position at which the force has been applied,
calculates a first average of the first interpolation value and the second interpolation value,
calculates a second average of a first detection value detected based on capacitance between the first electrode and the one portion and a second detection value detected based on the capacitance between the first electrode and the other portion, and
calculates the force detection value based on a ratio of the first average relative to the second average.

(14) The display device with a touch detection function according to (11),
wherein the force detection controller detects the force applied to the input surface by the detection target object in a period during which the touch detection controller detects the position at which the detection target object is in contact with or in proximity to the input surface.

(15) The display device with a touch detection function according to (11),
wherein the dielectric layer includes an air gap.

(16) The display device with a touch detection function according to (11),
wherein the dielectric layer includes a multilayered body included in a configuration of a backlight illuminating the input surface.
(17) The display device with a touch detection function according to (16),
wherein the second electrode is provided on a surface of the multilayered body opposite to a surface on a side of the input surface.
(18) The display device with a touch detection function according to (16),
wherein the second electrode is provided on a surface of the multilayered body on a side of the input surface.
(19) The display device with a touch detection function according to (16),
wherein the second electrode is provided in an inner layer of the multilayered body.
(20) The display device with a touch detection function according to (11),
wherein the interpolation processing is polynomial interpolation or linear interpolation.

What is claimed is:

1. A display device with a touch detection function, the display device comprising:
a first substrate having an input surface;
a touch detection electrode provided to the first substrate and facing the input surface;
a first electrode provided to a second substrate and facing the touch detection electrode;
a second electrode facing the first electrode with a dielectric layer interposed between the first electrode and the second electrode;
a touch detection controller configured to detect a position at which a detection target object is in contact with or in proximity to the input surface based on capacitance between the first electrode and the touch detection electrode;
a force detection controller configured to detect a force applied to the input surface by the detection target object based on capacitance between the first electrode and the second electrode and calculate a force detection value indicating the force; and
storage configured to store therein a plurality of reference values detected by the force detection controller,
wherein the force detection controller configured to
perform interpolation processing on the reference values to calculate an interpolation value when a reference force is applied to a position at which the force has been applied, and
calculate the force detection value based on a ratio of a detection value detected based on the capacitance between the first electrode and the second electrode relative to the interpolation value,
wherein the position at which the force is applied is specified based on a position detected by the touch detection controller as the position of contact with the input surface by the detection target object, and
wherein the reference values are detected based on the capacitance between the first electrode and the second electrode when the reference force is applied to a plurality of reference positions,
wherein the display device comprises a plurality of the second electrodes,
wherein the storage stores therein a plurality of reference values of a first group for one second electrode that are detected based on capacitance between the first electrode and the one second electrode when the reference force is applied to the reference positions, and
wherein the force detection controller
performs the interpolation processing on the reference values of the first group to calculate a first interpolation value when the reference force is applied to the position at which the force has been applied,
detects a plurality of reference values of a second group for another second electrode based on capacitance between the first electrode and the other second electrode when the reference force is applied to the reference positions,
performs the interpolation processing on the reference values of the second group to calculate a second interpolation value when the reference force is applied to the position at which the force has been applied,
calculates a first average of the first interpolation value and the second interpolation value,
calculates a second average of a first detection value detected based on the capacitance between the first electrode and the one second electrode and a second detection value detected based on the capacitance between the first electrode and the other second electrode, and
calculates the force detection value based on a ratio of the first average relative to the second average.

2. The display device with a touch detection function according to claim 1,
wherein the force detection controller detects the force applied to the input surface by the detection target object in a period during which the touch detection controller detects the position at which the detection target object is in contact with or in proximity to the input surface.

3. The display device with a touch detection function according to claim 1,
wherein the dielectric layer includes an air gap.

4. The display device with a touch detection function according to claim 1,
wherein the dielectric layer includes a multilayered body included in a configuration of a backlight illuminating the input surface.

5. The display device with a touch detection function according to claim 4,
wherein the second electrode is provided on a surface of the multilayered body opposite to a surface on a side of the input surface.

6. The display device with a touch detection function according to claim 4,
wherein the second electrode is provided on a surface of the multilayered body on a side of the input surface.

7. The display device with a touch detection function according to claim 4,
wherein the second electrode is provided in an inner layer of the multilayered body.

8. The display device with a touch detection function according to claim 1,
wherein the interpolation processing is polynomial interpolation or linear interpolation.

9. A display device with a touch detection function, the display device comprising:
a first substrate having an input surface;
a first electrode provided to the first substrate;
a second electrode facing the first electrode with a dielectric layer interposed between the first electrode and the second electrode;

a touch detection controller configured to detect a position at which a detection target object is in contact with or in proximity to the input surface based on capacitance of the first electrode; and a force detection controller configured to detect a force applied to the input surface by the detection target object based on capacitance between the first electrode and the second electrode and calculate a force detection value indicating the force; and storage configured to store therein a plurality of reference values detected by the force detection controller, wherein the force detection controller configured to
 perform interpolation processing on the reference values to calculate an interpolation value when a reference force is applied to a position at which the force has been applied, and
 calculate the force detection value based on a ratio of a detection value detected based on the capacitance between the first electrode and the second electrode relative to the interpolation value, wherein the position at which the force has been applied is specified based on a position detected by the touch detection controller as the position of contact with the input surface by the detection target object, and wherein the reference values are detected based on the capacitance between the first electrode and the second electrode when the reference force is applied to a plurality of reference positions, wherein the storage stores therein a plurality of reference values of a first group for one portion of the second electrode that are detected based on capacitance between the first electrode and the one portion of the second electrode when the reference force is applied to the reference positions, and wherein the force detection controller
 performs the interpolation processing on the reference values of the first group to calculate a first interpolation value when the reference force is applied to the position at which the force has been applied,
 detects a plurality of reference values of a second group for another portion of the second electrode based on capacitance between the first electrode and the other portion of the second electrode when the reference force is applied to the reference positions,
 performs the interpolation processing on the reference values of the second group to calculate a second interpolation value when the reference force is applied to the position at which the force has been applied,
 calculates a first average of the first interpolation value and the second interpolation value,
 calculates a second average of a first detection value detected based on capacitance between the first electrode and the one portion and a second detection value detected based on the capacitance between the first electrode and the other portion, and
 calculates the force detection value based on a ratio of the first average relative to the second average.

10. The display device with a touch detection function according to claim 9,
 wherein the force detection controller detects the force applied to the input surface by the detection target object in a period during which the touch detection controller detects the position at which the detection target object is in contact with or in proximity to the input surface.

11. The display device with a touch detection function according to claim 9,
 wherein the dielectric layer includes an air gap.

12. The display device with a touch detection function according to claim 9,
 wherein the dielectric layer includes a multilayered body included in a configuration of a backlight illuminating the input surface.

13. The display device with a touch detection function according to claim 12,
 wherein the second electrode is provided on a surface of the multilayered body opposite to a surface on a side of the input surface.

14. The display device with a touch detection function according to claim 12,
 wherein the second electrode is provided on a surface of the multilayered body on a side of the input surface.

15. The display device with a touch detection function according to claim 12,
 wherein the second electrode is provided in an inner layer of the multilayered body.

16. The display device with a touch detection function according to claim 9,
 wherein the interpolation processing is polynomial interpolation or linear interpolation.

\* \* \* \* \*